United States Patent
Otsuka et al.

(10) Patent No.: US 9,531,018 B2
(45) Date of Patent: *Dec. 27, 2016

(54) SOLID OXIDE FUEL CELL SYSTEM FOR PRODUCING VARIABLE GENERATED POWER BASED ON POWER DEMAND

(75) Inventors: Toshiharu Otsuka, Nakama (JP); Katsuhisa Tsuchiya, Chigasaki (JP); Tsukasa Shigezumi, Nishinomiya (JP); Toshiharu Ooe, Chigasaki (JP); Kiyotaka Nakano, Narashino (JP); Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 867 days.

This patent is subject to a terminal disclaimer.

(21) Appl. No.: 13/876,346

(22) PCT Filed: Sep. 29, 2011

(86) PCT No.: PCT/JP2011/072331
§ 371 (c)(1),
(2), (4) Date: Mar. 27, 2013

(87) PCT Pub. No.: WO2012/043698
PCT Pub. Date: Apr. 5, 2012

(65) Prior Publication Data
US 2013/0183599 A1    Jul. 18, 2013

(30) Foreign Application Priority Data

Sep. 29, 2010  (JP) .................................. 2010-218367
Mar. 31, 2011  (JP) .................................. 2011-077954
(Continued)

(51) Int. Cl.
*H01M 8/04* (2016.01)
*H01M 8/12* (2016.01)
(Continued)

(52) U.S. Cl.
CPC ..... *H01M 8/04082* (2013.01); *H01M 8/04022* (2013.01); *H01M 8/0432* (2013.01);
(Continued)

(58) Field of Classification Search
None
See application file for complete search history.

(56) References Cited

U.S. PATENT DOCUMENTS

2006/0240297 A1* 10/2006 Takeda .............. H01M 8/04007
429/431
2008/0193804 A1   8/2008 Suzuki et al.
(Continued)

FOREIGN PATENT DOCUMENTS

EP   2 624 350 A1   8/2013
JP   62-186472 A    8/1987
(Continued)

OTHER PUBLICATIONS

Machine translation of JP 2010-092836 A; Machine translation of JP 2006-302881 A.*
(Continued)

*Primary Examiner* — Patrick Ryan
*Assistant Examiner* — Haixia Zhang
(74) *Attorney, Agent, or Firm* — Brinks Gilson & Lione

(57) ABSTRACT

The present invention is to provide a solid oxide fuel cell capable of improving the overall energy efficiency. The present invention is directed to a solid oxide fuel cell and comprising: a fuel cell module; a fuel supply device; a combustion chamber for burning excess fuel and heating; a heat storing material, a power demand detecting sensor; a temperature detection device, and a control device for controlling so that the fuel utilization rate is high when generated power is large, and also for changing output power at a delay to the fuel supply rate; whereby the control device
(Continued)

comprises a stored heat amount estimating circuit, and when it is estimated that a utilizable heat amount has accumulated in the heat storing material, the fuel supply rate is reduced so that the fuel utilization rate increases vs. the same generated power.

17 Claims, 24 Drawing Sheets

(30) Foreign Application Priority Data

Mar. 31, 2011 (JP) ................................ 2011-077955
Mar. 31, 2011 (JP) ................................ 2011-079465

(51) Int. Cl.
*H01M 8/06* (2016.01)
*H01M 8/24* (2016.01)

(52) U.S. Cl.
CPC ... *H01M 8/04052* (2013.01); *H01M 8/04373* (2013.01); *H01M 8/04604* (2013.01); *H01M 8/04701* (2013.01); *H01M 8/04753* (2013.01); *H01M 8/04805* (2013.01); *H01M 8/04223* (2013.01); *H01M 8/04925* (2013.01); *H01M 8/0618* (2013.01); *H01M 8/2475* (2013.01); *H01M 2008/1293* (2013.01); *H01M 2250/405* (2013.01); *Y02B 90/16* (2013.01); *Y02E 60/50* (2013.01); *Y02E 60/525* (2013.01)

(56) References Cited

U.S. PATENT DOCUMENTS

2010/0304249 A1* 12/2010 Tsuchiya .................. C01B 3/38
429/429
2013/0209903 A1 8/2013 Otsuka et al.

FOREIGN PATENT DOCUMENTS

| JP | 10-326625 A | 12/1998 |
|----|-------------|---------|
| JP | 2004-071312 A | 3/2004 |
| JP | 2006-302881 A | 11/2006 |
| JP | 2006-309974 A | 11/2006 |
| JP | 2010-092836 A | 4/2010 |
| JP | 2010-205670 A | 9/2010 |

OTHER PUBLICATIONS

Official Action in corresponding European Application No. 11 829 251.5, dated Apr. 7, 2015, 9 pages.
International Search Report for International Application No. PCT/JP2011/072331, dated Nov. 22, 2011, 2 pages.
Written Opinion of the International Searching Authority for International Application No. PCT/JP2011/072331, dated Nov. 22, 2011, 3 pages.
International Preliminary Report on Patentability for International Application No. PCT/JP2011/072331, dated Apr. 9, 2013, 5 pages.
Extended European Search Report in corresponding European Application No. 11 82 9251.5, dated Apr. 9, 2014, 8 pages.

* cited by examiner

FIG.12

| DETECTED TEMPERATURE Td | TEMP. RANGE | TEMP. TREND | ADD/SUBTRACT VALUE |
|---|---|---|---|
| $Td < 580°C$ | LOW TEMP. | — | $-20/50000$ |
| $580 \leq Td < 620°C$ | LOW TEMP. | — | $-10/50000 * (620-Td)/(620-580)$ |
| $620 \leq Td < 630°C$ | LOW TEMP. | — | $-1/50000$ |
| $630 \leq Td < 632°C$ | — | RISING | 0 |
| | | FALLING | $-1/50000$ |
| $632 \leq Td < 638°C$ | — | RISING | 0 |
| | | FALLING | 0 |
| $638 \leq Td < 640°C$ | — | RISING | $+1/50000$ |
| | | FALLING | 0 |
| $640 \leq Td < 650°C$ | APPROPRIATE TEMP. | — | $+1/50000$ |
| $650°C \leq Td$ | APPROPRIATE TEMP. | — | $+(Td-650)*1/50000$ |

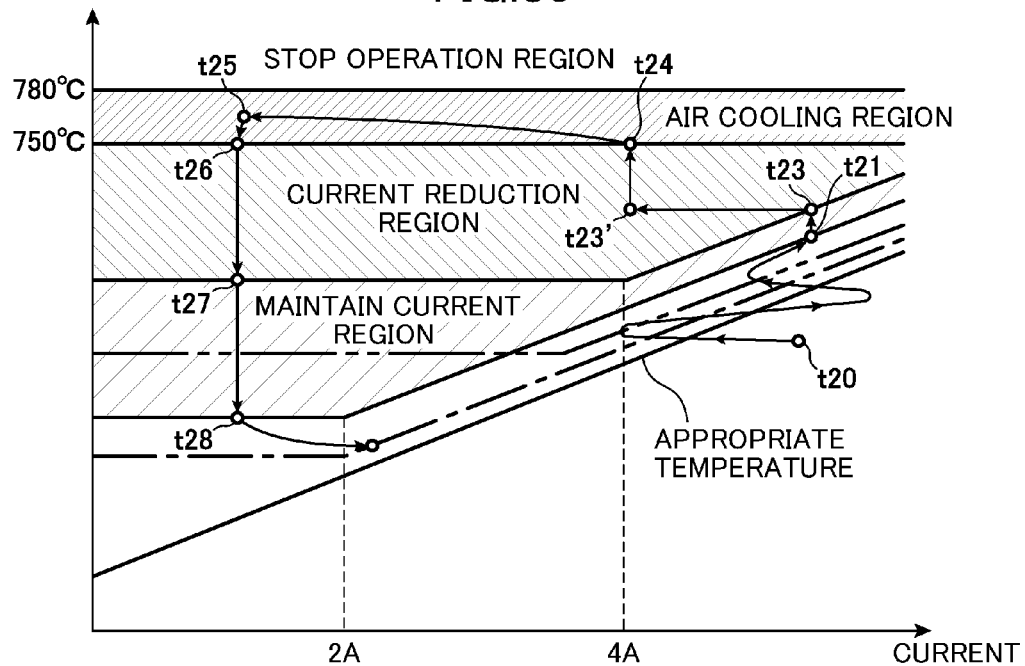
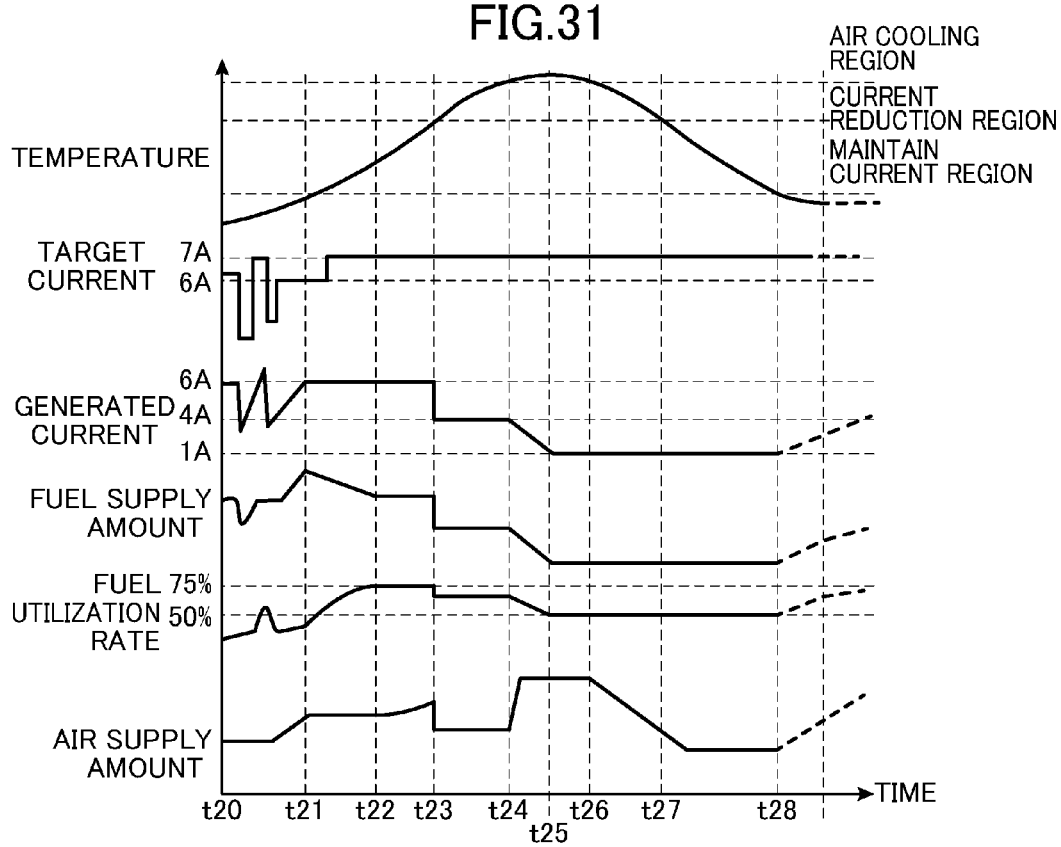

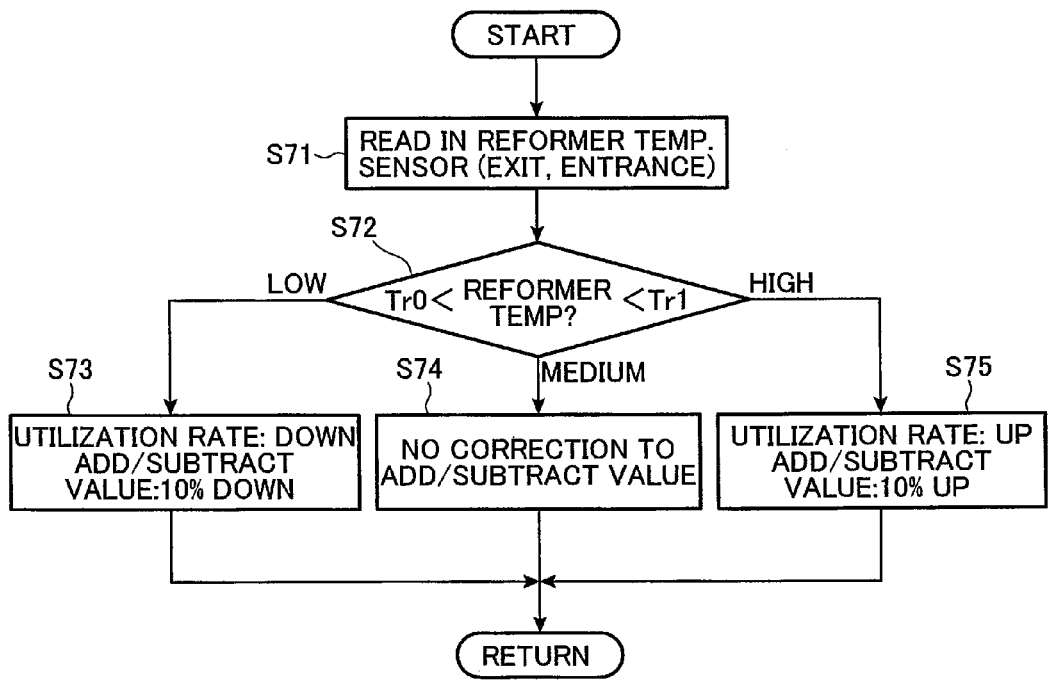
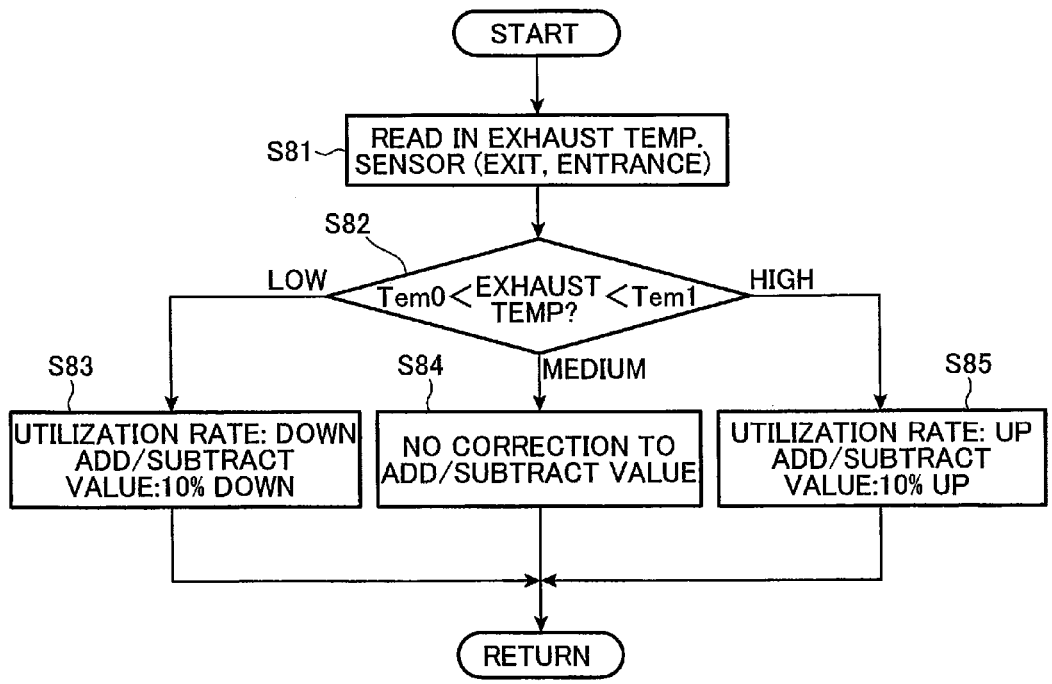

SOLID OXIDE FUEL CELL SYSTEM FOR PRODUCING VARIABLE GENERATED POWER BASED ON POWER DEMAND

TECHNICAL FIELD

This application is a 371 application of PCT/JP2011/072331 having an international filing date of Sep. 29, 2011, which claims priority to JP 2010-218367 filed Sep. 29, 2010, JP 2011-077954 filed Mar. 31, 2011, JP 2011-077955 filed Mar. 31, 2011, and JP 2011-079465 filed Mar. 31, 2011, the entire contents of which are incorporated herein by reference.

The present invention pertains to a solid oxide fuel cell, and more particularly to a solid oxide fuel cell for generating variable electrical power in response to power demand.

BACKGROUND ART

Solid oxide fuel cells ("SOFCs" below) are fuel cells which operate at relatively high temperatures in which, using an oxide ion-conducting solid electrolyte as electrolyte, with electrodes attached to both sides thereof, fuel gas is supplied to one side thereof and an oxidizer (air, oxygen, or the like) is supplied to the other side thereof.

In such SOFCs, steam or $CO_2$ is produced by the reaction between oxygen ions passed through an oxide ion-conducting solid electrolyte and fuel, thereby generating electrical and thermal energy. The electrical energy is removed from the SOFC, where it is used for various electrical purposes. On the other hand, thermal energy is used to raise the temperature of the fuel, the reformer, the water, the oxidant, and the like.

JP 2010-92836 (Patent Document 1) sets forth a fuel cell device. This fuel cell device is a solid oxide fuel cell of the type which changes generated power in response to power demand; operation is disclosed in which a fuel utilization rate is reduced more which it operates in the low load range than when it operates in the range where the power generation load is high. That is, in Patent Document 1, a proportion of fuel used for power generation with respect to the entire supplied fuel is reduced when generated power is in a low state, but on the other hand, fuel used to heat the fuel cell module and not used to generate electricity is not greatly reduced, and a large fraction of the fuel is used to heat the fuel cell module so that the fuel cell module is operated in a thermally independent manner at a temperature at which power generation can occur is maintained.

Specifically, when the module operates in the range where the generated power is low, heat generated in the fuel cell unit in association with electrical generation declines. As a result, the temperature inside the fuel cell module tends to decline. Therefore, if the fuel utilization rate is maintained at a certain level even when the module operates in the range where the power generation is low, a decline of the temperature inside the fuel cell module is induced, and it becomes difficult to maintain the temperature at which power can be generated. Therefore, fuel used to heat the fuel cell module is increased in order to operate in a thermally independent manner, even sacrificing the fuel utilization rate.

In the fuel cell device set forth in JP 2010-92836, in order to resolve these problems the fuel utilization rate is reduced when the module operates in the low load range where electrical generation is small, thereby preventing an excessive temperature drop in the fuel cell module while stably maintaining a certain high temperature state.

JP 2010-205670 (Patent Document 2), meanwhile, sets forth a method for operating a fuel cell system and fuel cell. In this fuel cell, a value is acquired which represents s sum of the fuel cell electrical loads, and the fuel utilization rate is controlled based on the acquired value. Control of the fuel utilization rate is performed by estimating the fuel cell temperature based on the value representing a sum of the fuel cell electrical loads. Then, the fuel utilization rate is controlled based on the estimated temperature. The fuel cell can therefore be operated in a thermally independent manner without the use of a temperature sensor. Also, when the value representing a sum of the electrical loads is equal to or greater than a predetermined value, a correction mode corrects the fuel utilization rate to a value equal to or greater than a reference value at which the fuel cell can be thermally independently operated. In such cases, because the temperature of the fuel cell has already been high, there is surplus heat in the fuel cell, and thermally independent operation is maintained even if the fuel utilization rate is corrected to a value equal to or greater than the reference value at which thermally independent operation is possible. System efficiency of the fuel cell system is by this means improved.

Patent Document 1 JP 2010-92836
Patent Document 2 JP 2010-205670

SUMMARY OF THE INVENTION

Problems the Invention Seeks to Resolve

As noted above, however, when the fuel utilization rate is reduced in the fuel cell in the manner set forth in JP 2010-92836, although thermal independence may be assured, fuel is increased that does not contribute to electrical generation. Therefore, when an operation is performed in which the fuel utilization rate is reduced, the problem arises that the overall energy efficiency of the solid oxide fuel cell is reduced. Since the overall energy efficiency reduces more as the module operates longer at the reduced fuel utilization rate state, the solid oxide fuel cell (SOFC), considered advantageous in the fuel efficiency over the polymer membrane fuel cells (PEFC), loses the advantage.

In particular, the solid oxide fuel cell is considered mainly used in residences, where there is a certain time period in a day, such as a night time at which the residents are in sleep, when the fuel cell is operated in a low power generation state, the overall energy efficiency of the solid oxide fuel cell should be low when used in residents. It is needed to develop a solid oxide fuel cell technology capable of operating the solid oxide fuel at a high fuel utilization rate and at high efficiency even in such low electrical generation states.

In the fuel cell set forth in JP 2010-205670, the fuel utilization rate is controlled based on a value representing a sum of fuel cell electrical loads, thereby eliminating the temperature sensor. When the value representing electrical loads is equal to or greater than a predetermined value, the fuel utilization rate is increased. Therefore, in a state in which the value is equal to or greater than a predetermined value, the fuel supply rate is reduced, thus raising the system efficiency.

In the fuel cell set forth in JP 2010-205670, however, since the fuel utilization rate is controlled based on the value representing a sum of electrical loads without the use of a temperature sensor, the problem arises that the system efficiency cannot be sufficiently improved. Also, In particular, in the fuel cell system that is operated in such a manner that the electrical load (generated power, etc.) is increased with a delay after the fuel supply rate is increased, the efficiency cannot be sufficiently improved. That is, in the fuel cell systems in which the electrical load (generated power, etc.) is increased with a delay after the fuel supply rate is increased, a large gap develops between the value representing the fuel supply amount and the value representing a sum of the electrical loads, making it difficult to accurately estimate the surplus heat in the fuel cell system, and thus impeding efficiency improvement. When power demand suddenly decreases, the generated current should be swiftly decreased to prevent a reverse power flow of the current When it happens, a difference of the physical responsiveness inevitably causes a reduction of the fuel supply rate to be delayed after a reduction of the generated current. Thereby, a large gap develops between the fuel supply amount and a sum of the electrical loads.

Specifically, in the invention set forth in JP 2010-205670, the heat (joule heat) generating during electrical generation by the fuel cells is estimated based on an amount of generated electricity, thereby estimating surplus heat. By contrast, the heat generated by a delay in electrical generation by the fuel cell device is combustion heat created by the combustion of excess fuel not used for electrical generation. Therefore, the amount of heat accumulated during the startup process cannot be estimated using the technology disclosed in JP 2010-205670.

When the fuel utilization rate is raised based on inaccurately estimated surplus heat in the fuel cell system, there is a risk that the fuel cell stack temperature could suddenly drop, and the cells are damaged. Furthermore, if a delay time is shortened when the electrical load is increased in order to reduce a gap between the value representing the fuel supply amount and the value representing a sum of the electrical loads, there is a risk that the current will be extracted from the fuel cells before sufficient fuel has reached each of the fuel cells, causing fuel cut-off. Conversely, under a condition that the temperature of the fuel cell stack rises, when a small amount of utilizable surplus heat is used, the problem arises that the temperature of the fuel cell stack rises excessively.

The object of the present invention is to provide an extremely practical solid oxide fuel cell capable of improving the overall energy efficiency while maintaining thermal independence and operating stably.

It is also a purpose of this invention to provide a solid oxide fuel cell capable of fully utilizing accumulated heat while reliably maintaining the thermal independence, and of avoiding excessive temperature rises.

Means for Resolving the Problem

In order to solve the above-described problem, the present invention is to provide a solid oxide fuel cell for generating power variable in response to power demand, comprising: a fuel cell module for generating electricity using supplied fuel; a fuel supply device configured to supply fuel to the fuel cell module; a generating oxidant gas supply device configured to supply oxidant gas for electrical generation to the fuel cell module; a combustion section for burning remaining excess fuel supplied by the fuel supply device and not utilized for electrical generation, and heating the interior of the fuel cell module; a heat storing material for storing heat generated within the fuel cell module; a power demand detection device configured to detect power demand; a temperature detection device configured to detect the temperature of the fuel cell module; and a control device configured to control, based on the power demand detected by the power demand detection device, such that the fuel utilization rate is high when generated power is large, and the fuel utilization rate is low when generated power is small, and also for changing the power actually output from the fuel cell module with a delay after changing the fuel supply rate in response to changes in power demand; wherein the control device includes a stored heat estimating circuit for estimating surplus heat stored in the heat storing material, based on the temperature detected by the temperature detection device, and the control device reduces the fuel supply rate so that the fuel utilization rate increases relative to the same generated power when it is determined that a usable amount of heat is stored in the heat storing material, in comparison with cases in which it is determined that a usable amount of heat has not been stored.

In the present invention thus constituted, the fuel supply device and generating oxidant gas device respectively supply fuel and generating oxidant gas to the fuel cell module. The fuel cell module generates electricity using the supplied fuel and generating oxidant gas, while excess fuel not used for generation is combusted in the combustion section, and the resulting heat is stored in the heat storage material. Based on a power demand detected using a power demand detection device, the control device controls the fuel supply device so that the fuel utilization rate is high when the generated power is large, and the fuel utilization rate is low when the generated power is small. In addition, the control device changes the power actually output from the fuel cell module with a delay after causing the fuel supply rate to change in response to changes in power demand. Based on the temperature detected by the temperature detection device, the stored heat estimating circuit estimates the amount of surplus heat stored in the heat storing material. When it is determined by the stored heat estimating circuit that a usable amount of heat is stored in the heat storing material, the control device reduces the fuel supply rate so that the fuel utilization rate relative to the same generated power is higher than in the case when a usable amount of heat is not stored.

Generally speaking, when power generated in a solid oxide fuel cell is small, heat generating therefrom drops, resulting in that the fuel cell module temperature drops. The fuel utilization rate is therefore reduced at times power generated is low, and fuel not used for electrical generation is combusted to heat the fuel cell module and prevent excessive temperature drops. In particular, in solid oxide fuel cells of a type in which the reformer is disposed within the fuel cell module, endothermic reactions occur inside the reformer, further causing the temperature to drop. In the present invention constituted as described above, when it is determined that a usable amount of heat is stored in the heat storing material, the fuel supply rate is reduced so that the fuel utilization rate increases. The thermal independence of the solid oxide fuel cell is thus maintained, and the overall energy efficiency of the solid oxide fuel cell is improved, while excessive temperature drops are avoided.

In the present invention constituted as described above, the stored heat amount is estimated based on the temperature detected by the temperature detection device. Therefore, the control device can accurately estimate the accumulated heat amount even if the output power is changed with a delay after the fuel supply rate is changed. This enables the amount of heat stored in the heat storing material to be fully utilized while securely avoiding the risk of sudden temperature drops in the fuel cell module. In addition, in fuel cells of the type which changes output power with a delay after changing the fuel supply rate, frequent increases and decreases of output power cause a great deal of excess fuel use and risk excessive temperature rises inside the fuel cell module, but the present invention constituted as described above enables an accurate estimation of the stored heat caused by the excess fuel arising in this manner. In general, a cooling medium is inserted into the fuel cell module to suppress the excessive temperature rise caused by excess fuel, but the present invention enables an accurate estimation of the heat amount stemming from excess fuel, the effective use of which enables excessive temperature rises to be suppressed. The amount of cooling medium inserted for the purpose of lowering the temperature can therefore be reduced, and the overall energy efficiency of the solid oxide fuel cell can be improved.

In the present invention, the stored heat estimating circuit preferably estimates the amount of surplus heat stored in the heat storing material based on a detected temperature history.

In the present invention thus constituted, the stored heat estimating circuit estimates the stored heat amount based on the temperature detection history. Therefore, the stored heat amount can be more accurately estimated compared to estimating the stored heat amount from recent detected temperatures alone. The amount of surplus heat stored in the heat storing material can therefore be fully used.

In the present invention, the control device preferably greatly increases the fuel utilization rate as the stored heat amount estimated by the stored heat estimating circuit increases.

In the present invention thus constituted, the stored surplus heat is used in large quantity when the estimated stored heat amount is large, and not much stored heat is used when the stored heat amount is small. Therefore, stored heat can be more effectively utilized, and the risk of temperature drops can be reliably avoided.

In the present invention, the control device preferably determines the fuel utilization rate based on predetermined conditions in addition to the stored heat amount estimated by the stored heat estimating circuit, and the power demand.

In the present invention thus constituted, conditions other than the stored surplus heat amount and the power demand are added for the determination of the fuel utilization rate. Therefore, stored heat can be appropriately utilized in response to the operation state of the fuel cell module.

In the present invention, the control device preferably changes the fuel utilization rate relative to changes in the estimated stored surplus heat amount much more in the range in which the estimated stored surplus heat amount estimated by the stored heat estimating circuit is large than in the range where the estimated stored surplus heat amount is small.

In the present invention thus constituted, when the estimated stored surplus heat amount is large, a large amount of stored surplus heat is utilized and excessive temperature rises can be avoided, whereas when the estimated stored surplus heat amount is small, stored surplus heat can be used a little at a time, and overcooling can be avoided.

In the present invention, the stored heat estimating circuit preferably estimates the stored surplus heat amount based on recent changes in a detected temperature in addition to the detected temperature history, and the control device changes the fuel utilization rate much more when the change in a recent detected temperature is large than when it is small.

In the present invention thus constituted, stored surplus heat is estimated by recent detected temperature changes in addition to the history of detected temperatures. Therefore, stored surplus heat can be accurately estimated based on the history, and fuel cell module temperature changes in which the heat capacity is large and for which it not easy to change the trend once the change has started can be responded to with agility, preventing excessive temperature rises and temperature drops.

In the present invention, the control device preferably changes the fuel utilization rate over a wider scale in the range where the generated power is small than in the range where the generated power is large.

In the present invention thus constituted, the fuel utilization rate is changed over a larger scale in the range where the generated power is small than in the range where the generated power is large. The risk of sudden temperature drops can therefore be reduced, and by greatly utilizing stored surplus heat in the range in which the generated power is small where there is an ample margin for improving the fuel utilization rate, the energy efficiency can be effectively increased. Under normal control, as well, in the range where the generated power is large where the fuel utilization rate is high, there is only a small margin for improving the fuel utilization rate, and thus by not significantly utilizing stored surplus heat in this interval, the energy efficiency in the range where the generated power is small can be improved by utilizing stored heat accumulated in the range where the generated power is large.

In the present invention, the control device preferably reduces changes increasing the fuel utilization rate more after the fuel cell module has degraded than before the fuel cell module had degraded.

In the present invention thus constituted, changes raising the fuel utilization rate are reduced after the fuel cell module degrades Therefore, advancement of degradation can be prevented by creating a cooling tendency in a fuel cell module which has risen in temperature during electrical generation due to degradation.

In the present invention, the stored heat estimating circuit preferably estimates the stored heat amount based on a value representing a sum of add/subtract values determined based on the detected temperature, and based on a differential value between new detected temperatures and past detected temperatures.

In the present invention thus constituted, a stored surplus heat amount is estimated based on the value representing a sum of add/subtract values and on differential values. Therefore, the stored surplus heat amount can be appropriately estimated by simple calculation, based upon which the fuel utilization rate can be appropriately set.

In the present invention, the stored heat estimating circuit preferably estimates stored surplus heat by adding or subtracting the add/subtract values determined based on the detected temperature and other predetermined conditions.

In the present invention thus constituted, the add/subtract values for estimating stored surplus heat are determined based on predetermined conditions in addition to the detected temperature. Therefore, factors other than the temperature affecting stored heat can be appropriately reflected in the estimate values.

In the present invention, the stored heat estimating circuit preferably uses positive and negative values for the add/subtract values based on the detected temperature and the generated power.

In the present invention thus constituted, increases or decreases of the amount of stored surplus heat are estimated not only by the detected temperature but also the generated power is also referred, permitting a more accurate estimation of stored surplus heat amounts.

In the present invention, the stored heat estimating circuit preferably changes the estimated stored surplus heat value more quickly as generated power increases.

In the present invention thus constituted, the estimated stored surplus heat value is more quickly changed as the generated power increases. Therefore, an estimation of stored surplus heat becomes matched more closely to the actual conditions can be achieved.

In the present invention, the stored heat estimating circuit preferably estimates the stored surplus heat amount based on a basic estimated value calculated based on a detected temperature history, and on a quick response estimated value calculated based on the rate of change of the detected temperature during an interval shorter than the history over which the basic estimated value is calculated.

In the present invention thus constituted, the power output can be changed after a safe time for dispersing fuel is secured by changing the output power with a delay following changes to the fuel supply rate, thereby avoiding the risk that cells in the fuel cell module are damaged due to fuel cut-off. Also, excess fuel increases due to the delay in outputting electrical power, and the excess fuel heats the inside of the fuel cell module. When the fuel cell module has high thermal insulation characteristics and it is necessary to perform excessive load-following control under which output power is frequently raised and lowered, it occurs that excessive temperature rises are caused inside the fuel cell module due to the accumulation of heat caused by the excess fuel. In general, the amount of generating oxidant gas supplied as a cooling medium is increased in order to lower the temperature inside the fuel cell module. But since the temperature drops caused by the insertion of cooling medium is achieved by discharging a usable surplus heat amount in the fuel cell module together with the exhaust, the overall energy efficiency drops. The solid oxide fuel cell of the present invention suppresses excessive temperature rises by reducing the introduced fuel supply rate in such a way that excessively accumulated surplus heat is utilized while maintaining thermal independence, and furthermore simultaneously achieves a high fuel utilization rate operation. To achieve this, the stored heat estimating circuit estimates stored surplus heat based on the detected temperature. Therefore, estimation can be carried out by accurately considering the effects of stored heat arising from the excess fuel produced by delaying the output of power relative to the supply of fuel. Excessive temperature rises occurring when there is excessive load following can thus be reliably prevented while the energy efficiency is raised.

Furthermore, in the present invention thus constituted, the stored heat estimating circuit estimates the stored surplus heat amount based on a basic estimated value calculated based on a detected temperature history, and on a quick response estimated value calculating the rate of change of the detected temperature during an interval shorter than the history over which the basic estimated value is calculated. Therefore, by estimating the stored surplus heat amount which will serve as a base using the history of the extremely gradually changing detected temperature, and using the rapid response estimated value, the stored heat amount estimated value can promptly respond to the trends of the change in the detected temperature. So by using an estimate for the stored surplus heat amount, which is inherently difficult to estimate, the stored surplus heat can be effectively utilized while avoiding the risk of excessive temperature rises and temperature drops, without the use of any special detection devices.

In the present invention, multiple temperature detection devices may be used and wherein the stored heat estimating circuit estimates the amount of stored surplus heat accumulated in the heat storing material based on the past history of multiple temperatures detected by the multiple temperature detection devices; and based on the stored surplus heat amount estimated by the stored heat estimating circuit and on the power demand detected by the power demand detection device, the control device determines a fuel utilization rate such that for the same generated power, the fuel utilization rate increases as the estimated stored surplus heat amount increases, and controls the fuel supply device based on this fuel utilization rate.

In the present invention thus constituted, the stored heat estimating circuit estimates the stored surplus heat amount accumulated in the heat storing material based on multiple detected temperatures detected by multiple temperature detection devices, and the control device controls the fuel utilization rate so that for the same generated power, the fuel utilization rate increases as the estimated stored heat amount increases. By utilizing the stored heat accumulated in the heat storing material, the fuel supply rate can be reduced and the overall energy efficiency of the solid oxide fuel cell improved.

Also, because the stored surplus heat amount is estimated based on detected temperature, the estimated stored surplus heat amount fully reflects the amount of excess fuel, and the estimated stored surplus heat amount is highly reliable. In particular, the stored surplus heat amount can be accurately estimated when generated power is increased, even in the type of fuel cell in which generated power is increased with a delay. This enables the amount of surplus heat stored in the heat storing material to be fully utilized while avoiding the risk of temperature drops and the like in the fuel cell module.

Furthermore, in the present invention thus constituted, the stored surplus heat amount is estimated based on multiple temperatures detected by the multiple temperature detection devices. Therefore, the risk of partial temperature drops or temperature rises within the fuel cell module can be avoided, and the stored surplus heat amount can be fully utilized.

In the present invention, the stored heat estimating circuit preferably estimates the stored surplus heat amount by treating the high temperature among the multiple detected temperatures as a high weighting factor when increasing the estimated stored heat amount to increase the fuel utilization rate, and by treating the low temperature among the multiple detected temperatures as a high weighting factor when decreasing the estimated stored heat amount to decrease the fuel utilization rate.

In the present invention thus constituted, the stored surplus heat amount estimation is performed using the high detected temperature as a high weighting factor when increasing the fuel utilization rate, and the low detected temperature is treated as a high weighting factor when decreasing the fuel utilization rate. Therefore, the stored surplus heat amount can be estimated by using the detected temperatures on the respective safe sides relative to excessive temperature rises and temperature drops.

In the present invention, the multiple temperature detection devices are preferably disposed so that the reformer temperature and the fuel cell stack temperature are respectively reflected, and the control device suppresses the rise in the fuel utilization rate when the reformer temperature is at or below a predetermined usage-suppressing reformer temperature.

In the present invention thus constituted, increases in the fuel utilization rate are suppressed when the reformer temperature is at or below a predetermined use-suppressing reformer temperature. Therefore, degradation of reformer performance can be prevented when the reformer is excessively cooled by endothermic reactions or the like within the reformer. Damage to the fuel cell stack associated with degraded reformer performance can also be avoided.

In the present invention, the fuel cell stack is preferably constituted of multiple fuel cell units arrayed in approximately a rectangular form. One of the multiple temperature detection devices is disposed to reflect the temperature of the individual fuel cell unit positioned at a vertex of the rectangle. One of the multiple temperature detection devices is disposed to reflect the temperature of the individual fuel cell unit positioned at the midpoint between two vertices of the rectangle; and the control device suppresses increases in the fuel utilization rate when the temperature of an individual fuel cell unit positioned at a rectangle vertex is at or below a predetermined usage-suppressing cell unit temperature.

In the present invention thus constituted, increases in the fuel utilization rate are suppressed when the temperature of an individual fuel cell unit positioned at a rectangle vertex is at or below the temperature of a predetermined usage-suppressing cell unit temperature. Therefore, increases in the fuel utilization rate are suppressed based on the temperature of an individual fuel cell unit at a low temperature within the fuel cell stack, and damage caused by excessive cooling of a portion of the cell units can be prevented.

Effect of the Invention

Using the solid oxide fuel cell of the present invention, the overall energy efficiency can be improved while maintaining the thermal independence and achieving stable operation.

Also, According to the solid oxide fuel cell of the present invention, the stored surplus heat amount can be fully utilized while reliably maintaining the thermal independence, and excessive temperature rises can be avoided.

BRIEF DESCRIPTION OF FIGURES

FIG. 12: A stored heat amount estimate table used to estimate the amount of heat accumulated in a heat storing material in the solid oxide fuel cell of the first embodiment of the present invention.

FIG. 30: A map showing current limits vs. generating current and detected temperature.

FIG. 31: A timing chart showing an example of the effect of the second embodiment of the present invention.

FIG. 34: A flow chart showing the procedure for calculating an add/subtract value according to a variant example of the second embodiment of the present invention.

FIG. 35: A flow chart showing the procedure for calculating an add/subtract value according to a variant example of the second embodiment of the present invention.

EMBODIMENTS OF THE INVENTION

Next, referring to the attached drawings, we discuss a solid oxide fuel cell (SOFC) according to embodiments of the present invention.

Figure 1:
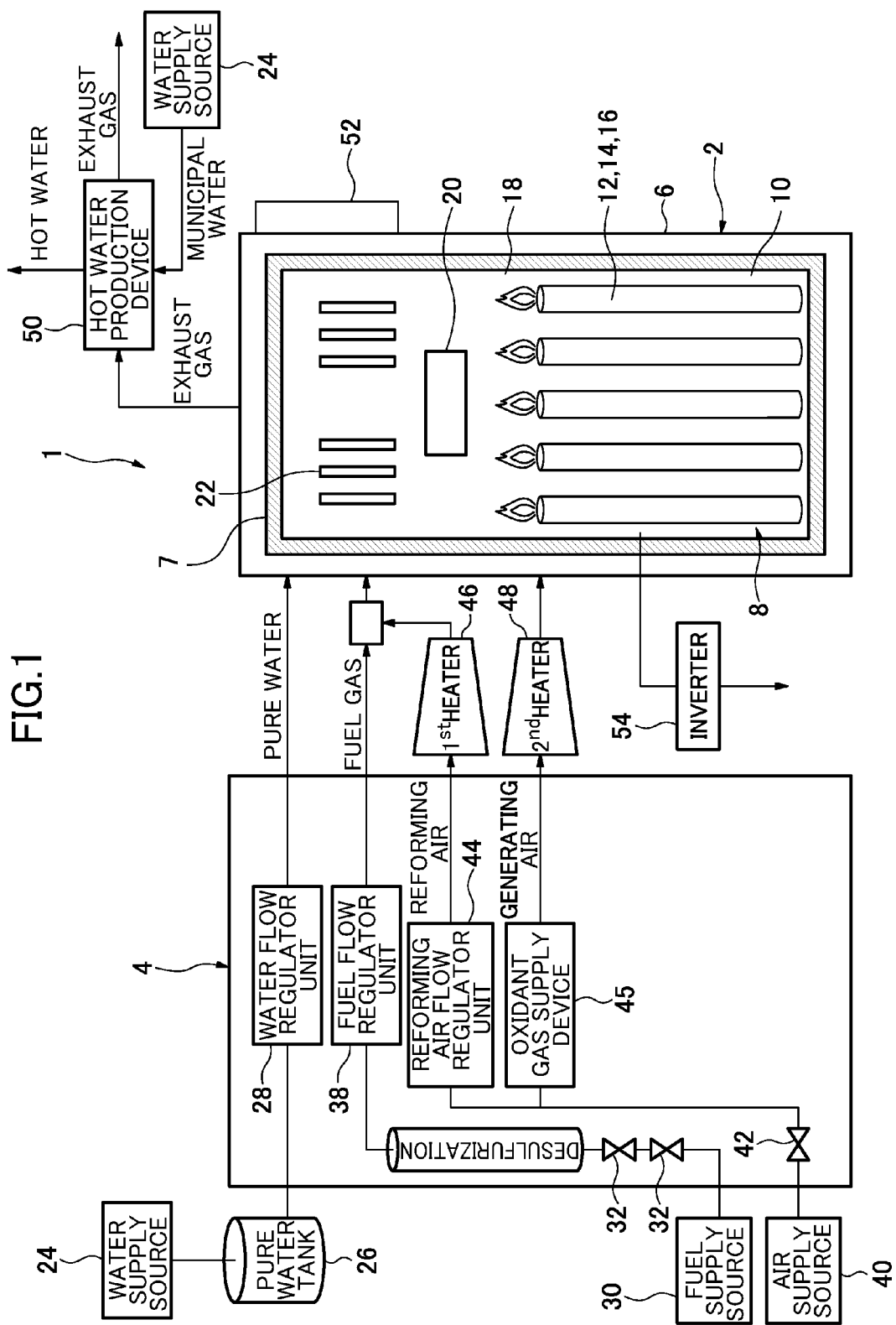
FIG. 1: An overview diagram showing a fuel cell device according to an embodiment of the present invention.

FIG. 1 is an overview diagram showing a solid oxide fuel cell (SOFC) according to an embodiment of the present invention. As shown in FIG. 1, the solid oxide fuel cell (SOFC) of this embodiment of the present invention comprises a fuel cell module 2 and an auxiliary unit 4.

The fuel cell module 2 comprises a housing 6. A sealed space 8 is formed within the housing 6 and surrounded by an insulating material 7. A fuel cell assembly 12 for carrying out the electrical generating reaction between fuel gas and oxidizer (air) is disposed in a generating chamber 10 in the lower portion of the sealed space 8. The fuel cell assembly 12 comprises ten fuel cell stacks 14 (see FIG. 5), and each of the fuel cell stacks 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the sealed space 8 of the fuel cell module 2; excess fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. Furthermore, an air heat exchanger 22 is disposed on the top of this reformer 20 for receiving heat from the reformer 20 and heating air so as to restrain temperature drops in the reformer 20.

Next, the auxiliary unit 4 comprises a pure water tank 26 for holding water from a municipal or other water supply source 24 and filtering it into pure water, and a water flow regulator unit 28 (a "water pump" or the like driven by a motor) for regulating the flow rate of water supplied from the reservoir tank. The auxiliary unit 4 is further furnished with a gas shutoff valve 32 for shutting off the fuel gas supply from a fuel supply source 30 such as municipal gas or the like, and a fuel flow regulator unit 38 (a "fuel pump" or the like driven by a motor) for regulating the flow rate of fuel gas. Furthermore, an auxiliary unit 4 comprises an electromagnetic valve 42 for shutting off air serving as an oxidizer and supplied from an air supply source 40, a reforming air flow regulator unit 44 and oxidant gas supply device 45 (an "air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
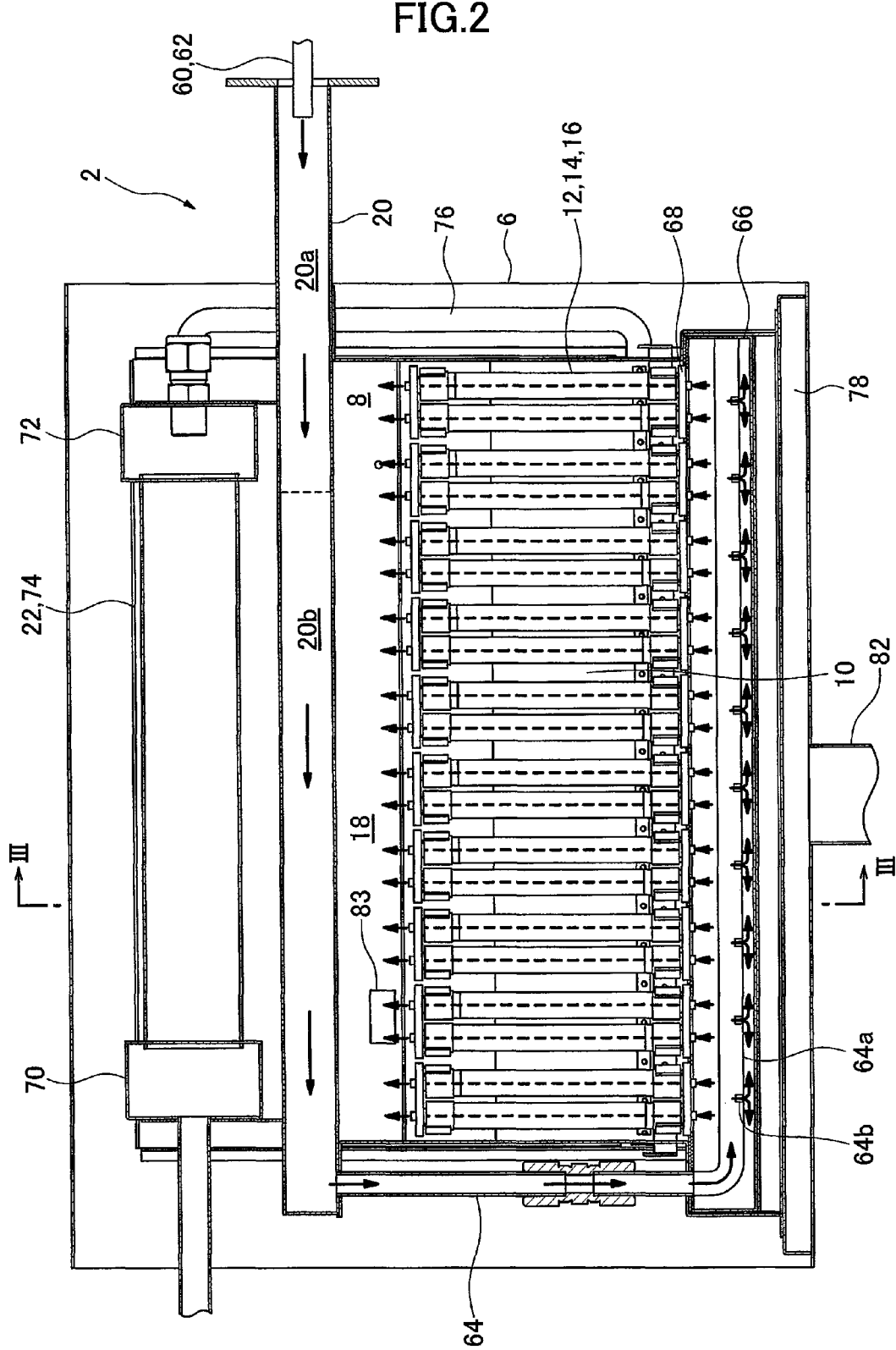
FIG. 2: A front elevation cross section showing a fuel cell module in a fuel cell device according to an embodiment of the present invention.
Figure 3:
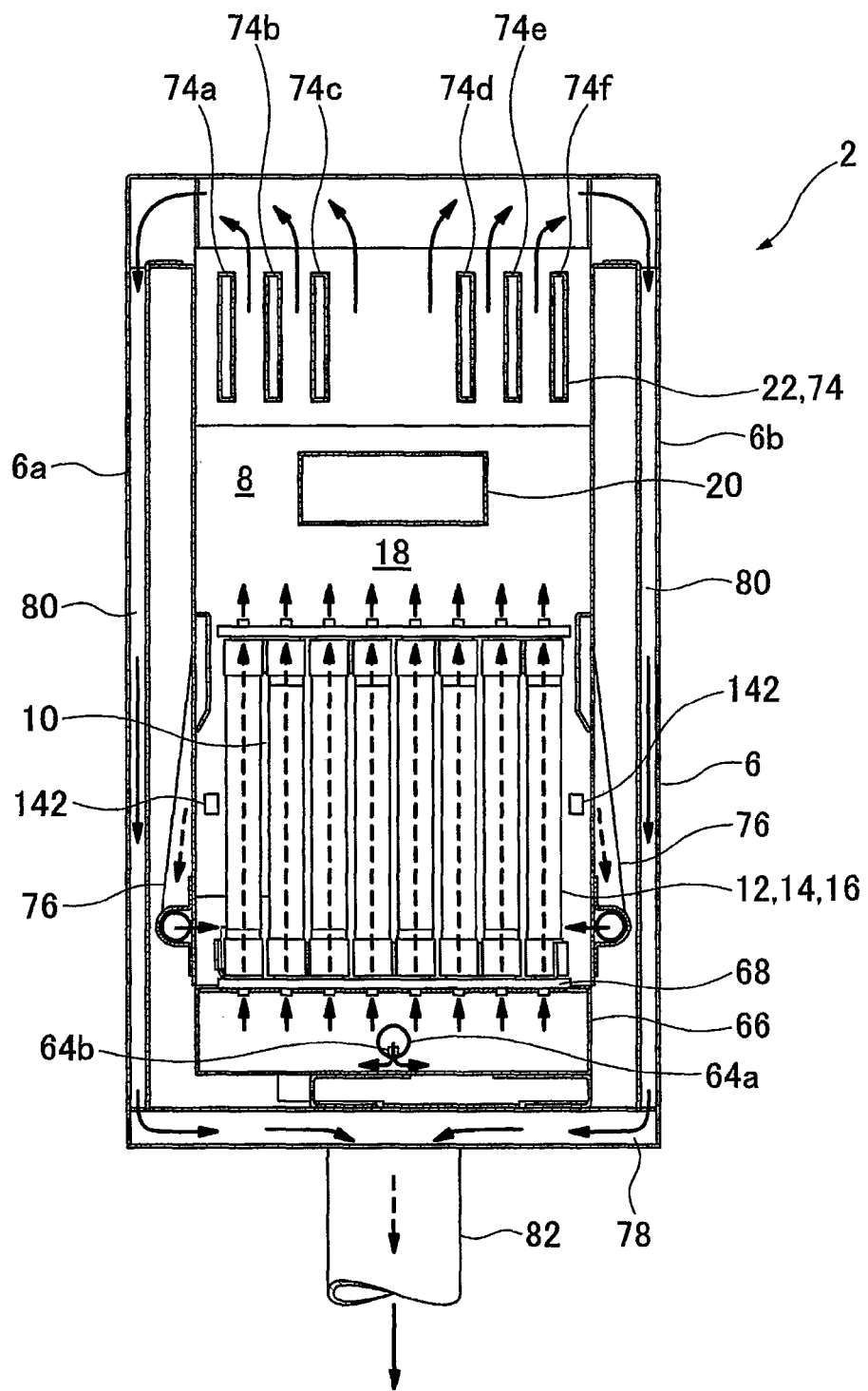
FIG. 3: A sectional diagram along line in FIG. 2.

Next, the internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention; FIG. 3 is a sectional diagram along line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a steam generating section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, and then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air heat exchanger 22 is provided over the reformer 20. This air heat exchanger 22 comprises an air concentration chamber 70 on the upstream side and two air distribution chambers 72 on the downstream side; this air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
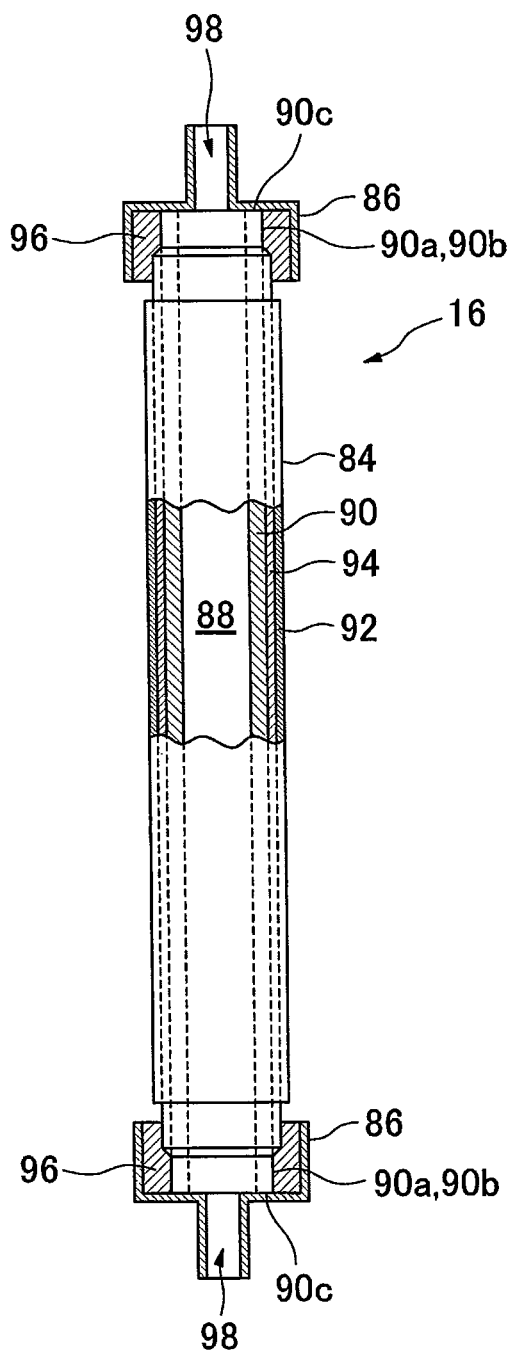
FIG. 4: A partial cross section showing a fuel cell unit in a fuel cell device according to an embodiment of the present invention.

Next, referring to FIG. 4, we discuss the fuel cell unit 16. FIG. 4 is a partial section showing a solid oxide fuel cell (SOFC) fuel cell unit according to an embodiment of the present invention.

As shown in FIG. 4, the fuel cell unit 16 comprises a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure, therefore we will here discuss specifically the internal electrode terminal 86 attached at the top and side. The top portion 90a of the internal electrode layer 90 comprises an outside perimeter surface 90b and top end surface 90c, exposed to the electrolyte layer 94 and the external electrode layer 92. The internal electrode terminal 86 is connected to the outer perimeter surface of the internal electrode layer 90 through a conductive seal material 96, and is electrically connected to the internal electrode layer 90 by making direct contact with the top end surface 90c of the internal electrode layer 90. A fuel gas flow path 98 communicating with the internal electrode layer 90 fuel gas flow path 88 is formed at the center portion of the internal electrode terminal 86.

The internal electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The external electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
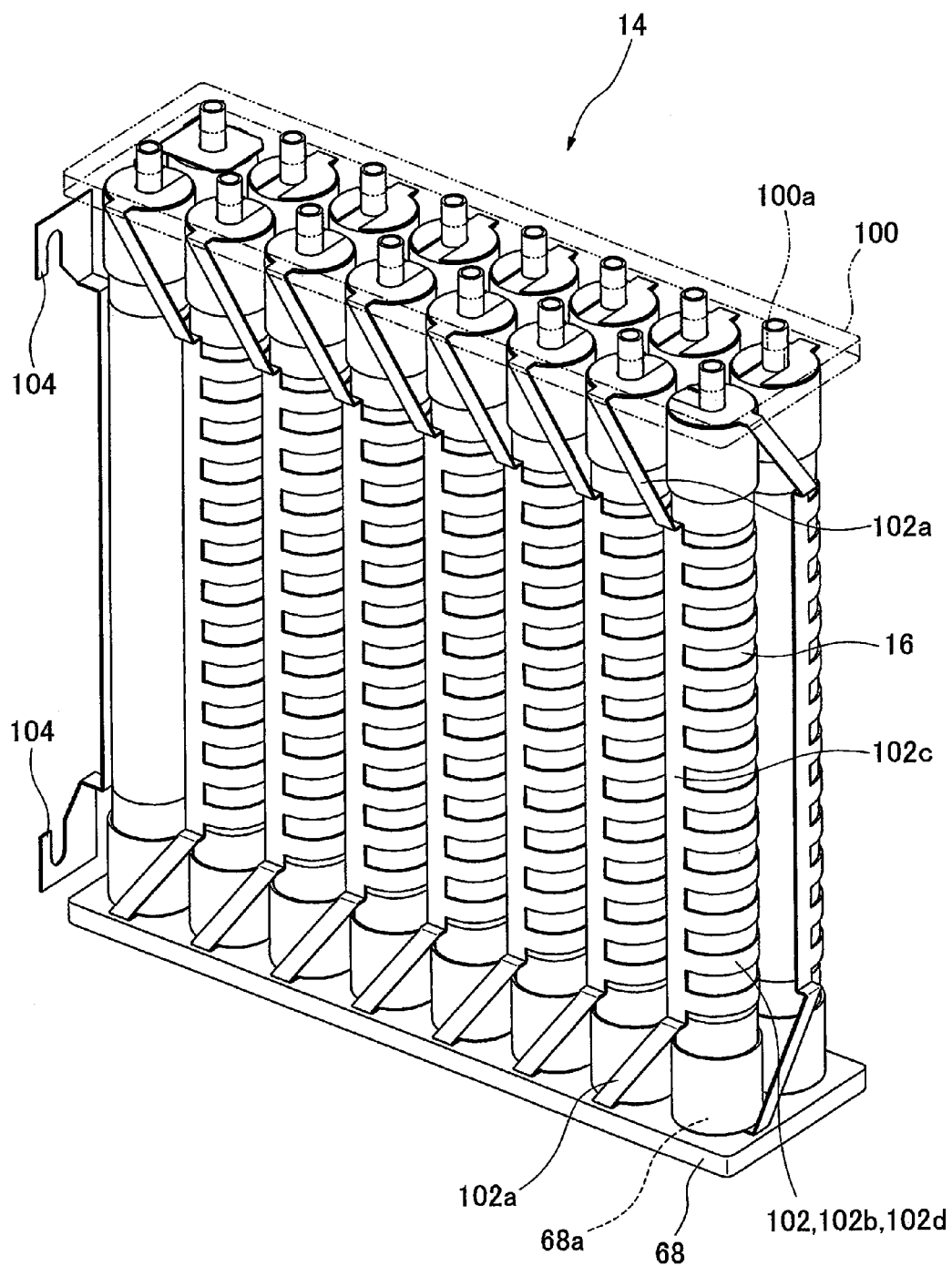
FIG. 5: An oblique view showing a fuel cell stack in a fuel cell device according to an embodiment of the present invention.

Next we discuss the fuel cell stack 14, referring to FIG. 5. FIG. 5 is a perspective view showing the fuel cell stack in a solid oxide fuel cell (SOFC) according to an embodiment of the present invention.

As shown in FIG. 5, the fuel cell stack 14 comprises sixteen fuel cell units 16; the top inside and bottom inside of these fuel cell units 16 are respectively supported by a lower support plate 68 and upper support plate 100. Through holes 68a and 100a, through which the internal electrode terminal 86 can penetrate, are provided on this lower support plate 68 and upper support plate 100.

In addition, a collector 102 and an external terminal 104 are attached to the fuel cell unit 16. This collector 102 is integrally formed by a fuel electrode connecting portion 102a, which is electrically connected to the internal electrode terminal 86 attached to the internal electrode layer 90 serving as the fuel electrode, and by an air electrode connecting portion 102b, which is electrically connected to the entire external perimeter of the external electrode layer 92 serving as the air electrode. The air electrode connecting portion 102b is formed of a vertical portion 102c extending vertically along the surface of the external electrode layer 92, and multiple horizontal portions 102d extending in the horizontal direction from this vertical portion 102c along the surface of the external electrode layer 92. The fuel electrode connecting portion 102a extends linearly in an upward or downward diagonal direction from the vertical portion 102c of the air electrode connecting portion 102b toward the internal electrode terminals 86 positioned in the upper and lower directions on the fuel cell unit 16.

Furthermore, the internal electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Figure 6:
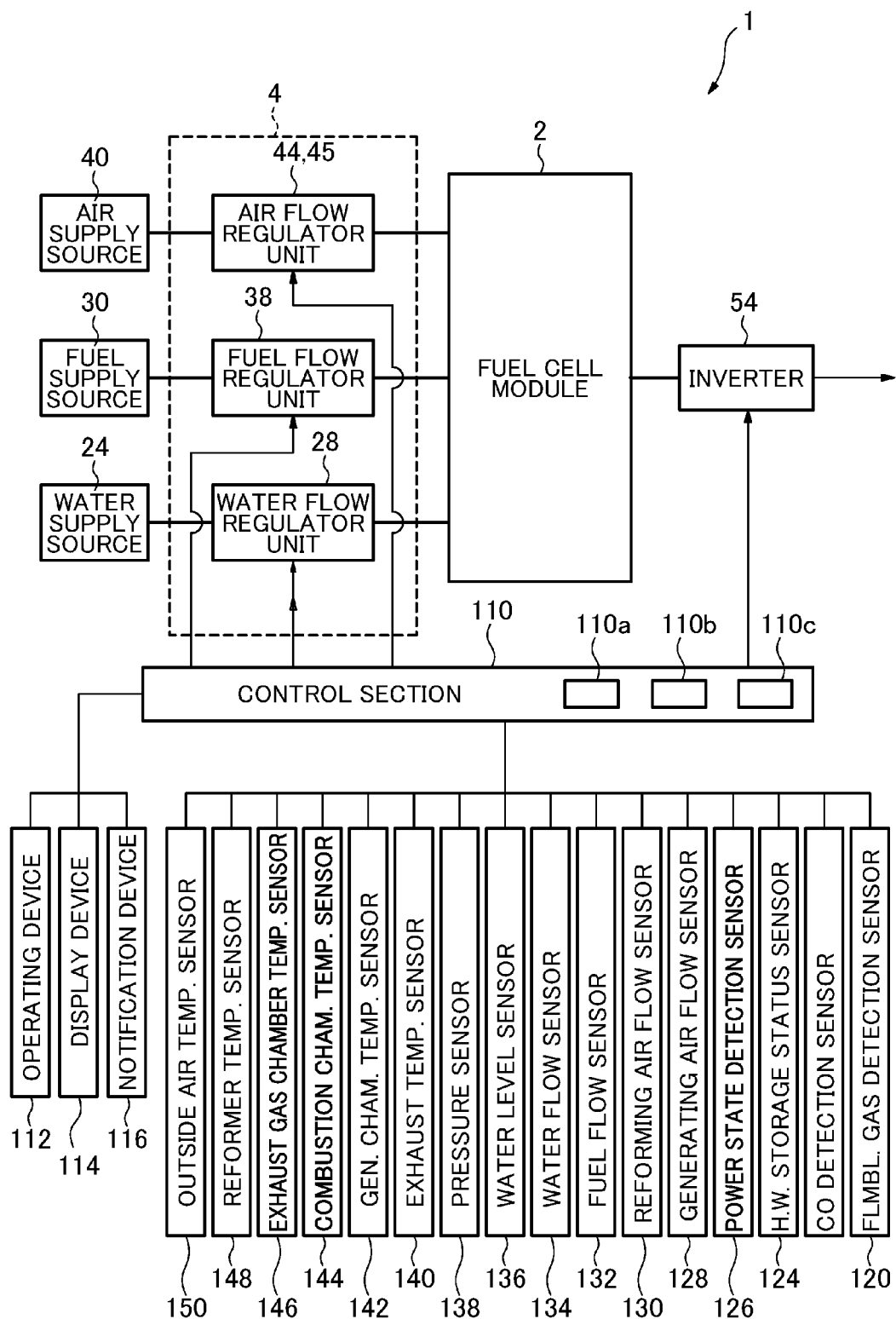
FIG. 6: A block diagram showing a fuel cell device according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 comprises a control section 110; an operating device 112 provided with operating buttons such as "ON" or "OFF" for user operation, a display device 114 for displaying various data such as a generator output value (Watts), and a notification device 116 for issuing warnings during abnormal states and the like are connected to this control section 110. This notification device 116 may be connected to a remote control center to inform the control center of abnormal states.

Next, signals from the various sensors described below are input to the control section 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow detection sensor 128 detects the flow rate of generator air supplied to the generating chamber 10.

A reforming air flow rate sensor 130 detects the rate of reforming air flow supplied to the reformer 20.

A fuel flow rate sensor 132 detects the flow rate of fuel gas supplied to the reformer 20.

A water flow rate sensor 134 detects the flow rate of pure water supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber.

A reformer temperature sensor 148 detects the temperature of the reformer 20 and calculates the reformer 20 temperature from the intake and exit temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control section 110; the control section 110 sends control signals to the water flow regulator unit 28, the fuel flow regulator unit 38, the reforming air flow regulator unit 44, and the oxidant gas supply device 45 based on data from the sensors, and controls the flow rates in each of these units.

Figure 7:
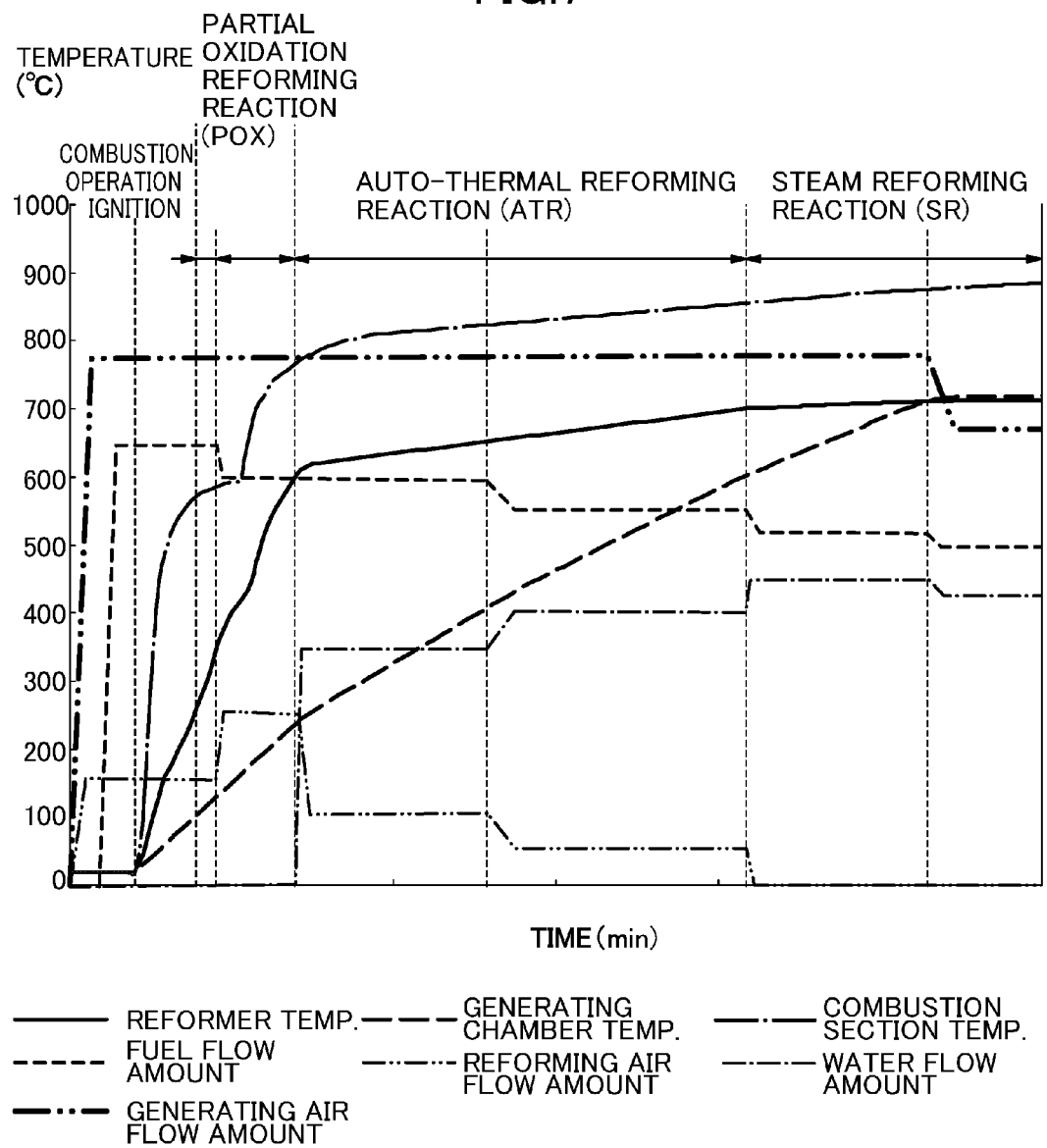
FIG. 7: A timing chart showing the operation when a fuel cell device is started, according to an embodiment of the present invention.

Next, referring to FIG. 7, we discuss the operation of a solid oxide fuel cell (SOFC) according to the present embodiment at the time of start up. FIG. 7 is a timing chart showing the operations of a solid oxide fuel cell (SOFC) according to an embodiment of the present invention at the time of start up.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow regulator unit 44 to the reformer 20 on the fuel cell module 2. At the same time, generating air is supplied from the oxidant gas supply device 45 to the air heat exchanger 22 of the fuel cell module 2, and this generating air reaches the generating chamber 10 and the combustion chamber 18.

Immediately thereafter, fuel gas is also supplied from the fuel flow regulator unit 38, and fuel gas into which reform area is blended passes through the reformer 20, the fuel cell stack 14, and the fuel cell unit 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises into the sealed space 8 of the fuel cell module 2, the fuel gas, which includes reforming air in the reformer 20 is warm, as is the generating air inside the air heat exchanger 22.

At this point, fuel gas into which reform area is blended is supplied to the reformer 20 by the fuel flow regulator unit 38 at the reforming air flow regulator unit 44, therefore the partial oxidation reforming reaction POX given by Expression (1) proceeds. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel stack 14 is also heated from above, enabling as a result an essentially uniform rise in temperature in the vertical direction of the fuel cell stack 14. Even though the partial oxidation reforming reaction POX is progressing, the ongoing combustion reaction between fuel gas and air is continued in the combustion chamber 18.

$$C_mH_n + xO_2 \rightarrow aCO_2 + bCO + CH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow regulator unit 28, the fuel flow regulator unit 38, and the reforming air flow regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

When the reformer temperature sensor 148 detects that the reformer 20 has reached a predetermined temperature (e.g., 700° C.) following the start of the auto-thermal reforming reaction ATR shown as Expression (2), the supply of reforming air by the reforming air flow regulator unit 44 is stopped, and the supply of steam by the water flow regulator unit 28 is increased. By this means, a gas containing no air and only containing fuel gas and steam is supplied to the reformer 20, where the steam reforming reaction SR of Expression (3) proceeds.

$$C_mH_n + xO_2 + yH_2O \rightarrow aCO_2 + bCO + CH_2 \qquad (2)$$

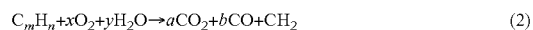

$$C_mH_n + xH_2O \rightarrow aCO_2 + bCO + CH_2 \qquad (3)$$

This steam reforming reaction SR is an endothermic reaction, therefore the reaction proceeds as a thermal balance is maintained with the combustion heat from the combustion chamber 18. At this stage, the fuel cell module is in the final stages of startup, therefore the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, a quantity of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
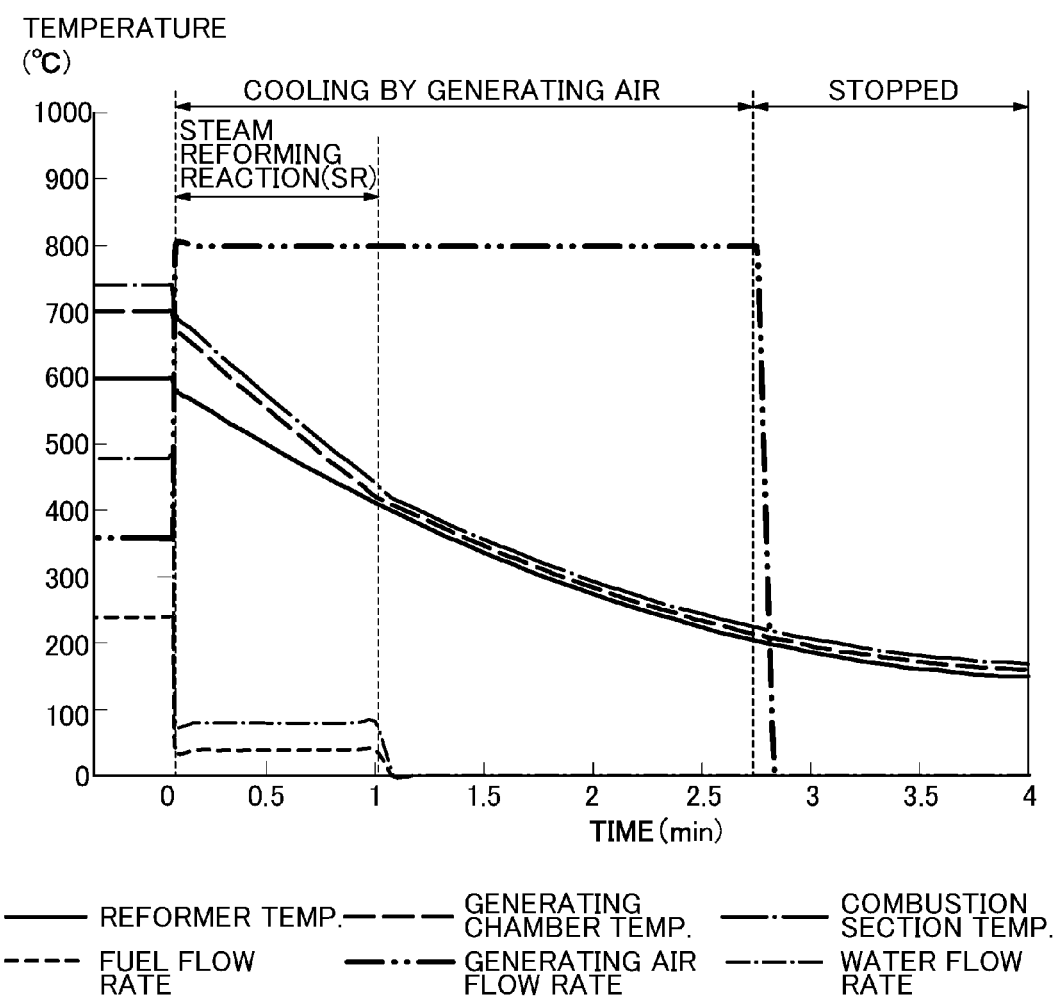
FIG. 8: A timing chart showing the operation when a fuel cell device is stopped, according to an embodiment of the present invention.

Next, referring to FIG. 8, we discuss the operation upon stopping the solid oxide fuel cell (SOFC) of the present embodiment. FIG. 8 is a timing chart showing the operations which occur upon stopping the solid oxide fuel cell (SOFC) of the present embodiment.

As shown in FIG. 8, when stopping the operation of the fuel cell module 2, the fuel flow regulator unit 38 and the water flow regulator unit 28 are first operated to reduce the quantity of fuel gas and steam being supplied to the reformer 20.

When stopping the operation of the fuel cell module 2, the quantity of generating air supplied by the reforming air flow regulator unit 44 into the fuel cell module 2 is being increased at the same time that the quantity of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e.g. 200° C.; when the predetermined temperature is reached, the supply of generating air from the oxidant gas supply device 45 is stopped.

Thus in the present embodiment the steam reforming reaction SR by the reformer 20 and cooling by generating air are used in combination, therefore when the operation of the fuel cell module 2 is stopped, that operation can be stopped relatively quickly.

Next, referring to the FIGS. 9 through 17, we discuss the control of a solid oxide fuel cell 1 according to a first embodiment of the present invention.

Figure 9:
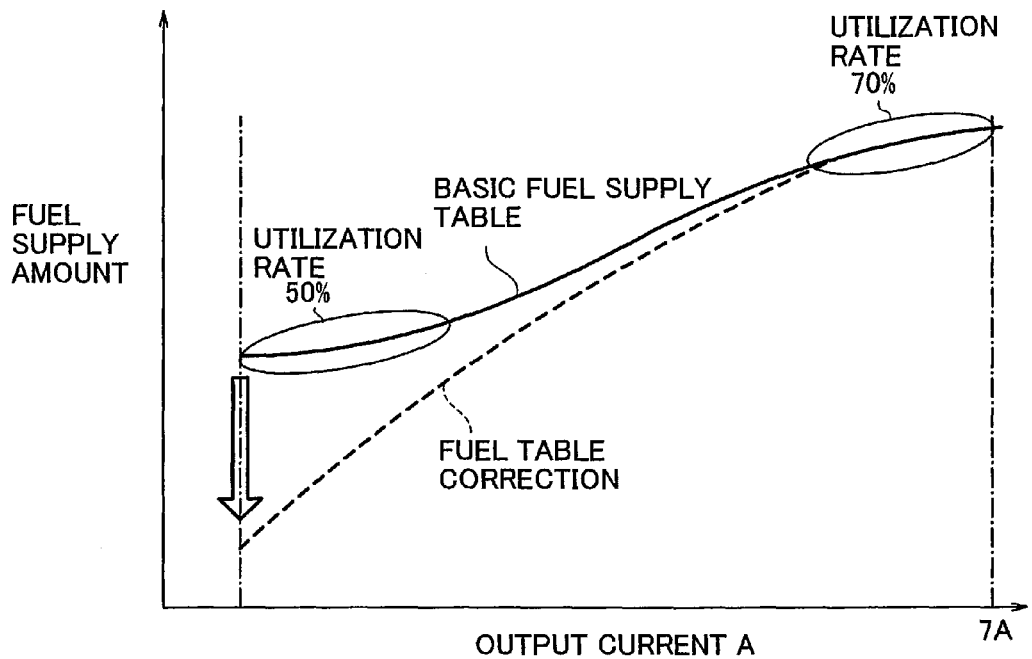
FIG. 9: A graph showing the relationship between output current and fuel supply rate in the solid oxide fuel cell of the first embodiment of the present invention.

FIG. 9 is a graph showing the relationship between the output current and the fuel supply rate in the solid oxide fuel cell 1 of the first embodiment of the present invention.

Figure 10:
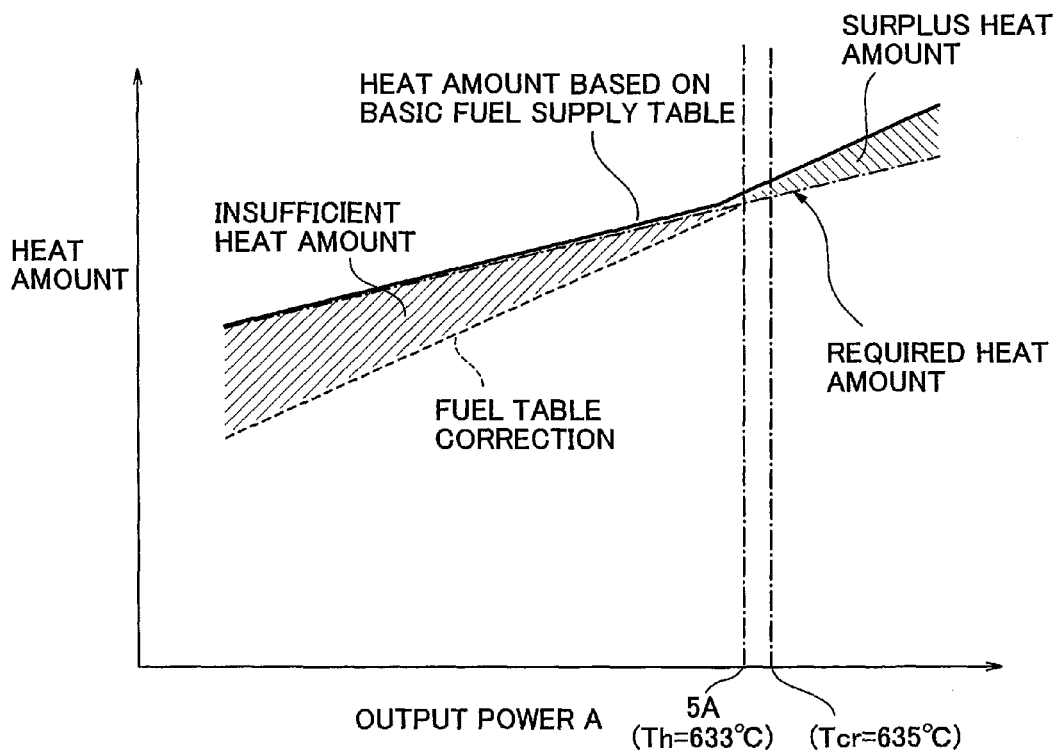
FIG. 10: A graph showing the relationship between output current and amount of heat produced by supplied fuel in the solid oxide fuel cell of the first embodiment of the present invention.

FIG. 10 is a graph showing the relationship between the output current and the amount of heat produced by the supplied fuel in the solid oxide fuel cell 1 of the first embodiment of the present invention.

First, as shown by the solid line in FIG. 9, the solid oxide fuel cell 1 of the present embodiment is capable of changing its electrical output at or below the rated output power of 700 W (output current 7 A) in response to power demand. The fuel supply rate (L/min) necessary to output the required powers are set by a Basic Fuel Supply Table and shown along the solid line in FIG. 9. A control section 110, which serves as a control device, determines a fuel supply rate based on the fuel supply rate table in response to the power demand detected by an electrical power state detecting sensor 126, which serves as a power demand detection device. The fuel flow regulator unit 38 serving as a fuel supply device is controlled based on the fuel supply rate.

The supply rate of fuel needed for generation of the required electricity changes in proportion to the output power (output current), but as shown by the solid line in FIG. 9, the fuel supply rate set in the basic fuel supply rate table do not change in proportion to the output currents. This is because when the fuel supply rate is reduced in proportion to a reduction of the output power, it becomes impossible to maintain the fuel cell units 16 in the fuel cell module 2 at the temperature at which the fuel cell units 16 are capable of generating electricity. Therefore, in the present embodiment, the basic fuel supply table is set to achieve a fuel utilization rate of approximately 70% when the fuel cell units 16 generate a large power or output a current in the range near 7 A, and is set to achieve a fuel utilization rate of approximately 50% when the fuel cell units 16 generate a small power or output a current in a range near 2 A. Thus, by reducing the fuel utilization rate in the range where the generated power is small and burning fuel not used for generation of electricity to heat the reformer 20 and other members, the temperature of the fuel cell units 16 can be suppressed from falling, and the temperature sufficiently higher for generation of electricity can be maintained in the fuel cell module 2.

However, a reduction of the fuel utilization rate causes an increase of fuel not contributing to electrical generation, so the energy efficiency of the solid oxide fuel cell 1 declines in the range where the generated power is small. In the solid oxide fuel cell 1 of the present embodiment, a fuel table change circuit 110a built into the control section 110 changes or corrects the fuel supply rate set in the basic fuel supply table in response to predetermined conditions and reduces the fuel supply rate down to those as shown along the dotted line in FIG. 9, so that the fuel utilization rate in the range where the generated power is small is raised. The energy efficiency of the solid oxide fuel cell 1 is thus improved.

FIG. 10 is a graph schematically showing the relationship between the output current generated when the fuel is supplied according to the basic fuel supply table and the amount of heat generated from the supplied fuel in the solid oxide fuel cell 1 of the present embodiment. As shown by the dot-and-dash line in FIG. 10, the amount of heat needed to make the fuel cell module 2 thermally autonomous and to operate the fuel cell module 2 stably increases linearly with an increase of the output current. The solid line in FIG. 10 shows the heat amount generated when fuel is supplied according to the basic fuel supply table. In this embodiment, the necessary heat amount indicated by the dot-and-dash line and the amount of heat generated from the fuel supplied in accordance with the basic fuel supply table shown by the solid line are approximately matched in the region where the output current is below 5 A, which corresponds to a medium power generation.

Furthermore, in the region where the output current is above 5 A, the heat amount shown by the solid line which is generated at the fuel supply rates according to the basic fuel supply table is greater than the heat amount shown by the dot-and-dash line, which is the minimum heat required for thermal independence. The amount of surplus heat defined between the solid line and the dotted line is accumulated in the insulating material 7 serving as a heat storing material. There is also a correlation between the output current from the solid oxide fuel cell 1 and the temperature of the fuel cell units 16 in the fuel cell module 2 which is measured when this current is being output in a steady state. Since the temperature of the fuel cell units 16 should be raised in order to increase the output current, the temperature of the fuel cell units 16 is high when the output current is high. In the present embodiment, an output current of 5 A corresponds to approximately 633° C., which is the heat storage temperature Th. Therefore in the solid oxide fuel cell 1 of the present embodiment, a larger amount of heat is accumulated in the insulating material 7 when the output current is 5 A and the heat storage temperature Th=approximately 633° C. or above.

The heat storage temperature Th is set to a temperature corresponding to 500 W (an output current of 5 A), which is larger than the 350 W representing the midpoint value of the generated power range of 0 W-700 W. In the rage where the output current is 5 A or below, the heat amount generated at fuel supply rates defined in the basic fuel supply table is set to be approximately the same as the minimum heat amount required for thermal independence (the heat amount in the basic fuel supply table is slightly higher). Therefore as shown by the dotted line example in FIG. 10, the heat amount falls short of the heat amount needed for thermal independence when the fuel supply rate from the basic fuel supply table is corrected and reduced.

In the present embodiment, as described below, a correction is made in the range where the generated power is mall in order to temporarily reduce the fuel supply rate set by the basic fuel supply table and raise the fuel utilization rate. At the same time, the balance of the heat amount caused by the reduction of the fuel supply rate defined in the basic fuel supply table is made up for by using the heat amount stored in the insulating material 7 which is accumulated while the fuel cell module 2 is operating in a temperature region above the heat storage temperature Th. Note that in the present embodiment, because the heat capacity of the insulating material 7 is extremely high, the heat amount accumulated in the insulating material 7 can be used over a period of more than 2 hours when the fuel cell module 2 is operating in the range where the generated power is small after operating to generate high power for a predetermined time, and the fuel utilization rate can be raised by performing a correction to reduce the fuel supply rate during this interval.

Also, in the present embodiment, in the rage where the output current is 5 A and the heat storage temperature Th=approximately 633° C. or above, the basic fuel supply table is set so that a greater amount of heat is accumulated in the insulating material 7, but in the rage where the output current is 5 A or above, the basic fuel supply table may also be set to generate heat approximately equal to the minimum heat required for thermal independence (the heat amount in the basic fuel supply table is slightly higher). That is, in a range where the generated power is large, the operating temperature of the fuel cell module 2 is higher than when generated power is small Therefore, even if the fuel supply rate is set to generate the minimum heat required for thermal independence, the heat amount usable when the generated power is small can be accumulated in the insulating material 7. In this embodiment, in which the fuel supply rate is set high when the generated power is high, the necessary amount of surplus heat can be reliably accumulated in the insulating material 7 during the short evening time period when power demand is at peak.

Next, referring to the FIGS. 11 through 17, we discuss the specific control of a solid oxide fuel cell 1 according to the first embodiment of the present invention.

Figure 11:
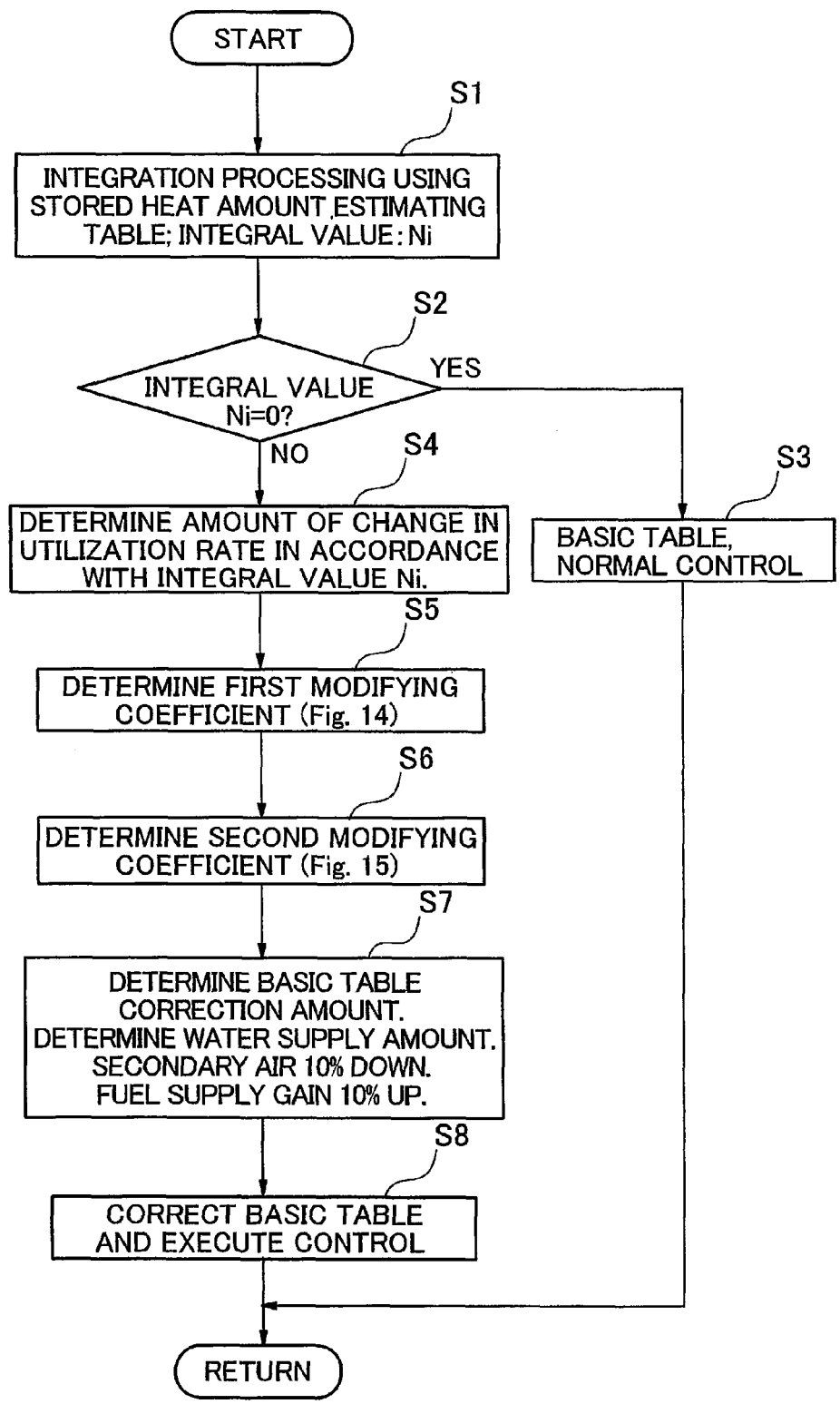
FIG. 11: A control flow chart of the fuel supply rate in the solid oxide fuel cell of the first embodiment of the present invention.
Figure 13:
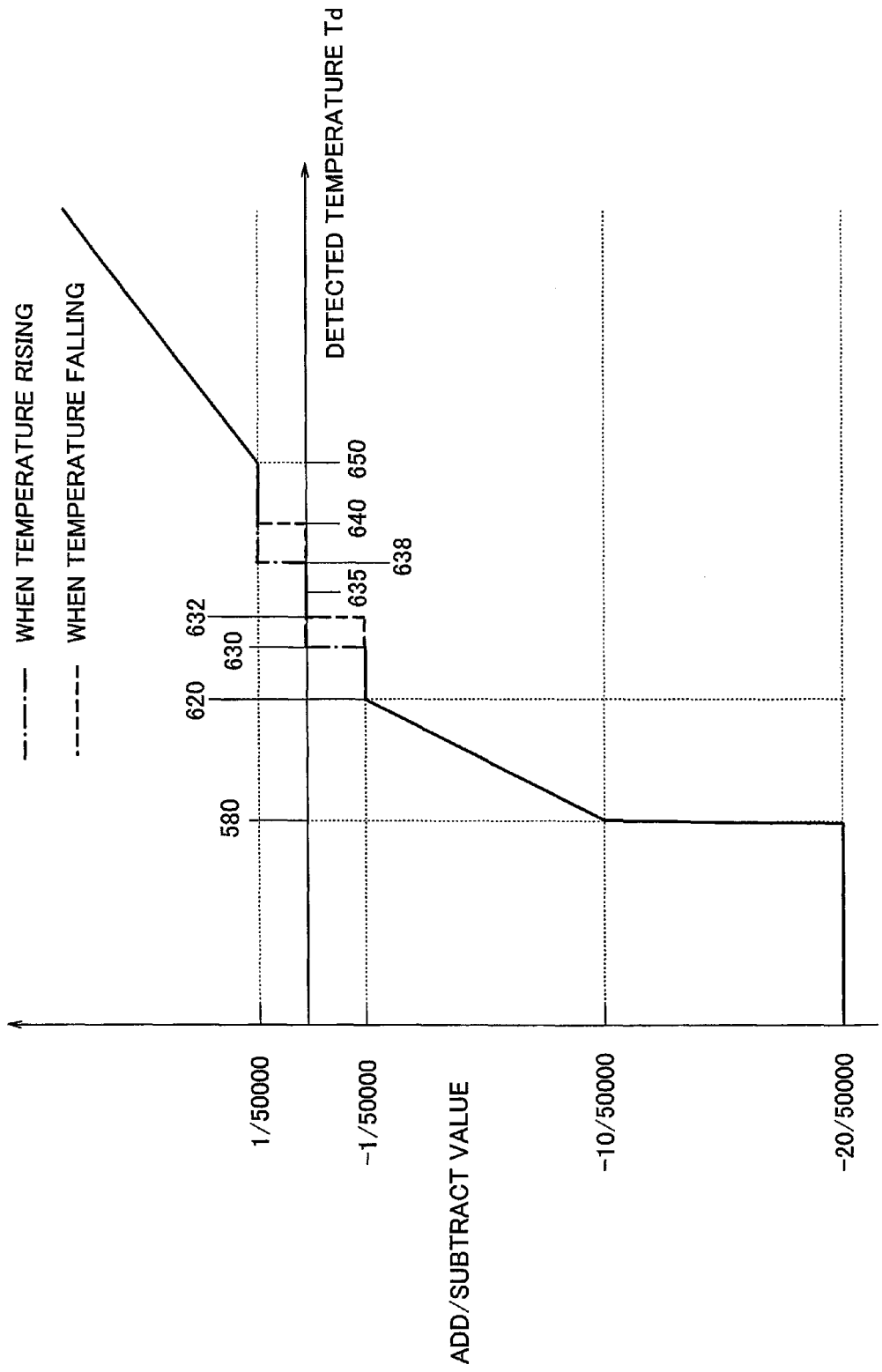
FIG. 13: A graph of the stored heat amount estimate table in FIG. 12.
Figure 14:
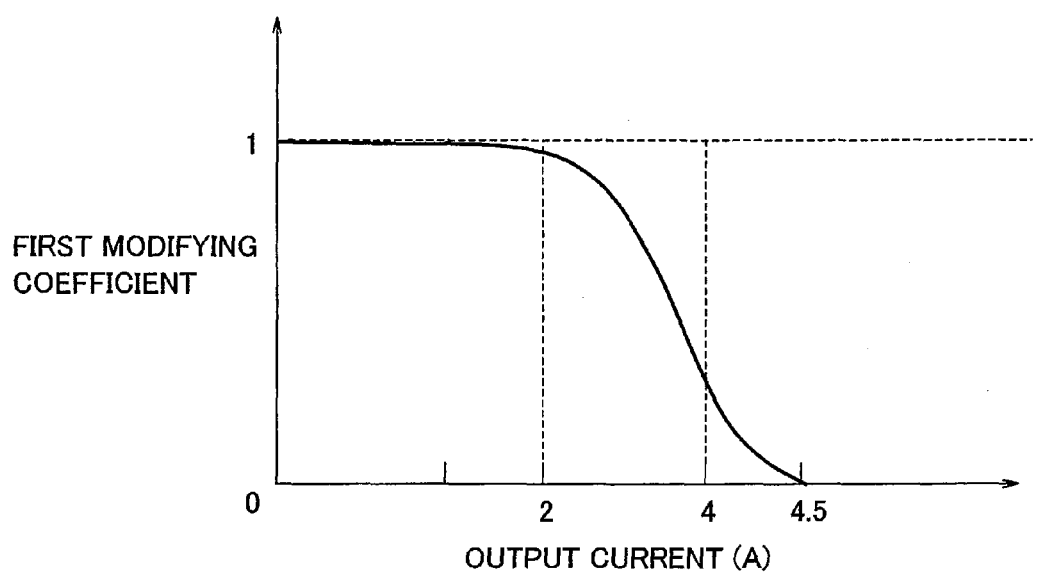
FIG. 14: A graph showing the value of a first modifying coefficient relative to output current in the solid oxide fuel cell of the first embodiment of the present invention.
Figure 15:
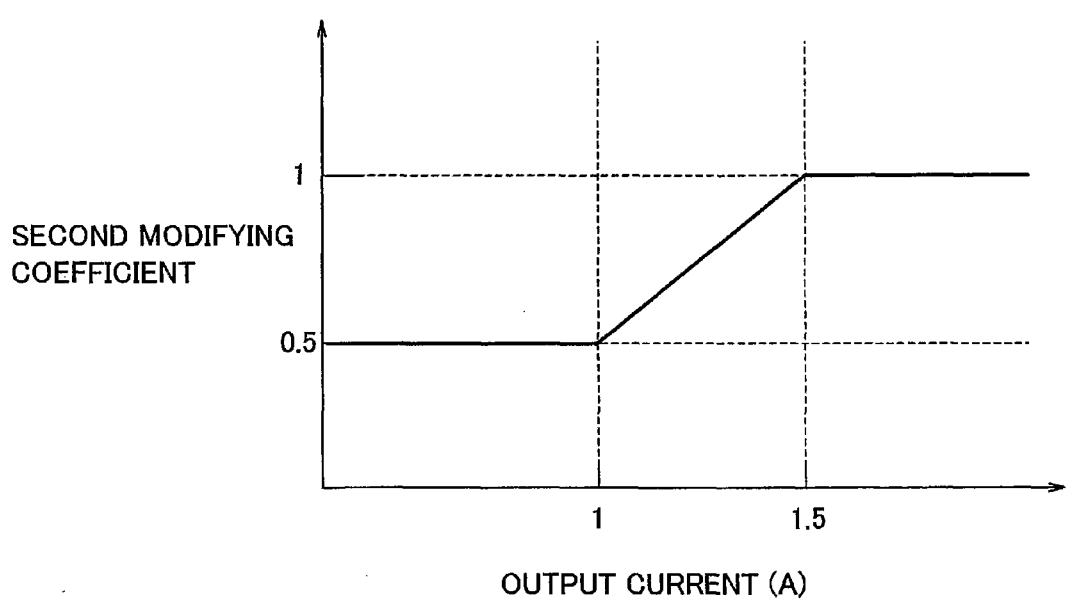
FIG. 15: A graph showing the value of a second modifying coefficient relative to output current in the solid oxide fuel cell of the first embodiment of the present invention.

FIG. 11 is a control flow chart of the fuel supply rate in the solid oxide fuel cell of the first embodiment of the present invention. FIG. 12 is a stored surplus heat estimation table used to estimate the amount of surplus heat accumulated in the insulating material 7. FIG. 13 is a graph of the stored surplus heat estimation table. FIG. 14 is a graph showing the value of a first modifying coefficient exhibited relative to the output current. FIG. 15 is a graph showing the value of a second modifying coefficient exhibited relative to the output current.

The flow chart shown in FIG. 11 is executed at predetermined time intervals in the control section 110 while the solid oxide fuel cell 1 generates power. First, as step S1 in FIG. 11, integration process is executed based on the stored heat estimating table shown in FIG. 12. The integrated value Ni calculated in step S1 is, as described below, a value which will serve as an index for a usable amount of surplus heat accumulated in the insulating material 7 or the like, and lies between 0 and 1.

Next, in step S2, a judgment is made as to whether the integrated value Ni calculated in step S1 is a 0. If the integrated value Ni is 0, the process proceeds to step S3. If other than 0, it proceeds to step S4.

When the integrated value is a 0, it is estimated that surplus heat sufficiently usable has not been accumulated in the insulating material 7. Therefore, in step S3, the fuel supply rate is determined by the control section 110 as set in the basic fuel supply table. The control section 110 sends a signal to the fuel flow regulator unit 38, and the determined fuel supply rate is supplied to the fuel cell module 2. Therefore, in this case, no correction is executed to raise the fuel utilization rate even when the generated power is small. After step S3, one iteration of the process in the flow chart of FIG. 11 is completed.

In step S4, on the other hand, a rate change to be made to the fuel supply rate defined in the basic fuel supply table is determined based on the integrated value Ni. That is, when the integrated value Ni is 1, the fuel supply rate is reduced most and thus the fuel utilization rate is improved. The amount of reduction in the fuel supply rate decreases as the integrated value Ni decreases.

Next, in step S5, the first modifying coefficient is determined based on the graph shown in FIG. 14. As shown in FIG. 14, the first modifying coefficient is 1 in the range where the output current is small, and goes to 0 when output current exceeds 4.5 A. For example, in the range where the generated power is small, a correction is executed to reduce the fuel supply rate by using the amount of surplus heat accumulated in the insulating material 7, and the fuel utilization rate is improved, whereas no correction is executed in the range where the generated power is large. This is because during the operation in which the generated power is large, a sufficiently high fuel utilization rate can be achieved using the basic fuel supply table, and when the generated power is large, it is difficult to utilize the heat stored in the insulating material 7 because of the high temperature inside the fuel cell module 2.

Next, in step S6, the second modifying coefficient is determined based on the graph shown in FIG. 15. As shown in FIG. 15, the second modifying coefficient is 0.5 in the region where the output current is 1 A or below, and grows linearly in the range where the output current is 1 to 1.5 A. It takes a value of 1 when the output current is 1.5 A or above. In other words, in the range where the generated power is 150 W or below, where a change to the fuel utilization is suppressed, the fuel supply rates defined in the basic fuel supply table is small So there is a risk of causing damage to the fuel cell units 16 when a large reduction is made to those fuel supply rates. Also, by keeping low the amount of correction to be made to the basic fuel supply table, the amount of surplus heat accumulated in the insulating material 7 can be used a little at a time, making it possible to utilize the stored surplus heat over a long period. Therefore, the second modifying coefficient reduces the amount of correction to the basic fuel supply table more as the generated power becomes smaller, so that it functions as a change period extension circuit for extending the time period during which the basic fuel supply table is changed or corrected. The change period extension circuit operates to further prolong the time period during which the surplus heat accumulated in the insulating material 7 is used because the surplus heat accumulated in the insulating material is used after a correction to the basic fuel supply table begins, and the stored surplus heat gradually decreases as time passes during which a correction is being executed, and therefore the amount of correction to the fuel utilization rate declines when the stored surplus heat declines.

Note that it is also acceptable not to make a correction using the second modifying coefficient.

Next, in step S7, the rate change determined in step S4 is multiplied by the first modifying coefficient determined in step S5 and the second modifying coefficient determined in step S6 to determine a final utilization rate change. Moreover, the amount of correction to the water supply rate is determined according to the determined fuel supply rate, and the generating air supply rate is reduced by 10% from the normal air supply rate. Also, the fuel supply rate control gain is increased by 10% from the control gain used for the normal operation, thereby improving the responsiveness of changing the fuel supply rate.

Thus, by increasing the fuel supply rate control gain while corrections are being made to the basic fuel supply table to thereby increase the responsiveness of changing the fuel supply rate, the fuel supply rate can be quickly increased while the fuel utilization rate is being modified to decline (fuel supply rate is increased) with a reduction of the estimated amount of stored surplus heat. The fuel cell module 2 is prevented from being cooled down by a time delay placed before the fuel supply rate is increased. Therefore, the control to increase the gain in step S7 acts as an excess cooling prevention circuit. Since a reduction of the secondary generating air rate by 10% suppresses the cells, reformer, etc., inside fuel cell module 2 from being cooled down, a reduction of the stored surplus heat amount is also suppressed, and the stored surplus heat can be effectively utilized. As a result, the control to reduce the secondary air rate by 10% also acts as an excess cooling prevention circuit.

In step S8, the control section 110 sends a signal to the fuel flow regulator unit 38, the water flow regulator unit 28, and the oxidant gas supply device 45, and the amounts of fuel, water, and generating air determined in step S7 are supplied to the fuel cell module 2. After step S8, one iteration of the process in the flow chart of FIG. 11 is completed. When the integrated value Ni declines to 0 as a result of executing corrections to the basic fuel supply table, the process proceeds from step S2 to step S3. A correction to the basic fuel supply table thus ends, and control of the fuel supply rate defined in the basic fuel supply table is again executed.

Next, referring to FIGS. 12 and 13, we discuss estimation of the surplus heat accumulated in the insulating material 7.

Estimation of stored surplus heat is executed by a stored heat amount estimating circuit 110b (FIG. 6) built into the control section 110. When step S1 in the flow chart shown in FIG. 11 is executed, the stored heat amount estimating circuit 110b reads the temperature of the generating chamber from the generating chamber temperature sensor 142 serving as temperature detection device. Next, the stored heat amount estimating circuit 110b refers to the stored heat estimating table shown in FIG. 12 and determines an add/subtract value based on the temperature Td detected by the generating chamber temperature sensor 142. For example, when the detected temperature Td is 645° C., 1/50,000 is determined as an addition value, and this value is added to the integrated value Ni. An addition of this type is executed at a predetermined time after the startup of the solid oxide fuel cell 1. In this embodiment, the flow chart in FIG. 11 is executed every 0.5 seconds. Therefore, an addition is executed every 0.5 seconds. Therefore, when the detected temperature Td is fixed at 645° C., for example, a value of 1/50,000 is added every 0.5 seconds, and the integrated value Ni grows.

This integrated value Ni reflects a history of temperature changes taken place in the fuel cell module 2, and the generating chamber and serves as an index indicative of the amount of surplus heat accumulated in the insulating material 7. The integrated value Ni is limited to a range of 0 to 1. When the integrated value Ni reaches 1, the value is held at 1 until the next subtraction occurs. When the integrated value Ni has declined to 0, the value is held at 0 until the next addition takes place. In the present invention, it is assumed that the value serving as an index indicative of the amount of stored surplus heat is an estimated amount of the stored surplus heat. Therefore, in the present invention, the amount of stored surplus heat is estimated based on the temperature of the fuel cell module 2.

An amount of utilization rate change made to the basic fuel supply table, which is calculated in step S4 of the flow chart shown in FIG. 11, is derived by multiplying a predetermined correction value to the integrated value Ni. Therefore, the larger the integrated value Ni becomes, which serves as an estimated amount of stored surplus heat, the more the utilization rate increases. The utilization rate change becomes a maximum when the integrated value Ni is 1, and when the integrated value Ni is 0, no correction is executed (utilization rate change=0). For example, when the integrated value Ni is 0, the estimated amount of stored surplus heat is judged to be under the amount of stored surplus heat sufficient for executing corrections to the basic fuel supply table, and no correction to the fuel utilization rate is executed.

As shown in FIGS. 12 and 13, in the present embodiment, the adding operation is carried out as an addition when the detected temperature Td is higher than the reference temperature Tcr of 635° C., and as a subtraction when it is lower than same. That is, the integrated value Ni is calculated assuming that when the detected temperature Td is higher than the reference temperature Tcr, surplus heat usable for increasing the fuel utilization rate is accumulated in the insulating material 7, and when lower than the change reference temperature Tcr, the surplus heat accumulated in the insulating material 7 decreases. Put another way, the integrated value Ni corresponds to integration over time of the temperature deviations of the detected temperature Td from the reference temperature Tcr, and the amount of stored surplus heat is estimated based on the integrated value Ni.

Note that in this embodiment, the reference temperature Tcr, which serves as a reference temperature for estimating the amount of stored surplus heat is set slightly higher than the heat storage temperature Th, at which accumulation of surplus heat begins (FIG. 10). For this reason, the amount of the stored surplus heat is estimated slightly less than the actual. Therefore, the fuel cell module 2 is avoided from being cooled down by execution of excessive corrections to raise the fuel utilization rate based on the amount of stored surplus heat estimated higher than the actual.

Therefore, a correction is made to the basic fuel supply table when the generated power has declined while the detected temperature Td is higher than the reference temperature Tcr. On the other hand, when the generated power has declined while the detected temperature Td is lower than the reference temperature Tcr, the amount of correction to the basic fuel supply table is reduced (by a decline of the integrated value Ni), or no correction is made (when the integrated value Ni is 0).

Specifically, as shown in FIGS. 12 and 13, when the detected temperature Td is below 580° C., 20/50,000 is subtracted from the integrated value Ni. When the detected temperature Td is 580° C. or above and less than 620° C., 10/50,000×(620−Td)/(620−580) is subtracted from the integrated value Ni. When the detected temperature Td is 620° C. or above and less than 630° C., 1/50,000 is subtracted from the integrated value Ni. Thus, the more rapidly the integrated value Ni decreases the lower the detected temperature Td is than the reference temperature Tcr, and the more rapidly the amount of correction to the fuel utilization rate decreases.

On the other hand, when the detected temperature Td is 650° C. or above, 1/50,000×(Td−650) is added to the integrated value Ni. When the detected temperature Td is 640° C. or above and less than 650° C., 1/50,000 is added to the integrated value Ni. Thus, the more rapidly the integrated value Ni increases the higher the detected temperature Td is than the reference temperature Tcr, and with this the amount of correction to the fuel utilization rate decreases.

Furthermore, in the range where the detected temperature Td is between 630° C. and 640° C., different processes are performed depending on whether the detected temperature Td is increasing or decreasing.

For example, when the detected temperature Td is between 630° C. and 632° C., an addition value is 0 (no add/subtract is performed) when the detected temperature Td is rising, whereas 1/50,000 is subtracted when it is falling. Thus, when the detected temperature Td is less than the reference temperature Tcr, and the difference between them is small or 5° C. or below, the integrated value Ni decreases more rapidly when the detected temperature Td is falling than when it is increasing. Here, when the insulating material 7 has an extremely high heat capacity, and the detected temperature Td has started decreasing, it is expected that the temperature will continue to drop for a certain period of time. Therefore, in such circumstances, it is necessary to avoid the risk of suffering a major temperature drop in the fuel cell module 2 by quickly reducing the integrated value Ni and suppressing corrections to lower the fuel utilization rate (reducing the fuel supply rate).

On the other hand, when the detected temperature Td is between 638° C. and 640° C., 1/50,000 is added when the detected temperature Td is increasing, whereas 0 is added (no add/subtract is performed) when it is declining. As described above, when the insulating material 7 has an extremely high heat capacity, and the detected temperature Td has started increasing, it is expected that the temperature will continue to rise for a certain period of time. Therefore, in such circumstances the stored surplus heat is actively utilized to improve the fuel utilization rate by promoting corrections to raise the fuel utilization rate (reduce the fuel supply rate) by quickly increasing the integrated value Ni.

Different values are added to or subtracted from the integrated value Ni according to how the detected temperature Td is changing. Therefore, the relationship between a temperature deviation between the detected temperature Td and the reference temperature Tcr, and the integrated value Ni reflecting the amount of stored surplus heat is changed according to how the detected temperature Td is changing.

Also, when the detected temperature Td is 632° C. or above and less than 638° C., and the detected temperature Td is close to the reference temperature Tcr of 635° C. and is deemed to be stable, 0 is added regardless of how the detected temperature Td is changing, and the current status is maintained.

Figure 16:
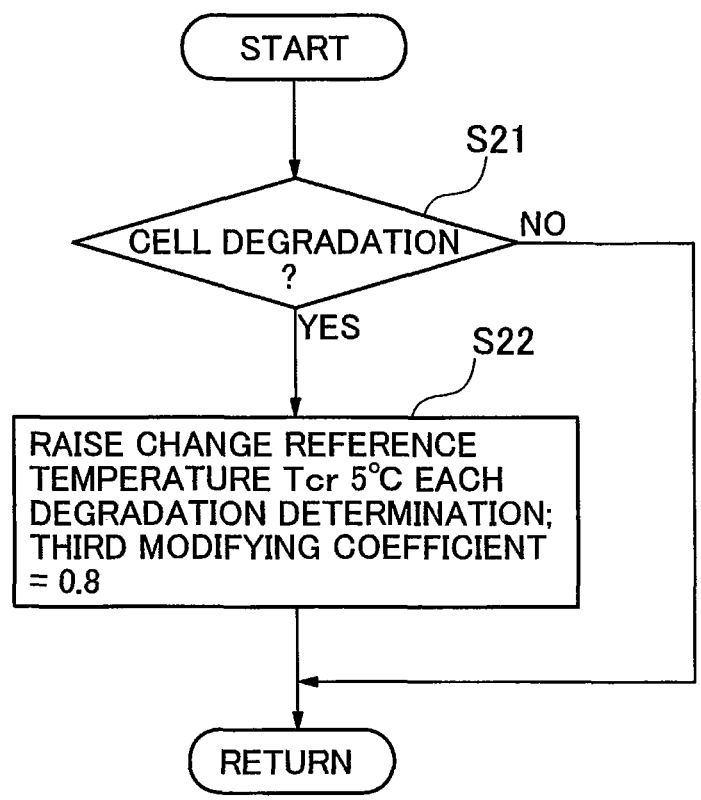
FIG. 16: A flowchart for changing correction amounts when the fuel cell module has degraded.

Next, referring to FIG. 16, we explain the processes performed when the fuel cell module 2 has degraded. FIG. 16 is a flowchart of the processes for changing correction amounts when the fuel cell module 2 has degraded.

When degradation of the fuel cell units 16 advances after long years of use, the power extractable at a given fuel supply rate declines. In conjunction with this, the temperature of the fuel cell units 16 also rises for the same power produced. In the solid oxide fuel cell 1 of the present embodiment, a determination of degradation of the fuel cell module 2 (the fuel cell units 16) is made based on the temperature of the fuel cell module 2 measured when a predetermined electrical power is generated. Note that degradation of a fuel cell module can also be determined from the power or voltage, etc. which can be extracted at a predetermined fuel supply rate.

The flow chart shown in FIG. 16 is executed at a predetermined interval which is, for example, several months to several years by the control section 110. First, in step S21 of FIG. 16, a judgment is made as to whether the fuel cell units 16 have degraded. If it is determined that the fuel cell units 16 have not degraded, the process of one iteration of the flow chart shown in FIG. 16 ends. If it is determined that the fuel cell units 16 have degraded, the process advances to step S22.

In step S22, the reference temperature Tcr is changed by 5° C. higher, and a third modifying coefficient is set to 0.8. Then, the process of one iteration of the flowchart shown in FIG. 16 ends. This change is made because when the fuel cell units 16 have degraded, the operating temperature of the fuel cell module 2 generally shifts higher and the temperature used to correct the reference. The third modifying coefficient is multiplied by the utilization rate change determined in step S4 of FIG. 11. The third modifying coefficient is set to 1 prior to the degradation of the fuel cell units 16, and when it is determined that degradation has occurred, it is changed to 0.8, and the utilization rate change is reduced by 20%. The fuel cell units 16 is prevented from being further degraded by large corrections to the fuel utilization rate after the fuel cell units 16 has degraded. Note that after it is determined that the fuel cell module 2 has degraded, the threshold temperature used to determine degradation is changed for a next time further degradation is determined. It is therefore possible to determine the progress of degradation over time at a number of times. The value of the reference temperature Tcr is also changed each time an occurrence of degradation is determined.

Figure 17A:
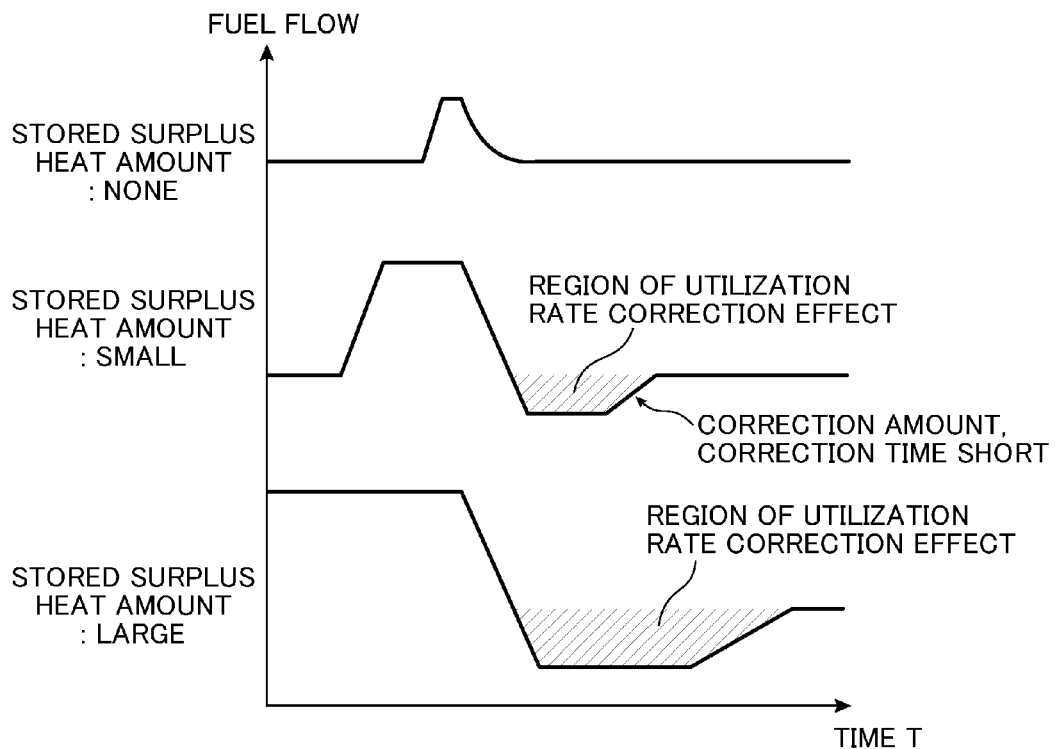
FIGS. 17(a) and 17(b): A graph schematically showing changes in power demand over a day in a typical residence.

Next, referring to the FIG. 17, we discuss the operation of a solid oxide fuel cell 1 according to the first embodiment of the present invention. FIG. 17(*a*) is a diagram conceptually showing the operation of a solid oxide fuel cell 1 according to the present embodiment, and FIG. 17(*b*) schematically shows changes in power demand over a day in an exemplary household. The upper graph in FIG. 17(a) conceptually illustrates the operation when no amount of surplus heat is accumulated in the insulating material 7. The middle and lower graphs show cases, respectively, where accumulated surplus heat is small and large. When, as shown in the upper portion of FIG. 17(a), the time duration of operation to increase the fuel supply rate is short, the amount of surplus heat is not accumulated in the insulating material 7. Therefore, the operation performed after the generated power has declined is performed at fuel supply rates defined in the basic fuel supply table, and the fuel utilization rate will not increase. When, on the other hand, a high power generation operation continues for a certain time period as in the middle portion of FIG. 17(a), the operation performed after the generated power has declined is carried out by utilizing the amount of surplus heat accumulated in the insulating material 7 when the power generation was large. Therefore, a high-efficiency operation with the fuel supply rate reduced from that of the basic fuel supply table is carried out during the period that a utilizable amount of surplus heat remains in the insulating material 7. Thus, the amount of fuel corresponding to the shaded area of the middle graph is saved. Furthermore, when a large generated power operation is carried out for a long period of time as shown in the bottom portion of FIG. 17(a), a large amount of surplus heat is accumulated in the insulating material 7. Therefore, a high-efficiency operation utilizing the accumulated surplus heat is carried out over a longer time, and an even more amount of fuel is saved.

Figure 17B:
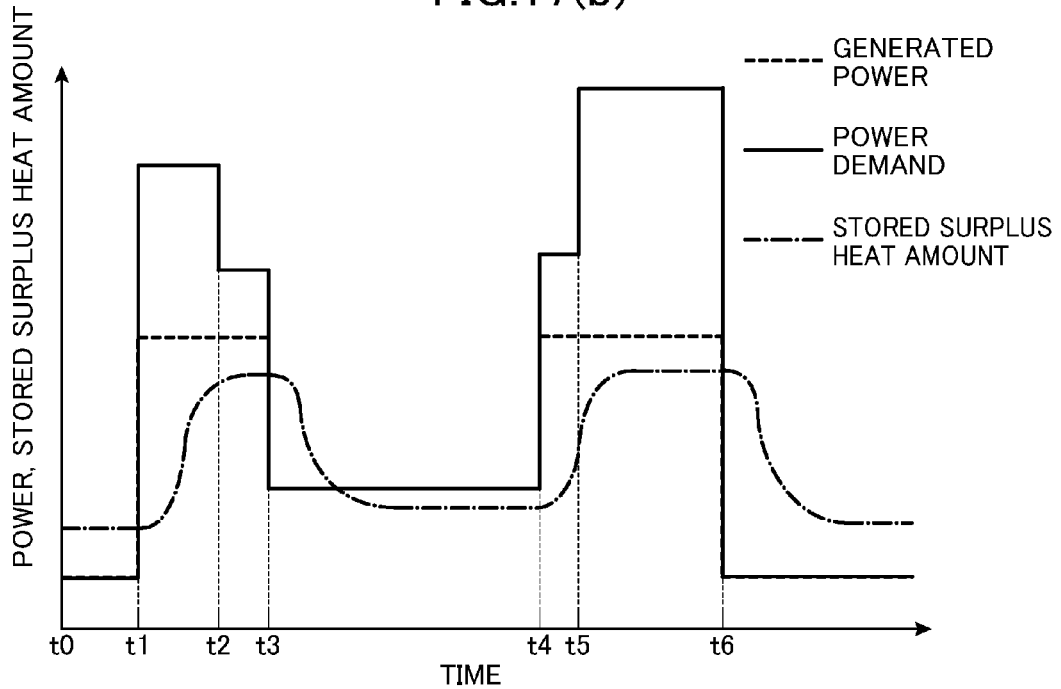

Next, in FIG. 17(b), a change of the power demand in an exemplary household is shown by a solid line. The power generated by the solid oxide fuel cell 1 is shown by a dotted line, and the integrated value Ni serving as an index of the amount of stored surplus heat is shown by a dot and dash line.

First, at time t0-t1 when household members are asleep, the power demand in the household is small. At time t1, the occupants awake and the power demand increases. In conjunction with this, the power generated from the solid oxide fuel cell 1 also increases, and that portion of the demanded power exceeding the rated power of the fuel cell is supplied from the power grid. Since a low power demand state in which power use is small continues for approximately 6 to 8 hours during which the occupants are asleep, the accumulated of surplus heat (integrated value Ni) estimated by the stored heat amount estimating circuit 110b is 0 or an extremely small value.

When, at time t1, the generated power increases, and the fuel cell module 2 is operating at a temperature higher than the heat storage temperature Th, the amount of stored of surplus heat gradually increases, and at time t2, the integrated value increases to approximately 1, which is the maximum integrated value. Thereafter, the power demand suddenly drops when the occupants leave the house at time t3. Thus, when the generated power drops in a state that the amount of stored surplus heat is equal to or greater than the amount sufficient to be able to change the fuel utilization rate, a correction to the basic fuel supply table by the fuel table change circuit 110a is executed, and the fuel utilization rate is increased while the generated power is low. During the operation at a raised the fuel utilization rate, the surplus heat amount accumulated in the insulating material 7 is utilized, and the integrated value Ni also declines. In the embodiment, the operation at an improved fuel utilization rate possible for approximately 1 to 3 hours.

Next, when the occupants return home at time t4, the power demand again increases. The integrated value Ni increases with some delay (time t4-t5) after the increase of the power demand at time t4 and again reaches the maximum value. Next, at time t6 the occupants go to bed. The operation at an increased fuel utilization rate starts after the power demand has decreased (time t6 and later).

When the power demand at a household changes in this manner, the operation at an increased fuel utilization rate, in which the surplus heat amount stored in the insulating material 7 is utilized, is carried out twice a day. The operations at a high fuel utilization rate last for as much as 20-50% of the period when the generated power is small, and improve the overall energy efficiency of the solid oxide fuel cell 1.

In conventional solid oxide fuel cells, when the generated power is small, heat generated by generating power drops, and for the temperature of the fuel cell module is prone to drop. In order to prevent an excessive temperature drop, the fuel utilization rate is therefore reduced when the generated power is low to burn an amount of fuel not used for electrical generation to heat up the fuel cell module. In particular, in solid oxide fuel cells of a type in which the reformer is disposed within the fuel cell module, endothermic reactions occur inside the reformer, which increase the chance of temperature drops.

In the solid oxide fuel cell 1 of the present invention, when the generated power is small, if it is estimated by the stored heat amount estimating circuit 110b that a usable amount of surplus heat has accumulated in the insulating material 7, the basic fuel supply table is temporarily corrected so that the fuel utilization rate increases (FIG. 11, step S7). Thermal independence of the solid oxide fuel cell 1 is thus maintained, and the overall energy efficiency of the solid oxide fuel cell 1 is improved, while excessive temperature drops are avoided.

The solid oxide fuel cell 1 of the present embodiment is formed (FIG. 10) so that more surplus heat is estimated to be accumulated in the insulating material 7 in a temperature range above a predetermined storage heat temperature Th. Therefore, the accumulated surplus heat can be effectively utilized by actively accumulating surplus heat in a region where the temperature is higher than the heat storage temperature Th and the fuel utilization rate can be raised and by consuming the accumulated surplus heat while the generated power is small, and the temperature of the fuel cell module 2 is comparatively low, so that the stored surplus heat is easy to utilize.

In the solid oxide fuel cell 1 of the present embodiment, since the detected temperature Td detected by the generating chamber temperature sensor 142 generally reflects the amount of surplus heat stored in the insulating material 7, the basic fuel supply table can be easily corrected using the relationship between the detected temperature Td and the reference temperature Tcr.

In the solid oxide fuel cell 1 of the present embodiment, since the reference temperature Tcr is set higher than the heat storage temperature Th (FIG. 10), the surplus heat is estimated to be stored at or above the reference storage temperature Tcr, which is higher than the heat storage temperature Th, at which surplus heat begins tp be stored in the insulating material 7. As a result, the risk can be avoided that the stored surplus heat is used despite the fact that the stored amount of surplus heat, resulting in an excessive temperature drop.

In the solid oxide fuel cell 1 of the present embodiment, since the stored heat amount estimating circuit 110b estimates the amount of stored surplus heat based on the history of the detected temperature Td (FIG. 11, step S4, FIG. 13), a more accurate estimate can be made compared to estimating the amount of stored surplus heat using the temperature Td alone, and the stored surplus heat can be more effectively used.

In the solid oxide fuel cell 1 of the present embodiment, since the amount of surplus heat accumulated in the insulating material 7 is estimated by accumulating temperature deviations over time (FIG. 11, step S4, FIG. 13, when the time during which the operation is performed at a temperature higher than the stored heat temperature Th is long, the estimated amount of stored surplus heat is large, whereas when the time is short, the estimated amount of stored surplus heat is small, and a more accurate estimation of the amount of stored surplus heat can be achieved. The risk of excessive temperature drops due to utilization of the stored surplus heat can thus be reliably avoided.

In the solid oxide fuel cell 1 of the present embodiment, since the amount of correction to raise the fuel utilization rate is increased as the amount of stored surplus heat increases (FIG. 11, step S4, FIG. 13), a correction can be performed to greatly improve the fuel utilization rate while the risk of excessive temperature drops can be reliably avoided.

In the solid oxide fuel cell 1 of the present embodiment, since the more the correction amount increases the higher the detected temperature Td is, whereas the more the correction amount decreases the lower the detected temperature Td is (FIG. 13), a large correction to the fuel utilization rate can be made when the detected temperature Td is high, and the correction amount can be swiftly decreased when the detected temperature Td is low, so that excessive temperature drops can be reliably prevented.

Figure 18:
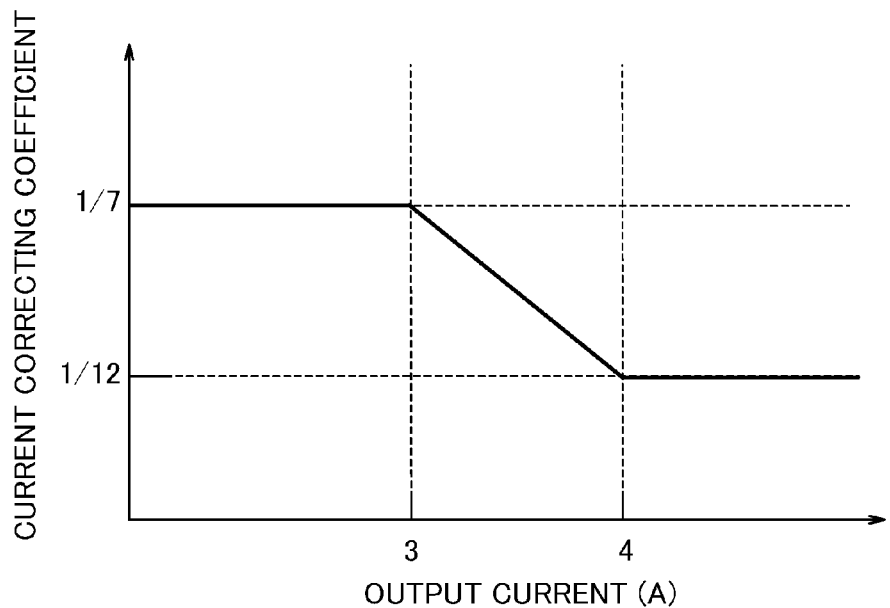
FIG. 18: A graph showing the value of a current modifying coefficient in a variant example of the first embodiment of the present invention.

In the solid oxide fuel cell 1 of the present embodiment, since the relationship between the estimated amount of stored surplus heat and the correction amount is changed according to a rise or fall of the detected temperature Td or the generated power (FIG. 13, 630-640° C.; FIGS. 14, 15, 18), the two goals of preventing excessive temperature drops and effectively utilizing stored heat can be achieved.

In the solid oxide fuel cell 1 of the present embodiment, since the fuel table change circuit 110*a* reduces the correction amount when the generated power is small (FIG. 15), the usable amount of stored surplus heat declines, and the period during which the stored surplus heat can be used can be extended.

In the solid oxide fuel cell 1 of the present embodiment, since the estimated amount of stored surplus heat drops to a large degree when the detected temperature Td is declining, and the difference between the detected temperature Td and the reference temperature Tcr is at or below a predetermined very small deviation value (FIG. 13, 630-632° C.), the estimated amount of the stored surplus heat is swiftly reduced when the detected temperature Td is declining, and excessive temperature drops can be reliably prevented.

In the solid oxide fuel cell 1 of the present embodiment, since the correction amount to increase the fuel utilization rate is changed according to the state of the fuel cell module 2 (FIGS. 14, 15, 16), corrections to the fuel utilization rate not conforming to the state of the fuel cell module 2 can be prevented.

In the solid oxide fuel cell 1 of the present embodiment, since the reference temperature Tcr is changed higher when the fuel cell module 2 has degraded (FIG. 16), the fuel utilization rate can be corrected without placing an excessive burden on the fuel cell module 2 when it has degraded and its operating temperature has risen.

In the solid oxide fuel cell 1 of the present embodiment, since the correction amount is reduced when the fuel cell module 2 has degraded (FIG. 16, step S22), the progress of degradation can be suppressed by correcting the fuel utilization rate.

Also, in the above-described first embodiment of the present invention, an add/subtract value made to the integrated value Ni is calculated based on only the detected temperature Td shown in the stored surplus heat estimation table shown in FIG. 12. However, as a variant example, an add/subtract value can also be determined depending on the output current. For example, the integrated value Ni can be calculated by integrating values obtained by multiplying the add/subtract values determined based on the stored surplus heat estimation table (FIG. 12) to a current correction coefficient shown in FIG. 18. As shown in FIG. 18, the current correction coefficient is determined as 1/7 for an output current of 3 A or below and 1/12 for 4 A or above, and is linearly decreased from 1/7 to 1/12 between 3 and 4 A.

By multiplying by the current correction coefficient set in this manner, the integrated value Ni drops swiftly in a range where the generated power is small. Increases and decreases of the integrated value Ni in a range where the generated power is medium or greater become gradual. Therefore, by correcting the basic fuel supply table, the integrated value Ni is gradually decreased while the generated power is small, during which a large amount of surplus heat accumulated in the insulating material 7 is consumed. The risk of inducing extraordinary temperature drops by overestimating the amount of stored surplus heat can thus be reliably avoided.

In the above-described embodiment, a value for addition to or subtraction from the integrated value Ni is determined by the detected temperature Td alone, as shown in FIG. 13. However, the present invention can also be configured so that the add/subtract value is also dependent on the output current. For example, at an output current of 3 A or below (an output power of 300 W), the reference temperature Tcr can be raised by about 2° C., and the entire FIG. 13 graph is shifted by about 2° C. In this manner, the reference temperature Tcr is changed higher when the generated power is small, and the estimated amount of stored surplus heat is calculated small. The correction amount to increase the fuel utilization rate is thus reduced. Therefore, the fuel utilization rate is greatly improved in the range where the generated power is small and the fuel supply rate is low, so that excessive drops in the fuel supply rate can be suppressed.

Next, referring to the FIGS. 19 through 33, we discuss a solid oxide fuel cell according to a second embodiment of the present invention.

In the solid oxide fuel cell of the present embodiment, control by the control section 110 is different from that described above for the first embodiment. Therefore, we explain only the portions of the second embodiment of the invention which differ from the first embodiment, and we omit explanation of similar constitutions, operations, and effects.

In the above-described first embodiment, the fuel supply rate was determined based on the basic fuel supply table in response to a power demand, and the determined fuel supply rate is temporarily changed so that the determined fuel supply rate is reduced based on the amount of surplus heat accumulated in the insulating material 7, thereby temporarily increasing the fuel utilization rate. Thus, in the solid oxide fuel cell of the second embodiment, no process is conducted to determine the fuel supply rate based on the basic fuel supply table and change the fuel supply rate based on an estimated amount of stored surplus heat. Rather, the fuel supply rate is directly calculated based on a detected temperature Td. In the present embodiment, however, the fuel supply rate, directly determined based on the detected temperature Td, includes an addition of the amount of surplus heat accumulated in the insulating material 7, and the fuel utilization rate is improved by utilizing the stored surplus heat when the amount of stored surplus heat is large. Therefore, the same technical concept as in the first embodiment can be achieved.

Next, in the above-described first embodiment, the change made to the fuel supply rate to increase the fuel utilization rate based on the estimated amount of stored surplus heat is accomplished by multiplying the change amount to a first correction coefficient (FIG. 11 step S5, FIG. 14), so that it is primarily used when the generated power is small (at or above a generated power of 4.5 A; first correction coefficient=0). In contrast, in the present embodiment, a coefficient corresponding to the first correction coefficient in the first embodiment is not used. Therefore, in the present embodiment, high efficiency control utilizing the amount of surplus heat accumulated in insulating material 7 is executed not only in the range where the generated power is low, but also in the range where the generated power is high. Therefore, in the solid oxide fuel cell of the present embodiment, in addition to the effect of improving the fuel utilization rate using stored surplus heat, the effect of consuming the amount of surplus heat accumulated in the insulating material 7 to thereby suppress temperature rises is obtained when the temperature of the fuel cell module 2 rises excessively. Note that in the above-described first embodiment, if the first modifying coefficient is omitted (the change amount is not multiplied by the first modifying coefficient), the same effect can be obtained.

Figure 19:
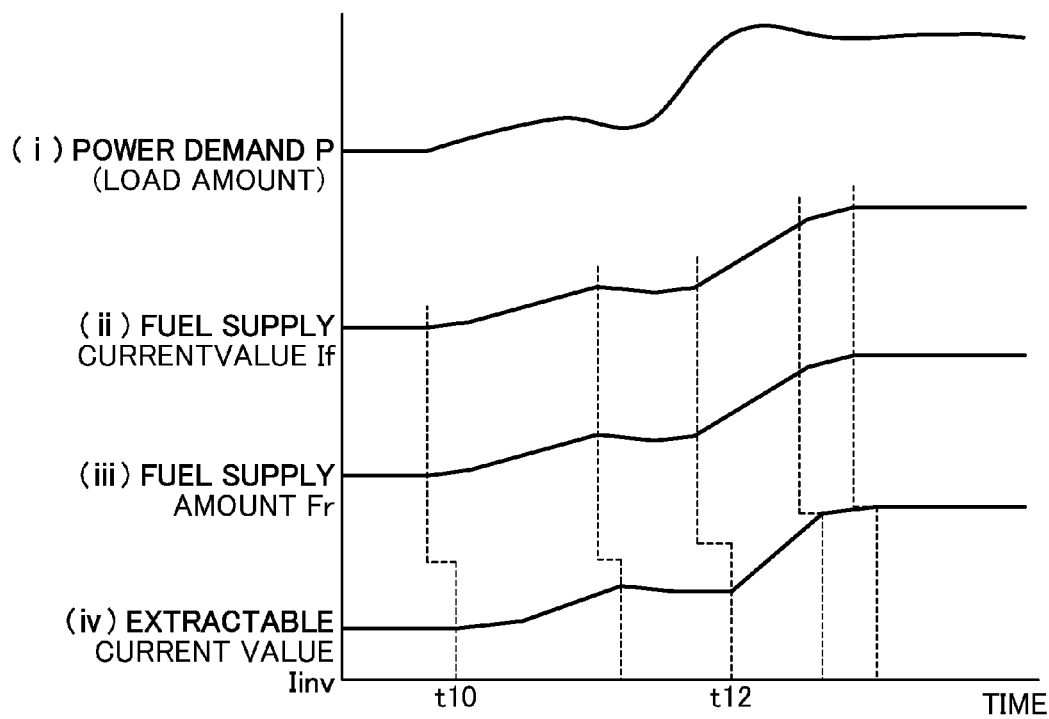
FIG. 19: A graph schematically showing the relationship between changes in power demand, fuel supply rate, and current actually extracted from a fuel cell module.
Figure 20:
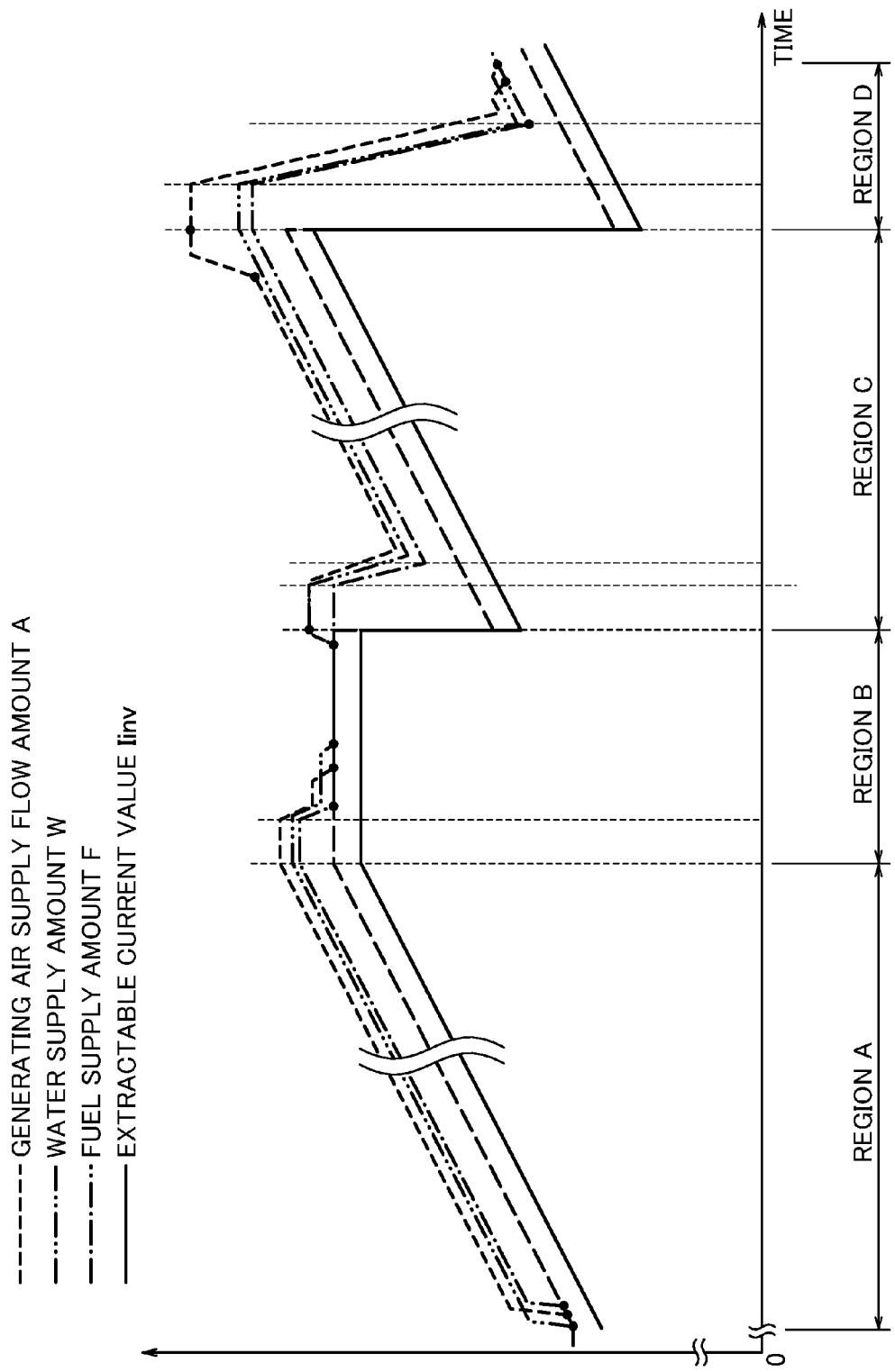
FIG. 20: A graph showing an example of the relationship between generating air supply rate, water supply rate, fuel supply rate, and current actually extracted from a fuel cell module.

FIG. 19 is a graph schematically showing the relationship between changes in power demand, fuel supply rate, and the current actually extracted from a fuel cell module 2. FIG. 20 is a graph showing an example of the relationship between the generating air supply rate, water supply rate, fuel supply rate, and the current actually extracted from a fuel cell module 2.

As shown in FIG. 19, the fuel cell module 2 is controlled to produce power to meet the power demand shown in FIG. 19(i). Based on the power demand, the control section 110 sets the fuel supply current value If, which is the target current to be achieved by the fuel cell module 2, as shown in FIG. 19(ii). The fuel supply current value If is set to roughly follow changes in the power demand. But since the speed of the fuel cell module 2 responding to changes in the power demand is extremely slow, it is set to follow the power demand gradually and does not follow sudden changes in the power demand which occur at short cycles. When the power demand exceeds the maximum rated power of the solid oxide fuel cell, the fuel supply current value If follows up to the current value corresponding to the maximum rated power, and does not get set to current values above that.

The control section 110 controls the fuel flow regulator unit 38 serving as a fuel supply device in the manner shown in the FIG. 19(iii) graph and supply fuel to the fuel cell module 2 at a fuel supply rate Fr sufficient to produce the power corresponding to the fuel supply current value If. Note that if the fuel utilization rate is constant, which represents a ratio of the fuel actually used to generate electricity to the fuel supply amount, the fuel supply current value If and the fuel supply current value Fr are proportional to each other. In FIG. 19, the fuel supply current value If and the fuel supply current value Fr are drawn as being proportional to each other. But as described below, in actuality the fuel utilization rate is not fixed constant in this embodiment.

Moreover, as shown in FIG. 19(iv), the control section 110 outputs a signal to the inverter 54 to output extractable current Iinv, which is the current value which can be extracted from the fuel cell module 2. The inverter 54 extracts current (power) from the fuel cell module 2 in response to the power demand, which changes rapidly from a moment to another within the range of the extractable current Iinv. A portion of the power demand exceeding the extractable current Iinv is supplied from the power grid. Here, as shown in FIG. 19, the extractable current Iinv instructed to the inverter 54 by the control section 110 is set to change with a predetermined time delay placed after the fuel supply current value Fr is changed when the current is rising. For example, at time t10 in FIG. 19, the extractable current Iinv begins to increase with a delay after the fuel supply current value If and the fuel supply current value Fr start to rise. At time t12, as well, the extractable current Iinv starts to increase with a delay after the fuel supply current value If and the fuel supply current value Fr increase. Thus, the delay time placed before the power actually extracted from the fuel cell module 2 is increased after an increase in the fuel supply current value Fr makes it possible to accommodate the delay time which fuel supplied to the fuel cell module 2 takes to pass through the reformer 20, etc. to reach the individual fuel cell stack 14, and the delay time which the electrical generation reaction takes to take place after fuel reaches the individual fuel cell stack 14, and so forth. Therefore, the occurrence of fuel cut-off in each of the fuel cell units 16 and the resulting damage to the fuel cell units 16 can be reliably prevented.

FIG. 20 shows in more detail the relationship between changes of the generating air supply rate, water supply rate, and fuel supply rate and extractable current Iinv. Note that the graphs of the generating air supply rate, water supply rate, and fuel supply rate shown in FIG. 20 are each converted to the current values corresponding to those supply rates. In other words, if the supplied generating air, water, and fuel are all set to the supply rates exactly necessary to generate electricity, each of the supply rate graphs coincides with the graph of the extractable current Iinv. Therefore, the amount of difference between each of the supply rate graphs and the extractable current Iinv corresponds to a surplus of each of the supply rates. The excess fuel not used for generating electricity is burned in the combustion chamber 18, which is the combustion section located above the individual fuel cell stack 14, and is used to heat the interior of the fuel cell module 2.

As shown in FIG. 20, the generating air supply rate, water supply rate, and fuel supply rate are always above the extractable current Iinv. Current exceeding the current producible at the respective supply rates is extracted from the fuel cell module 2, thereby preventing damage to the fuel cell units 16 due to a fuel shortage, an air shortage, and the like. For the fuel supply rate exceeding the extractable current Iinv, the water supply rate is set to the supply rate at which all of the supplied fuel can be steam reformed. That is, in order for the supplied fuel to be all steam-reformed, the water supply rate is set to satisfy the ratio S/C between the amount of steam needed for steam reforming and the amount of carbon contained in the fuel. Carbon deposition inside the reformer is thus prevented. In regions A and C of FIG. 20, in which the extractable current Iinv is increasing with an increase of the power demand, an offset of the fuel supply rate, etc. is set higher than in the B region, where the extractable current Iinv is flat. When the generated power is increased, the generated power takes a delay time to increase after the fuel supply rate at which fuel is supplied to the fuel cell module 2 is increased by a power extraction delay circuit 110*c* (FIG. 6) built into the control section 110. That is, the power actually output from the fuel cell module 2 is changed with a delay time placed after the fuel supply rate is changed in response to changes of the power demand. In addition, when the extractable current Iinv is rapidly reduced in response to a drop of the power demand (region C, beginning of region D), each supply rate is reduced with a predetermined delay time placed after the reduction of the extractable current Iinv. Therefore, an extremely large amount of excess fuel is supplied after a rapid reduction of the extractable current Iinv. Thus, in cases where the power demand suddenly drops, a sudden reduction of the extractable current Iinv is implemented to prevent a reverse current flow. Thus, when the generated power increases and when the generated power decreases, more excess fuel is produced than when the generated power is constant, and the excess fuel is used to heat the fuel cell module 2. Therefore, not only in cases where the fuel cell module 2 is operated to output high generated power for long hours, but also in cases where the generated power is frequently increased and decreased, the fuel cell module 2 is highly heated, and a large amount of surplus heat is accumulated in the insulating material 7.

The solid oxide fuel cell of the present embodiment utilizes surplus heat in circumstances when the generated power has declined which is accumulated not only while it is operated to output high generated power for a long time but also while the generated power is increases or decreased.

Next, referring to FIGS. 21 through 28, we discuss a procedure for determining the generating air supply rate, water supply rate, and fuel supply rate based on the detected temperature Td.

Figure 21:
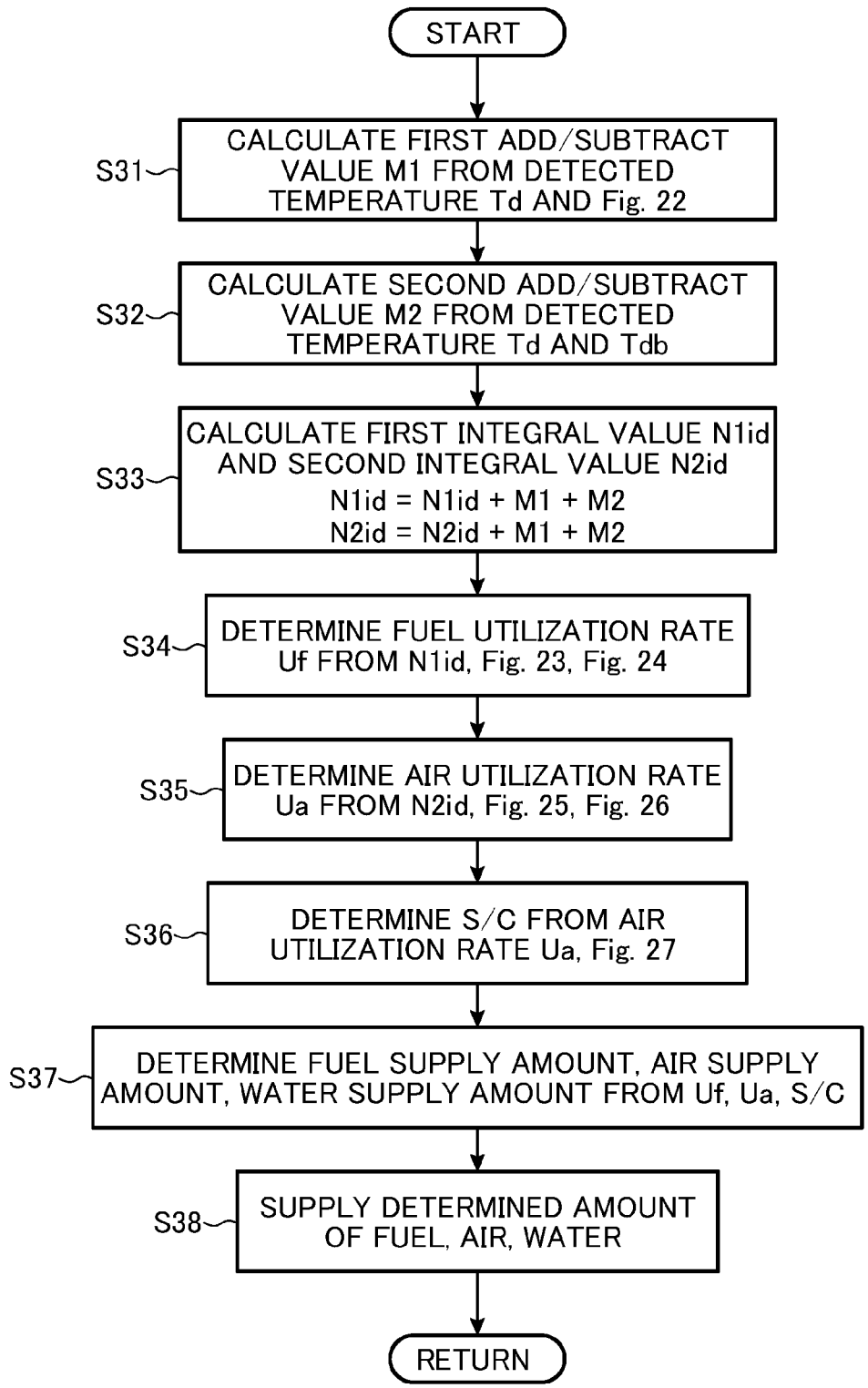
FIG. 21: A flowchart showing the order in which generating air supply rate, water supply rate, and fuel supply rate are determined based on detected temperature Td.
Figure 22:
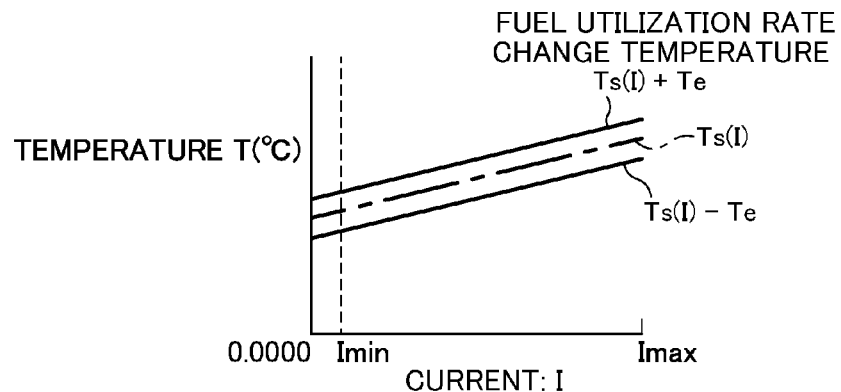
FIG. 22: A graph showing appropriate fuel cell stack temperature vs. generating current.
Figure 23:
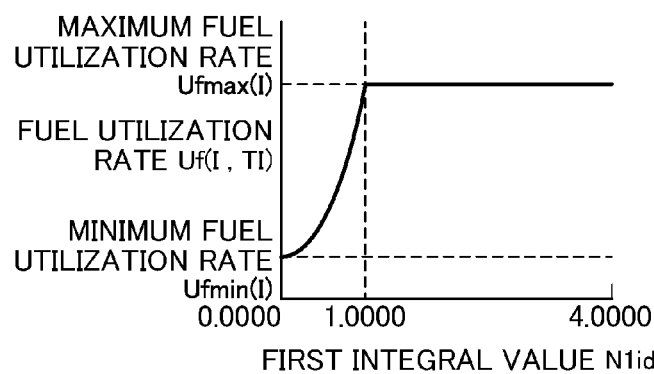
FIG. 23: A graph showing fuel utilization rate determined according to accumulated value.
Figure 24:
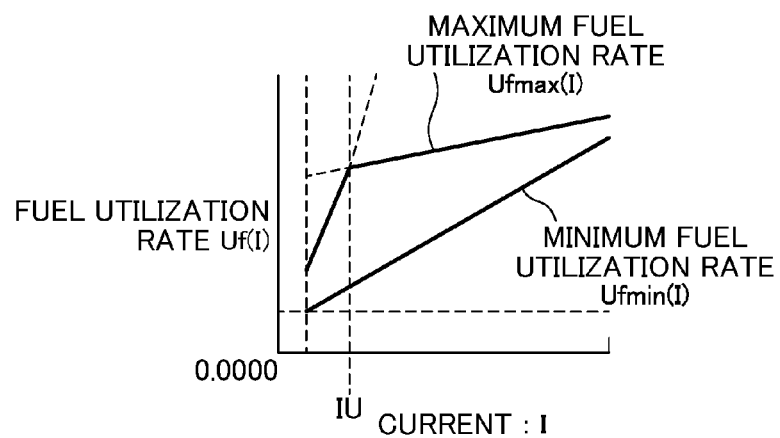
FIG. 24: A graph showing the range of fuel utilization rates which can be determined relative to each generating current.
Figure 25:
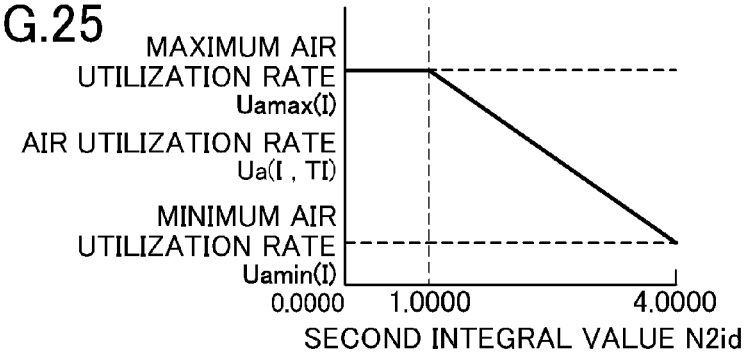
FIG. 25: A graph showing air utilization rates determined according to accumulated value.
Figure 26:
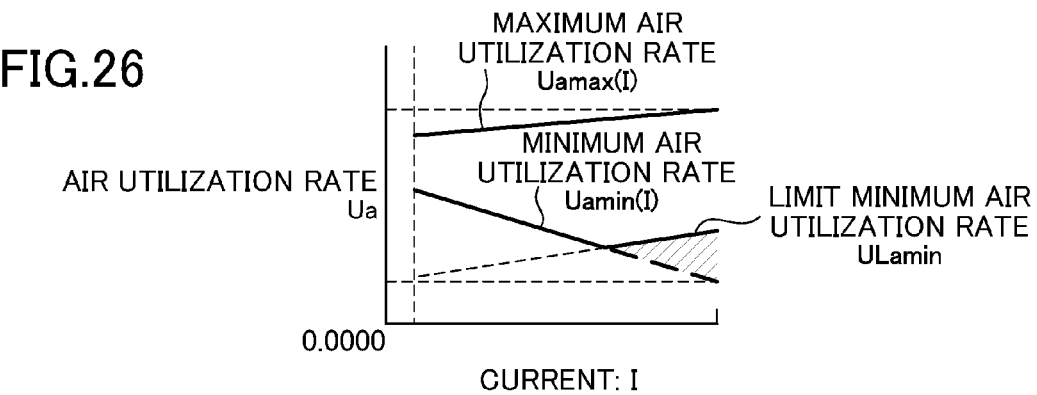
FIG. 26: A graph showing the range of air utilization rates which can be determined relative to each generating current.
Figure 27:
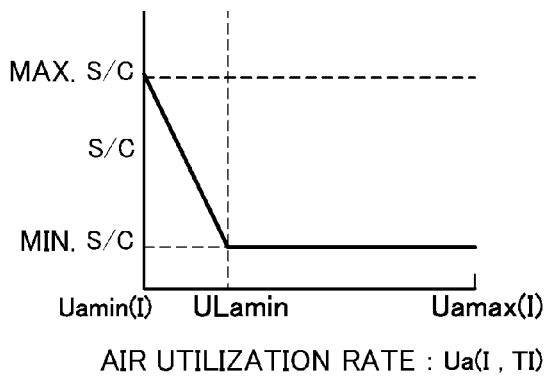
FIG. 27: A graph for determining water supply rates vs. a determined air supply utilization rate.
Figure 28:
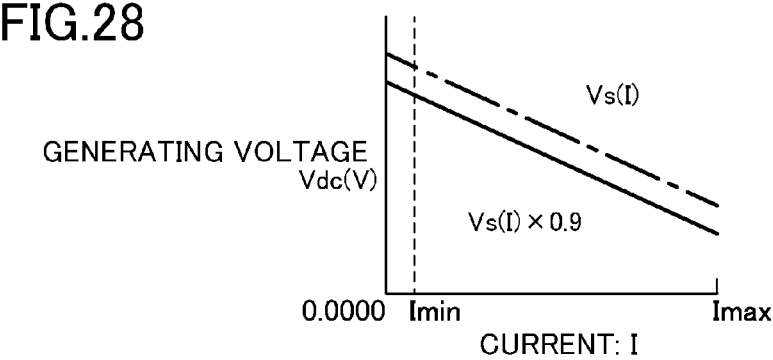
FIG. 28: A graph showing appropriate fuel cell module generating voltage vs. generating current.

FIG. 21 is a flowchart showing the order in which generating air supply rate, water supply rate, and fuel supply rate are determined based on the detected temperature Td. FIG. 22 is a graph showing the temperature of the fuel cell stack 14 temperature appropriate to the generated current. FIG. 23 is a graph showing the fuel utilization rate determined according to an integrated value. FIG. 24 is a graph showing a range of the fuel utilization rates determined with respect to the generated current. FIG. 25 is a graph showing the air utilization rate determined according to the integrated value. FIG. 26 is a graph showing a range of the air utilization rates determined with respect to the generated current. FIG. 27 is a graph for determining the water supply rate with respect to the determined air supply utilization rate. FIG. 28 is a graph showing the voltage generated by the fuel cell module 2 which is appropriate with respect to the generated current.

As shown by the dot-and-dash line in FIG. 22, in this embodiment an appropriate temperature Ts(I) for the individual fuel cell stack 14 is defined relative to the current being produced by the fuel cell module 2. The control section 110 controls the fuel supply rate, etc. so that the temperature of the individual fuel cell stack 14 approaches the appropriate temperature Ts(I). Generally speaking, that is, when the temperature of the individual fuel cell stack 14 is high relative to the generated current (when the individual fuel cell stack 14 temperature is above the dot-and-dash line in FIG. 22), the fuel utilization rate is increased, and the surplus heat amount accumulated in the insulating material 7, etc. is actively consumed, and the temperature inside the fuel cell module 2 is thereby reduced. Conversely, when the temperature of the individual fuel cell stack 14 is low relative to the generated current, the fuel utilization rate is reduced, and the temperature inside the fuel cell module 2 is prevented from dropping. Specifically, the fuel utilization rate is not determined simply from the detected temperature Td alone. The fuel utilization rate is determined by calculating an amount reflecting stored surplus heat which is derived by integrating an add/subtract value determined based on detected temperature Td, etc. An estimation value for the amount of stored surplus heat from the integration of add/subtract values is calculated by a stored heat estimation circuit 101*b* incorporated in the control section.

The flow chart shown in FIG. 21 determines the generating air supply rate, water supply rate, and fuel supply rate based on the detected temperature Td detected by the generating chamber temperature sensor 142 serving as temperature detection device, and is executed at a predetermined time interval.

First, in step S31 of FIG. 21, a first add/subtract value M1 is calculated based on the detected temperature Td and on FIG. 22. If the detected temperature Td is in a predetermined temperature range from the appropriate temperature Ts(I) (between the two solid lines in FIG. 22), the first add/subtract value M1 is set to 0. That is, when the detected temperature Td is within the range of $$Ts(I)-Te \leq Td \leq Ts(I)+Te,$$

the first add/subtract value M1 is set to 0. Here Te is the first add/subtract threshold temperature. Note that in the present embodiment, the first add/subtract threshold temperature Te is 3° C.

When the detected temperature Td is below the appropriate temperature Ts(I), i.e., $$Td < Ts(I)-Te \qquad (4)$$

(below the bottom solid line in FIG. 22), the first add/subtract value M1 is calculated by:

$$M1 = Ki \times (Td-(Ts(I)-Te)) \qquad (5)$$

In this calculation, the first add/subtract value M1 takes a negative value (a subtracting value). Note that Ki is a predetermined proportional constant.

When the detected temperature Td is above the appropriate temperature Ts(I), i.e., $$Td > Ts(I)+Te \qquad (6)$$

(above the bottom solid line in FIG. 22), the first add/subtract value M1 is calculated by:

$$M1 = Ki \times (Td-(Ts(I)+Te)) \qquad (7)$$

In this calculation, the first add/subtract value M1 takes a positive value (an additive value). Thus, the first add/subtract value is determined based on the generated current in addition to the detected temperature Td, and the amount of stored surplus heat is estimated by integrating these values. The appropriate temperature Ts(I), in other words, differs according to the generated current (power), and the first add/subtract value M1 is determined positive or negative based on the value of (Ts(I)+Te) or the value of (Ts(I)−Te) determined based on this appropriate temperature Ts(I).

Note that when the detected temperature Td exceeds (Ts(I)+Te), the first add/subtract value M1 becomes a positive value, and the fuel supply rate is changed to raise the fuel utilization rate as described below. Therefore, in the present supplication, the temperature (Ts(I)+Te) relative to the generated power is referred to as a fuel utilization rate change temperature. After high efficiency control begins in which the temperature exceeds the fuel utilization rate change temperature (Ts(I)+Te) and the fuel utilization rate is increased, the timing at which the operation goes back from the high efficiency control to target temperature range control in which the amount of accumulated surplus heat is not consumed is, as described below, a point at which the first integrated values N1id, such as the first add/subtract value M1 or the like, decrease to 0. Therefore, even after the detected temperature Td has dropped below the fuel utilization rate change temperature (Ts(I)+Te), the first integrated value N1id is maintained for a short time at a value greater than 0, and the high efficiency control is implemented. Therefore, the temperature at which the operation goes back from the high efficiency control to the target temperature range control is lower than the fuel utilization rate change temperature.

Next, in step S32 of FIG. 21, a second add/subtract value M2 is calculated based on the latest detected temperature Td and the detected temperature Tdb detected one minute earlier. First, when the absolute value of the difference between the latest detected temperature Td and the detected temperature Tdb detected one minute prior is less than a second add/subtract value threshold value temperature, the second add/subtract value M2 is set to 0. Note that in the present embodiment, the second add/subtract threshold temperature is 1° C.

When a change temperature difference, which is the difference between the latest detected temperature Td and the detected temperature Tdb detected one minute prior, is equal to or greater than the second add/subtract value threshold value temperature, the second add/subtract value M2 is calculated by $$M2 = Kd \times (Td - Tdb) \quad (8)$$

This second add/subtract value M2 is a positive value (additive value) when the detected temperature Td is rising and takes a negative value (subtractive value) when the detected temperature Td is falling. Note that Kd is a predetermined proportional constant. Therefore in cases where the detected temperature Td is rising, in the range where the change temperature difference (Td-Tdb) is large the second add/subtract value M2, which is a quick response estimate value, is increased more than in the range where the change temperature difference is small. Conversely, in cases where the detected temperature is falling in the range where the absolute value of the change temperature difference (Td-Tdb) is large, the second add/subtract value M2 is decreased more than in the range where the absolute value of the change temperature difference is small.

Note that in the present embodiment, the proportional constant Kd is a fixed value, but as a variant example, a different proportional constant Kd can be used in the case where the change temperature difference is positive and the case where it is negative. For example, the proportional constant Kd can also be set high when the change temperature difference is negative. Thus the quick response estimate value is changed relative to the change temperature difference more rapidly when the detected temperature is falling than when the detected temperature is rising. As a variant example, the proportional constant Kd can also be set higher in the range where the absolute value of the change temperature difference is high than in the range where it is low. This results in that the quick response estimate value is changed relative to the change temperature difference more rapidly in the range where the absolute value of the change temperature difference is high than in the range where the absolute value of the change temperature difference is low. It is also possible to combine a change of the proportional constant Kd based on whether the change temperature difference is positive or negative and a change of the proportional constant Kd based on the size of the absolute value of the change temperature difference.

Next, in step S33 of FIG. 21, the first add/subtract value M1 calculated in step S31 and the second add/subtract value M2 calculated in step S32 are added to the first integrated value N1id. In the first integrated value N1id, the usable amount of surplus heat accumulated in the insulating material 7 and the like is represented by the first add/subtract value M1, and a recent change of the detected temperature Td is represented by the second add/subtract value M2. In other words, the first integrated value N1id can be used as an estimated amount of surplus heat amount accumulated in insulating material 7 and the like. The calculation is performed in a continuous manner each time the FIG. 21 flow chart is executed after the operation of the solid oxide fuel cell system starts. The first add/subtract value M1 and the second add/subtract value M2 are added to or subtracted from a previously calculated first integrated value N1id, and the first integrated value N1id is updated to a new value. The first integrated value N1id is limited to a range between 0 and 4. When the first integrated value N1id reaches 4, the value is held at 4 until a next subtraction occurs. When the first integrated value N1id has declined to 0, the value is held at 0 until a next addition takes place.

Note that in step S33, the value of a second integrated value N2id is also calculated, in addition to the first integrated value N1id. As described below, the second integrated value N2id is calculated in exactly the same way as the first integrated value N1id is calculated until degradation occurs in the fuel cell module 2, and takes the same value as the first integrated value N1id takes.

Note that in this embodiment, as described above, an integrated value is calculated by adding a sum of the first add/subtract value M1 and the second add/subtract value M2 to the first integrated value N1id. That is, the first integrated value N1id is calculated by $$N1id = N1id + M1 + M2 \quad (9)$$

As a variant example, an integrated value can also be calculated by adding a product of the first add/subtract value M1 and the second add/subtract value M2. That is, in this variant example, the first integrated value N1id is calculated by $$N1id = N1id + Km \times M1 \times M2 \quad (10)$$

Here Km is a variable coefficient which is changed according to predetermined conditions. In this variant example, when the absolute value of the difference between the latest detected temperature Td and the detected temperature Tdb detected one minute prior is less than the second add/subtract value threshold value temperature, the second add/subtract value M2 is set to 1.

Furthermore, in step S34 of FIG. 21, the fuel utilization rate is determined using the graphs in FIGS. 23 and 24, based on the calculated first integrated value N1id.

FIG. 23 is a graph showing the value for the fuel utilization rate Uf with respect to the calculated first integrated value N1id. As shown by FIG. 23, when the first integrated value N1id is 0, the fuel utilization rate Uf is set to a minimum fuel utilization rate Ufmin. The fuel utilization rate Uf increases with an increase of the first integrated value N1id, and when the first integrated value N1id=1, becomes a maximum fuel utilization rate Ufmax. Within the range, the slope of the fuel utilization rate Uf is small where the first integrated value N1$id$ is small, and the slope becomes steeper as the first integrated value N1$id$ approaches 1. In other words, the fuel utilization rate Uf is changed with a change of the amount of stored surplus heat and is changed more where the estimated amount of stored surplus heat is large than where the stored heat amount is small. That is, the fuel supply rate is reduced so as to greatly increase the fuel utilization rate Uf as the estimated stored heat amount increases. Furthermore, when the first integrated value N1$id$ is greater than 1, the fuel utilization rate Uf is fixed at the maximum fuel utilization rate Ufmax. The specific values of these minimum fuel utilization rate Ufmin and maximum fuel utilization rate Ufmax are determined using the graph shown in FIG. 24, based on the generated current. Thus, when it is estimated that a usable amount of surplus heat is accumulated in the heat storing material 7 or the like, the fuel supply rate is reduced so that the fuel utilization rate for a generated power is higher than it is for the same generated power when a usable amount of surplus heat is not accumulated.

FIG. 24 is a graph showing a range of the fuel utilization rate Uf obtainable with respect to the generated current. The maximum and minimum values for the fuel utilization rate Uf are shown for the generated current. As shown in FIG. 24, the minimum fuel utilization rate Ufmin for the generated current is set to increase as the generated current increases. That is, the fuel utilization rate is set high when the generated power is large, and the fuel utilization rate is set low when the generated power is small. The straight line representing the minimum fuel utilization rate Ufmin corresponds to the basic fuel supply table in FIG. 9 of the first embodiment. When the fuel utilization rate is sent to a value on this straight line, the fuel cell module 2 can be thermally autonomous without utilizing the amount of surplus heat accumulated in the insulating material 7 or the like.

The maximum fuel utilization rate Ufmax, on the other hand, is set to change in a bent line fashion with respect to the generated current. Here the range of values which the fuel utilization rate Uf can takes with respect to the generated current (the difference between the maximum fuel utilization rate Ufmax and the minimum fuel utilization rate Ufmin) is narrowest when the generated current is maximum, and broadens as the generated current declines. This is because in the vicinity of where the generated current is maximum, the minimum fuel utilization rate Ufmin is high at which thermal independence is possible, and there is little margin for the fuel utilization rate Uf to increase (decreasing the fuel supply rate) even if the stored surplus heat is used. Moreover, because the minimum fuel utilization rate Ufmin at which thermal independence is possible declines as the generated current declines, the margin for the fuel supply rate to be reduced by utilizing stored surplus heat increases, and when there is a large amount of stored surplus heat, the fuel utilization rate Uf can be greatly increased. Therefore, the fuel utilization rate is changed over a larger range where the generated power is small than where the generated power is large.

In the region below, a predetermined utilization rate suppressing generation amount IU at which the generated current is extremely small, the range of values the fuel utilization rate Uf can take is set smaller as the generated power decreases. This means that in the range where generating current is small, the minimum fuel utilization rate Ufmin is low at which thermal independence is possible, and there is a margin for improvement thereof. However, in the range where the generated current is small, the temperature inside the fuel cell module 2 is low. Therefore, in this condition, if the operation is performed to greatly improve the fuel utilization rate Uf and rapidly consume the stored surplus heat accumulated in the insulating material 7 or the like, there is a risk of causing an excessive temperature drop inside the fuel cell module 2. Therefore, in the range where it is below a predetermined utilization rate suppressing generation amount IU at which the generated current is extremely small, a change amount to increase the fuel utilization rate Uf is reduced as the generated power declines. In other words, the amount of change causing a reduction of the fuel supply rate as the amount of generation by the fuel cell module 2 declines. The risk of causing a sudden temperature drop can thus be avoided, and the accumulated surplus heat can be utilized over a long time period.

In the present embodiment, the fuel supply rate is reduced by the fuel table change circuit 110*a* built into the control section 110 so that the fuel utilization rate Uf increases relative to the minimum fuel utilization rate Ufmin. The fuel table change circuit 110*a* does not change the basic fuel supply table, but acts to raise the fuel utilization rate by changing the fuel supply rate which serves as the base, thereby raising the fuel utilization rate, and thus the fuel table change circuit 110*a* corresponds to the fuel table change circuit in the first embodiment.

In step S34 of FIG. 21, specific values of the minimum fuel utilization rate Ufmin and the maximum fuel utilization rate Ufmax are determined using the graph in FIG. 24 based on the generated current. Next, the determined minimum fuel utilization rate Ufmin and maximum fuel utilization rate Ufmax are set according to the FIG. 23 graph, and the fuel utilization rate Uf is determined based on the first integrated value N1$id$ calculated in step S33.

Next, in step S35 of FIG. 21, an air utilization rate is determined using the FIGS. 25 and 26 graphs, based on the second integrated value N2$id$.

FIG. 25 is a graph showing values that the air utilization rate Ua can take with respect to the calculated second integrated value N2$id$. As shown in FIG. 25, when the second integrated value N2$id$ is between 0 and 1, the air utilization rate Ua is set to a maximum air utilization rate Uamax, which is the maximum value. In addition, as the second integrated value N2$id$ exceeds 1 and increases, the air utilization rate Ua declines, and when the second integrated value N2$id$=4, it becomes a minimum air utilization rate Uamin, which is the minimum value. Thus, the increased amount of air caused by reducing the air utilization rate Ua acts as a cooling fluid. Therefore, the air utilization rate Ua shown in FIG. 25 acts as a forced cooling circuit. The specific values of these minimum air utilization rate Uamin and the maximum air utilization rate Uamax are determined using the graph shown in FIG. 26, based on the generated current.

FIG. 26 is a graph showing the range of values that the air utilization rate Ua can take with respect to the generated current. The maximum and minimum values of the air utilization rate Ua are shown with respect to the generated current. As shown in FIG. 26, the maximum air utilization rate Uamax for the generated current is set to increase by a very small amount as the generated current increases. On the other hand, the minimum air utilization rate Uamin decreases as generating current increases. Reducing the air utilization rate Ua (increasing the air supply rate) more than the maximum air utilization rate Uamax results in the introduction of a larger amount of air into the fuel cell module 2 than is required for generation, causing the temperature inside the fuel cell module 2 to decline. Therefore, the air utilization rate Ua is reduced when the temperature in the fuel cell module 2 rises excessively, and it is necessary to reduce the temperature. In the present embodiment, reducing the minimum air utilization rate Uamin (increasing the air supply rate) with a rise of the generated current causes the air supply rate corresponding to the minimum air utilization rate Uamin to exceed the maximum air supply rate of the oxidant gas supply device 45 at a predetermined generated current. Therefore, in the region in which the minimum air utilization rate Uamin is at or above the predetermined generated current shown by the dotted line in FIG. 26, it is not possible to achieve the air utilization rate Ua set by the graph in FIG. 25. In such cases, the air supply rate is set to the maximum air supply rate of the oxidant gas supply device 45, regardless of the set value of the air utilization rate Ua. In conjunction with this, the air utilization rate Ua which is actually implemented increases at or above a predetermined generated current. When the oxidant gas supply device having a large maximum air supply rate is used, the portion of the minimum air utilization rate Uamin shown by the broken line in FIG. 26 can also be achieved. Note that the air utilization rate Ua defined by the maximum air supply rate of the oxidant gas supply device 45 is described as the limit minimum air utilization rate ULamin.

In step S35 of FIG. 21, the specific values of the minimum air utilization rate Uamin and the maximum air utilization rate Uamax are determined using the graph in FIG. 26, based on the generated current. Next, applying the determined minimum air utilization rate Uamin and maximum air utilization rate Uamax to the FIG. 25 graph, the air utilization rate Ua is determined based on the second integrated value N2id calculated in step S33.

Next, in step S36 of FIG. 21, the ratio S/C of the steam amount to the carbon amount is determined using FIG. 27, based on the air utilization rate Ua determined in step S35.

FIG. 27 is a graph in which the horizontal axis shows the air utilization rate Ua and the vertical axis shows the ratio S/C of the supplied steam amount to the carbon amount contained in the fuel.

First, in the range of the generated current in which the air utilization rate Ua set in step S35 is not defined by the maximum air supply rate of the oxidant gas supply device 45 (between Uamax and ULamin in FIG. 27), the value of the ratio S/C of the steam amount to the carbon amount is fixed at 2.5. Note that a ratio of the steam amount to the carbon amount S/C=1 means that the entire amount of carbon contained in the supplied fuel is chemically steam reformed by the supplied water (steam), without excess or shortage. Therefore, a ratio of the steam amount to the carbon amount S/C=2.5 means that steam (water) is supplied 2.5 times as much the minimum steam amount chemically as needed to steam reform the fuel. In actuality, the operation is performed with the steam amount whose ratio is S/C=1, carbon deposition occurs inside the reformer 20. So a steam amount whose ratio is S/C=approximately 2.5 is the appropriate amount for steam reforming the fuel.

Next, in the range of the generated current in which the air utilization rate Ua set in step S35 is limited by the maximum air supply rate of the oxidant gas supply device 45, the ratio S/C of the steam amount to the carbon amount is determined using the graph in FIG. 27. In FIG. 27, the horizontal axis is the air utilization rate Ua. The air supply rate declines as the air utilization rate Ua increases and approaches the maximum air utilization rate Uamax. When the air utilization rate Ua is reduced, on the other hand, and approaches the minimum air utilization rate Uamin (the dotted line in FIG. 26), the air supply rate reaches the limit, and the air utilization rate Ua becomes a limit minimum air utilization rate ULamin. As shown in FIG. 27, when the air utilization rate Ua is larger (air supply rate is low) than the limit minimum air utilization rate ULamin, the ratio of the steam amount to the carbon amount is set at S/C=2.5. Additionally, when the air utilization rate Ua determined in step S35 is smaller (air supply rate is large) than the limit minimum air utilization rate ULamin (between Uamin and ULamin in FIG. 27), the ratio S/C of the steam amount to the carbon amount increases as the air utilization rate Ua decreases, and at the minimum air utilization rate Uamin, it is set to S/C=3.5. That is, when the air utilization rate Ua determined in step S35 cannot be achieved using the limit minimum air utilization rate ULamin (when the air utilization rate Ua is determined to be within the region of the sloped line in FIG. 26), the ratio of the steam amount to the carbon amount S/C is increased, and the water supply rate is increased. Thus, the temperature of the reformed fuel gas discharged from the reformer 20 is reduced, causing the temperature inside the fuel cell module 2 to decline. Thus, when the water supply rate is increased after the air utilization rate Ua is reduced and the air supply rate is increased, the increased amount of water (steam) acts as a cooling fluid, so that the water supply rate shown in FIG. 27 acts as a forced cooling circuit.

In step S37, the specific fuel supply rate, air supply rate, and water supply rate are determined based on the fuel utilization rate Uf, the air utilization rate Ua, and the ratio S/C of the steam amount to the carbon amount respectively determined in steps S34, S35, and S36. In other words, the actual fuel supply rate is calculated by dividing the fuel supply rate—assuming the entire amount is used for electrical generation—by the determined fuel utilization rate Uf, and the actual air supply rate is calculated by dividing the air supply rate—assuming the entire amount is used for electrical generation—by the determined air utilization rate Ua. The water supply rate is calculated based on the calculated fuel supply rate and the ratio S/C of the steam amount to the carbon amount determined in step S36.

Next, in step S38, the control section 110 sends signals to the fuel flow regulator unit 38, the oxidant gas supply device 45, and the water flow regulator unit 28 serving as water supply device, and supplies the fuel, air, and water at the rates calculated in step S37, thereby completing the process of one iteration of the FIG. 21 flow chart.

Next, we discuss the time intervals at which the FIG. 21 flow chart is executed. In the present embodiment, the FIG. 21 flow chart is executed every 0.5 seconds when the output current is large, and as output current falls, executed at twice as long as the interval, which is every 1 second, 4 times as long as the interval, which is every 2 seconds, and 8 times as long as the interval, which is every 4 seconds. Thus, when the first and second add/subtract values are fixed values, changes made to the first and second add/subtract values at the interval become more gradual as the output current declines. That is, the stored heat amount estimating circuit 110b changes the estimated amount of the stored surplus heat amount at the interval more quickly as the output current (output power) increases. The estimated amount of stored surplus heat resulting from the integrated value thus accurately reflects the amount of actually stored surplus heat.

Next, referring to FIG. 28, we discuss the procedure for determining the fuel supply rate, air supply rate, and water supply rate when the fuel cell module 2 has degraded. FIG. 28 is a diagram showing the generated voltage relative to the generated current in the fuel cell module 2. In general, there is an internal resistance present in the individual fuel cell stack 14. Therefore, as shown in FIG. 28, the voltage drops when the current output from the fuel cell module 2 increases. The dot-and-dash line shown in FIG. 28 shows the relationship between the generated current and the generated voltage when the fuel cell module 2 has not degraded. In contrast, when the fuel cell module 2 has degraded, the internal resistance in the individual fuel cell stack 14 rises. As a result, the generated voltage becomes smaller for the same generated current.

In the solid oxide fuel cell of the present embodiment, when the generated current drops by 10% or more relative to the initial generated voltage, and the generated voltage goes into the region below the solid line in FIG. 28, the fuel supply rate, air supply rate, and water supply rate are determined by processing in a manner taking degradation into consideration.

For example, when the generated voltage is in the region below the solid line in FIG. 28, an integration of the first integrated value N1$id$ is stopped at step S33 in FIG. 21, and only integration of the second integrated value N2$id$ is continued. The value of the first integrated value N1$id$ used to determine the fuel utilization rate Uf with reference to the graph in FIG. 23 is fixed at a constant value. The fuel utilization rate Uf is therefore fixed until the generated voltage goes out of the region below the solid line in FIG. 28. Thus, changes to increase the fuel utilization rate Uf are reduced more after the fuel cell module 2 has degraded than while the fuel cell module 2 has not degraded. At the same time, the second integrated value N2$id$ used to determine the air utilization rate Ua with reference to the graph in FIG. 26 is reduced as is reduced in the past, and increases and decreases of the air utilization rate Ua are continued. The fuel utilization rate Uf is changed based on degradation of the fuel cell module 2, in addition to the first and second addition values reflecting the estimated amount of stored surplus heat, and the power demand.

Next we discuss the operation of a solid oxide fuel cell using the flow chart shown in FIG. 21.

First, when the value of the first integrated value N1$id$ calculated in step S33 is 0, the fuel utilization rate Uf determined in step S34 is set at the minimum fuel utilization rate Ufmin (fuel supply rate maximum) for the generated current. Thus, even in the state in which the first integrated value N1$id$ is 0, and the surplus heat accumulated in the insulating material 7 or the like is small, sufficient fuel is supplied for the fuel cell module 2 to achieve thermal independence. When the value of the second integrated value N2$id$ calculated in step S33 is 0, like the first integrated value N1$id$, the air utilization rate Ua determined in step S35 is set at the maximum air utilization rate (air supply rate minimum) for that generated current. Therefore, cooling of the individual fuel cell stack 14 by the generating air introduced into the fuel cell module 2 can be minimized, and the temperature of the individual fuel cell stack 14 can be kept rising.

Next, when the fuel cell module 2 is operated in a state where the detected temperature Td is higher than the appropriate temperature Ts(I), and Td>Ts(I)+Te, the value of the first add/subtract value M1 becomes positive, and the value of first integrated value N1$id$ becomes greater than 0. Thus, in FIG. 23, the fuel utilization rate Uf becomes higher than the minimum fuel utilization rate Ufmin, and the fuel supply rate is reduced, and the amount of excess fuel not used to generate electricity is reduced. The fuel utilization rate Uf is greatly increased by the control section 110 as the value of the first integrated value N1$id$ reflecting the estimated amount of stored surplus heat increases. By increasing the fuel utilization rate Uf, the fuel supply rate is reduced to below a supply rate at which thermal independence is possible, and the high efficiency control is executed in which the amount of surplus heat accumulated in the insulating material 7 and the like is used. The amount of excess fuel is reduced and the amount of surplus heat accumulated in the insulating material 7 or the like is utilized. Therefore, the fuel table change circuit 110$a$ suppresses the rise of the temperature in the fuel cell module 2 while electricity continues to be generated. When operation is continued when Td>Ts(I)+Te, an addition of the positive value to the first add/subtract value M1 is repeated, and the value of the first integrated value N1$id$ also increases. When the first integrated value N1$id$ reaches 1, the fuel utilization rate Uf is set to the maximum fuel utilization rate Uafmax (fuel supply rate minimum). Fuel supplied to the fuel cell module 2 is determined based on the history of the detected temperature Td, which reflects the amount of surplus heat accumulated in the insulating material 7 or the like.

Even when the first integrated value N1$id$ further increases and exceeds 1, the fuel utilization rate Uf is fixed at the maximum fuel utilization rate Uafmax (fuel supply rate minimum), as shown in FIG. 23. On the other hand, when the second integrated value N2$id$, which takes the same value as the first integrated value N1$id$ (when the fuel cell module 2 is not degraded), also exceeds 1, the air utilization rate Ua declines (air supply rate increases) based on FIG. 25. Thus, the inside of the fuel cell module 2 is kept cooled because of the increase of the supplied air.

By contrast, when the fuel cell module 2 is operated where the detected temperature Td is lower than the appropriate temperature Ts(I), and Td<Ts(I)−Te, the value of the first add/subtract value M1 becomes negative, and the value of first integrated value N1$id$ is reduced. The fuel utilization rate Uf is therefore maintained (first integrated value N1$id$>1) or decreased (first integrated value N1$id$≤1). Also, the air utilization rate Ua increases (second integrated value N2$id$>1) or is maintained (second integrated value N2$id$≤1). The temperature inside the fuel cell module 2 can thus be kept rising.

In the above-described operation of a solid oxide fuel cell, a focus is placed only on the first add/subtract value M1 calculated based on the history of the detected temperature Td. However, the first integrated value N1$id$ and the second integrated value N2$id$ are also influenced by the second add/subtract value M2. The fuel cell module 2, particularly the individual fuel cell stack 14, has an extremely large heat capacity, and changes of the detected temperature Td thereof are extremely slow. Therefore once, the detected temperature Td starts rising, it is difficult to suppress the temperature from rising in a short time period, and when the detected temperature Td starts falling, a long period of time is required to bring it back to rising. Therefore, once the detected temperature Td starts rising or falling, an immediate counteraction of modifying the first and second integrated values is required.

That is, when the latest detected temperature Td is above the detected temperature Tdb detected one minute prior by an amount equal to or greater than the second add/subtract value threshold value temperature, the second add/subtract value M2 becomes a positive value, and the first and second integrated values are increased. Therefore, the first and second integrated values reflect the behavior of the detected temperature Td, which is rising. Similarly, when the latest detected temperature Td is above the detected temperature Tdb detected one minute prior by an amount equal or greater than the second add/subtract value threshold value temperature, the second add/subtract value M2 becomes a negative value, and the first and second integrated values are decreased. In other words, the second add/subtract value M2, which is a quick response estimate value, is calculated by a change temperature difference, which is the difference between the latest detected temperature Td detected by the generating chamber temperature sensor 142 and the detected temperature Tdb detected in the past. Therefore, when the detected temperature Td is steeply dropping, the change amount increasing the fuel utilization rate Uf is more suppressed than when it is gradually dropping, and in the region where the generated power is below the suppressed utilization rate generation amount IU, since the maximum fuel utilization rate Ufmax is also set low, the change amount is greatly suppressed. Therefore, the first and second integrated values reflect the behavior of the detected temperature Td, which is falling. Thus, in the present embodiment, the amount of stored surplus heat is estimated based on an integrated value for the add/subtract determined based on detected temperature, and on the differential value between the newly detected temperature and previously detected temperatures. That is, in the present embodiment, the amount of stored surplus heat is estimated by the stored heat amount estimating circuit 110*b* based on the integrated value of the first add/subtract value M1, which is a basic estimated value calculated based on the history of the detected temperatures Td, and based on the second add/subtract value M2, which is a quick response estimate value calculated based on the rate of change of the detected temperature Td over a period of time shorter than the history of the basic estimated value calculation. Thus, in the present embodiment, the amount of stored surplus heat is estimated based on the sum of the basic estimated value and the quick response estimate value.

Note that temperature changes in the fuel cell module 2 are extremely slow compared to the 1 minute interval at which the detected temperatures Td and Tdb are detected Therefore, it is often the case that the second add/subtract value M2 is 0. Therefore, the first and second integrated values are primarily dominated by the first add/subtract value M1, and the second add/subtract value M2 acts to modify the values of the first and second integrated values when the detected temperature Td starts rising or falling. Thus, in addition to the detected temperature history, changes of the detected temperature Td are also considered to estimate the amount of stored surplus heat using the second add/subtract value M2. Therefore, when the change of the detected temperature Td is large (a change equal to or larger than the second add/subtract value temperature recovery temperature), since the second add/subtract value M2 has a non-negligible value, the amount of stored surplus heat estimated value is modified, and the fuel utilization rate Uf is greatly changed.

Next, referring to FIGS. 29 through 32, we discuss limitations to the variable range of generated power.

As described above, in the solid oxide fuel cell of the present embodiment, the amount of surplus heat accumulated in the insulating material 7 or the like is utilized to increase the fuel utilization rate, and the temperature inside the fuel cell module 2 is controlled to an appropriate temperature by actively utilizing the stored surplus heat. As explained with FIGS. 19 and 20, frequent increases and decreases of the power produced by the fuel cell module 2 to meet the power demand can cause the temperature inside the fuel cell module 2 to rise excessively. It is possible to suppress such excessive temperature rises by increasing the fuel utilization rate and actively utilizing the amount of surplus heat accumulated in the insulating material 7 or the like. As explained using FIG. 24, however, in the range where the power generated is large, the minimum fuel utilization rate Ufmin takes a large value Therefore, there is little room for increasing the fuel utilization rate and utilizing the stored surplus heat. Therefore, when the generated power is large, it is difficult to effectively reduce an excessively raised temperature inside the fuel cell module 2 even by increasing the fuel utilization rate and utilizing the stored surplus heat. For this reason, when an excessive temperature rise occurs in the fuel cell module 2 of the present embodiment, the range in which the generated power is variable to follow the power demand is restricted to a narrow range. Since this causes the fuel cell module 2 to be operated to output small generated power, the margin for utilizing the stored surplus heat increases, making it possible to effectively lower the temperature inside the fuel cell module 2. By narrowing the range in which the generated power is variable to follow the power demand, temperature rises caused by frequent increases and decreases of the generated power are suppressed.

Note that temperature rises inside the fuel cell module 2 caused by frequent increases and decreases of the power demand, as explained in FIGS. 19 and 20, also occur in the solid oxide fuel cell of the first embodiment of the present invention described above. Therefore, referring to FIGS. 29 through 32, the limitations to the variable range of generated power explained below are explained, which can be implemented in context of the above-described first embodiment of the present invention.

Figure 29:
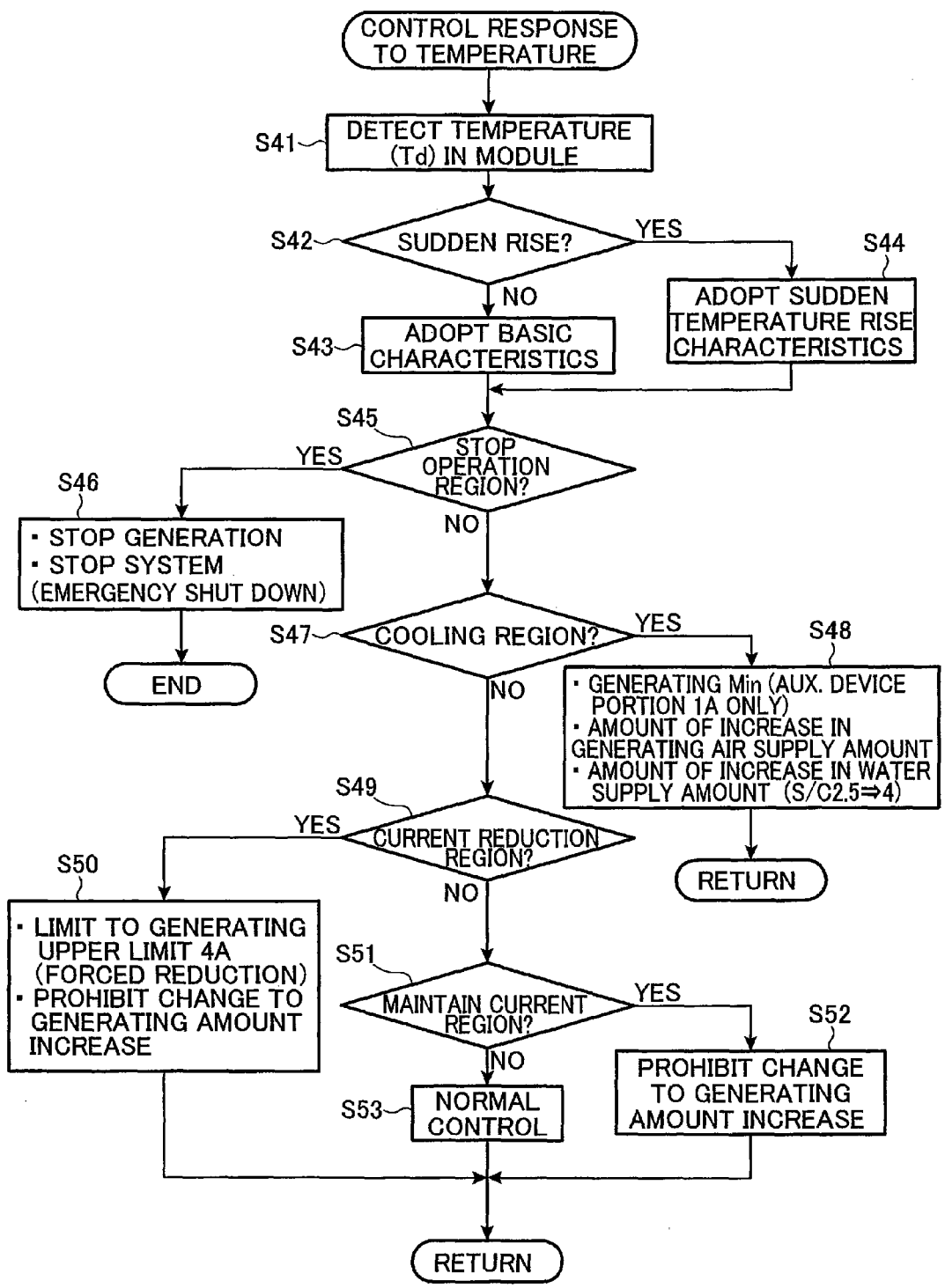
FIG. 29: A flowchart showing the procedure for limiting the range of power produced by the fuel cell module in a second embodiment of the present invention.
Figure 32:
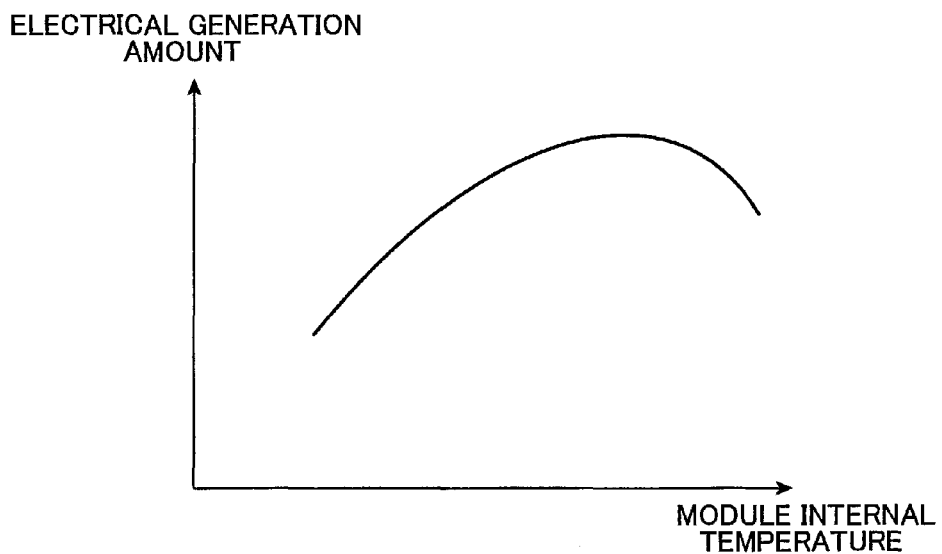
FIG. 32: A graph showing an example of the relationship between temperature inside the fuel cell module and maximum generatable power.

FIG. 29 is a flowchart showing a procedure for limiting the range of the power produced by the fuel cell module of the present embodiment. FIG. 30 is a map showing the limitations defined by the generated current and the detected temperature Td. FIG. 31 is a timing chart showing an exemplary operation of the second embodiment of the present invention. FIG. 32 is a graph showing an example of the relationship between the temperature inside the fuel cell module and the maximum generatable power.

First, as shown by a solid line in FIG. 30, in the solid oxide fuel cell of the present embodiment, an appropriate temperature to be maintained in the fuel cell module 2 is set for the generated current. This appropriate temperature corresponds to the dot-and-dash line in FIG. 22. As shown in FIG. 30, a current maintaining region is defined in the region where the temperature is above the appropriate temperature. The minimum temperature in the current maintaining region is defined to differ according to the generated power from the fuel cell module 2, and the current maintaining region minimum temperature is defined to increase as the generated power increases. The minimum temperature in the current maintaining region with respect to the generated power is defined so that the difference relative to the appropriate temperature for the fuel cell module 2 increases as the generated power decreases. When the operating state of fuel cell module 2 transitions to the current maintaining region, the output current from the fuel cell module 2 is prohibited from increasing. Furthermore, a current reduction region is defined in the region where the temperature is higher than the current maintaining region. When the operating state transitions to the current reduction region, the output current from the fuel cell module 2 is forcibly reduced. An air cooling region is also defined in the region where the temperature is above the current reduction region. When the operating state transitions to the air cooling region, the generating air supply rate is set to the maximum flow rate suppliable by the oxidant gas supply device 45. A stop operation region is also defined in the region in which the temperature is higher than the air cooling region. When the operating state transitions to the stop operation region, the power generation by the fuel cell module 2 is stopped to prevent damage to the solid oxide fuel cell system.

Moreover, when the detected temperature Td has risen steeply, the temperature line demarcating the current maintaining region is lowered as shown by the dot-and-dash line in FIG. 30. In such cases, the temperature line demarcating the current reduction region is lowered as shown by the double dot-and-dash line in FIG. 30. Thus, when the detected temperature Td steeply rises, a limitation is quickly imposed on the output current, thereby reliably preventing an excessive temperature rise.

Next, referring to FIG. 29, we discuss the procedure for limiting current produced by the fuel cell module.

First, the detected temperature Td is read in step S411 of FIG. 29. Next, in step S42, the detected temperature Td read in step S41 and a previously detected temperature Td are compared. If the difference between the detected temperature Td read in step s41 and the previously determined detected temperature Td is at or below a predetermined threshold temperature, the process advances to step S43.

In step S43, the map with the solid lines shown in FIG. 30 which define the original locations of regions is selected as an initial map for determining a temperature region. If the difference between the latest detected temperature Td and the previously determined detected temperature Td is larger than the predetermined threshold temperature, the process advances to S44 in which the solid lines are replaced with the dot-and-dash lines and the double dot-and-dash lines shown in FIG. 30 which are adopted when the temperature is steeply rising to revise the original locations of the regions in the map for determining the temperature region.

Next, in step S45, a judgment is made as to whether the detected temperature Td is within the stop operation region. In this embodiment, if the detected temperature Td is at or above 780° C., the temperature is judged to be in the stop operation region. When it is judged that the detected temperature Td is within the stop operation region, the process advances to step S46. In step S46, the power generation by the fuel cell module 2 is stopped, and the solid oxide fuel cell system makes an emergency stop.

On the other hand, if it is judged in step S45 that the detected temperature Td is not within the stop operation region, the process advances to step S47. In step S47 a judgment is made as to whether the detected temperature Td is within the air cooling region. In the present embodiment when the detected temperature Td is 750° C. or greater, it is judged to be in the air cooling region. When it is judged that the detected temperature Td is within the air cooling region, the process advances to step S48.

In step S48, the generated current is fixed at a minimum current of 1 A, which will be consumed to run the auxiliary unit 4 without being output to the inverter 54. The generating air supply rate is set to the maximum flow rate suppliable by the oxidant gas supply device 45. The water supply rate is also increased and a ratio between the steam and carbon amounts is set to S/C=4. The process then completes one iteration of the process in the flow chart shown in FIG. 29.

On the other hand, if it is judged in step S47 that the detected temperature Td is not within the air cooling region, the process advances to step S49. In step S49 a judgment is made as to whether the detected temperature Td and the generated current are within the current reduction region. If they are within the current reduction region, the process advances to step S50.

In step S50, the generated current from the fuel cell module 2 is forcibly set to 4 A or below. In other words, the upper limit value of the generated power from the fuel cell module 2 is reduced to a temperature rise-suppressing power (400 W), which is higher than ½ the maximum rated power of 700 W. Thereafter, when the power demand declines, the upper limit value of the generated power (current), following the power demand, is reduced, and the generated current is maintained, not increased, even if the power demand grows. One iteration of the process in the flow chart of FIG. 29 is thus completed. This type of limitation to the generated current continues until the detected temperature Td and the generated current go outside the current reduction region.

On the other hand, if a judgment is made in step S49 that the detected temperature Td and the generated current are not within the current reduction region, the process advances to step S51. In step S51 a judgment is made as to whether the detected temperature Td and the generated current are within the current maintain region. If they are within the current reduction region, the process advances to step S52.

In step S52, the generated current is prohibited from increasing, and thereafter the generated current is maintained without being increased, even if the power demand grows. Subsequently, when the power demand declines, the upper limit value of the generated current (power), following the drop of the power demand, is reduced, and the upper limit of the generated current (power) is maintained, not raised, even if the power demand grows. This type of limitation to the generated current continues until the detected temperature Td and the generated current mitigate outside the maintain current region, and the excessive temperature rise of the fuel cell module 2 is resolved. One iteration of the process in the flow chart of FIG. 29 is thus completed.

In the present embodiment, restrictions on the generated power are started when the detected temperature Td rises above the temperature line for defining the maintain current region for the generated current. The minimum temperature of the maintain current region relative to the generated current is referred to as a generated power restriction temperature (FIG. 30). The generated power restriction temperature is set higher in the present embodiment than the fuel utilization rate change temperature (Ts(I)+Te) (FIG. 22) at which a change to increase the fuel utilization rate is started.

On the other hand, if a judgment is made in step S51 that the detected temperature Td and the generated current are not within the maintain current region, the process advances to step S53. At step S53, limitations are not imposed on the generated current, and control utilizing the stored surplus heat is executed.

Next, referring to FIG. 31, we discuss an exemplary operation for limiting the generated current.

The timing chart shown in FIG. 31 schematically depicts, in the order from the top, changes of the detected temperature Td, a target current, the generated current, the fuel supply rate, the fuel utilization rate, and the air supply rate. The target current here refers to the current determined from the power demand and the generated voltage.

First, at time t20 in FIG. 31, the generated current is approximately 6 A, and the detected temperature Td is slightly below the appropriate temperature at a generated current of 6 A (corresponding to t20 in FIG. 30).

Next, at times t20-t21, because of larger increases and decreases of the power demand repeated over a short period, the target current also greatly increases and decreases, and the generated current also increases and decreases to follow the changes. By contrast, the fuel supply rate, as explained in FIG. 20, is controlled to be held unchanged for a predetermined time even after the generated current has declined, and controlled to be increased ahead of an increase of the generated current. Thus, the fuel supply rate becomes excessive relative to the generated current, resulting in that a large amount of excess fuel is supplied. Since the excess fuel is used to heat the interior of the fuel cell module 2, at times t20-t21, the detected temperature Td starts to rise.

Furthermore, at time t21, the detected temperature Td reaches the temperature boundary defining the maintain current region for holding the generated current at approximately 6 A (t21 in FIG. 30, corresponds the transition from step S51→S52 in FIG. 29). Step S52 in FIG. 29 is thus executed in which the generated current is prohibited from rising, and the generated current is maintained. Therefore, at times t21-t22, the target current is growing to approximately 7 A, but the generated current is maintained at approximately 6 A. By prohibiting the generated current from rising, the upper limit value of the variable range of the generated power is reduced, and the variable range is narrowed, causing the amount of excess fuel associated with changes of the power demand to decline. Thus, step S52 of FIG. 29, where the amount of excess fuel amount is reduced while electrical generation continues, is acting as a temperature rise suppressing circuit. Step S51 judges whether step S52, which acts as the temperature rise-suppressing circuit, is executed, and acts as an excess temperature rise estimating circuit for estimating an occurrence of excessive temperature rises in the fuel cell module 2.

At times t21-t22, moreover, the detected temperature Td keeps rising. Therefore, the first add/subtract value M1 becomes a truly large value, and the first integrated value N1*id* value also increases significantly. The fuel supply rate is thus reduced to increase the fuel utilization rate Uf (FIG. 23). The increase of the fuel utilization rate Uf also acts to reduce the amount of excess fuel and lower the temperature inside the fuel cell module, thus acting as a temperature rise-suppressing circuit. Note that at times t21-t22, the fuel utilization rate Uf is increased, and the amount of surplus heat accumulated in the insulating material 7 or the like is actively consumed. However, because the thermal capacity of the fuel cell module 2 is extremely large, the detected temperature Td continues to rise.

Next, at time t22, the increased fuel utilization rate Uf reaches the maximum fuel utilization rate Ufmax (=75%), which is the maximum fuel utilization rate achievable when a current of approximately 6 A is generated (first integrated value N1*id*=1 in FIG. 23; FIG. 24). At time t22, the fuel utilization rate Uf is raised to the maximum fuel utilization rate Ufmax. Therefore, at times t22-t23, the fuel utilization rate Uf is maintained at the maximum fuel utilization rate Ufmax. On the other hand, at times t22-t23, the detected temperature Td is still continuing to rise. Therefore, the value of the second integrated value N2*id* (having the same value as the first integrated value N1*id*) also grows. Associated with this, the air utilization rate Ua is reduced (N2*id* in FIG. 25>1); i.e., the air supply rate is increased.

In addition, at time t23, the detected temperature Td reaches the current reduction region when a current of approximately 6 A is generated (corresponding to step S49→S50 in FIG. 29). This causes step S50 in FIG. 29 to be executed, and the generated current is steeply reduced from approximately 6 A to 4 A (t23→t23' in FIG. 30), the upper limit value of the generated power variable range is further reduced, and the variable range is further narrowed. Therefore, the fuel utilization rate Uf is reduced very slightly from the maximum fuel utilization rate Ufmax achievable when a current of 6 A is generated to the maximum fuel utilization rate Ufmax when a current of 4 A is generated (FIGS. 24, 31). Note that at time t23, the fuel utilization rate Uf is lowered. However, since the generated current is reduced to 4 A, the absolute value of the fuel supply rate and the absolute amount of the excess fuel are lowered. Since the fuel utilization rate Uf is maintained at the maximum fuel utilization rate Ufmax for the generated current being falling, consumption of the amount of accumulated surplus heat is further promoted. By reducing the generated current in this way, step S50 in FIG. 29, which reduces the amount of excess fuel while generation continues, also acts as a temperature rise-suppressing circuit. However, the detected temperature Td still rises at times t23-t24.

Next, at time t24, the detected temperature Td reaches the temperature for defining the air cooling region (step S47→S48 in FIG. 29, corresponding to t24 in FIG. 30). Step S48 in FIG. 29 is thus executed, and the air supply rate is increased to the maximum air supply rate achievable by the oxidant gas supply device 45. The generated current is gradually reduced from 4 A to 1 A. Thereafter, the generated current reduced to 1 A, which is the temperature rise-suppressing generation amount, is maintained at the fixed level until the detected temperature Td declines to a temperature below the temperature for defining the current maintain region. The generated current which has been reduced to 1 A is entirely consumed to operate the auxiliary unit 4 and not output to the inverter 54. As the generated current drops, the fuel utilization rate Uf is reduced from the maximum fuel utilization rate Ufmax achievable when a current of 4 A is generated to the maximum fuel utilization rate Ufmax (=50%) achievable when a current of 1 A is generated (FIG. 24).

Thus, after step S50 in FIG. 29, which is the temperature rise-suppressing circuit, is executed to stop the temperature from rising to reduce the amount of excessive fuel, if further suppression of temperature rise is required, the air supply is increased. The amount of air increased beyond the supply rate needed for electrical generation acts as a cooling fluid flowing into the fuel cell module 2. Therefore, step S48 in FIG. 29 functions as a forced cooling circuit.

On the other hand, if by executing step S50, which is the temperature rise-suppressing circuit for reducing the amount of excess fuel, the detected temperature Td drops before reaching the temperature of the air cooling region, cooling by step S48, which is the forced cooling circuit, is not executed. Therefore, a determination as to whether or not to execute suppression of temperature rise by the forced cooling circuit is made based on temperature changes in the fuel cell module 2 after the temperature rise-suppressing circuit suppresses temperature rises.

After time t24, the detected temperature Td continues to rise, but at time t25, the temperature shifts to decline (t24→t25 in FIG. 30). Thereafter, the detected temperature Td starts to decline, and at time t26 declines to reach the upper limit temperature of the current reduction region (t25→t26 in FIG. 30). A reduction of the air supply rate thus begins.

Next, at time t27, the temperature declines to the upper limit temperature of the maintain current region (t26→t27 in FIG. 30). The detected temperature Td continues to further decline, and at time t28 declines to the lower limit temperature of the maintain current region (t27→t28 in FIG. 30).

At time t28, when the detected temperature Td goes down out of the current maintain region, the generated current begins to increase in order to meet the target current. In conjunction with this, the fuel supply rate also starts to increase. While taking the value of the maximum fuel utilization rate Ufmax for the generated current, the fuel utilization rate Uf increases.

Note that in the above-described embodiment, temperature rises are suppressed by lowering the upper limit of the variable range of the generated power according to the temperature inside the fuel cell module 2. However, it is also possible as a variant example to suppress temperature rises by lowering a frequency of increases and decreases of the generated power. That is, when the temperature inside the fuel cell module 2 has risen, a further temperature rise can be suppressed by reducing responsiveness to a rise of the power demand and reducing the responsiveness to increase the generated power. When the responsiveness to an increase of the power demand is reduced, the generated power increases more slowly in response to increases of the power demand. Therefore, when the power demand increases and decreases frequently, the range where the generated power is variable to attempt to meet the changes of the power demand becomes smaller, and the frequency at which the generated power increases and decreases is also reduced, so that the amount of excess fuel supplied accordingly declines. Therefore, a reduction of the responsiveness to an increase of the power demand continues until an excessively high temperature inside the fuel cell module 2 is lowered.

Alternatively, a limitation can also be placed on the frequency at which the generated power is increased for a unit time to meet increases of the power demand. In this case, a number of times per predetermined time unit may be used as a limitation at which the generated power starts to rise. When the number of times per predetermined time becomes larger than the limitation, the generated power is controlled so as not to allow the generated power to follow an increase of the power demand.

In the above-described embodiment, the generated current upper limit is lowered to 4 A when the detected temperature Td reaches the current reduction region. However, it is also possible, as a variant example, to make variable the upper limit of the generated power. For example, the generated power upper limit value to be lowered is reduced more as the temperature inside the fuel cell module 2 increases.

Next, referring to FIG. 32, we discuss the relationship between the temperature inside the fuel cell module 2 and a maximum generatable power.

As discussed above, there is a correlation between the generated power (current) from the fuel cell module 2 and the appropriate temperature inside the fuel cell module 2, under which to obtain a large generated power requires raising the temperature inside the fuel cell module 2. However, when the fuel cell module 2 is in a temperature region over 700° C., which is higher than the appropriate temperature relative to the generated power, because of the characteristics of the individual fuel cell stack 14, the voltage generated by the fuel cell units 16 declines. Therefore, when a large current is extracted from the individual fuel cell stack 14 in order to output a large power, the temperature of the individual fuel cell stack 14 further rises, and the generated voltage falls, resulting in that the output power does not increase even though current is increased. As a result, where the temperature in the fuel cell module 2 is high, the maximum power actually generable declines as the temperature rises, as shown in FIG. 32. When an attempt is made to extract the maximum rated power from the fuel cell module 2 in the temperature region, current is increased in order to increase extracted power. A rise of current further increases the temperature of the fuel cell module 2 and reduces the power extracted from the same. When such an attempt continues to obtain a predetermined rated power, a thermal runaway may occur which causes a sudden temperature rise in the fuel cell module 2.

In the present embodiment, a thermal runaway can be prevented in advance in the region where the temperature inside the fuel cell module 2 is higher than the appropriate temperature by maintaining or lowering the generated current even when the power demand has increased.

Figure 33:
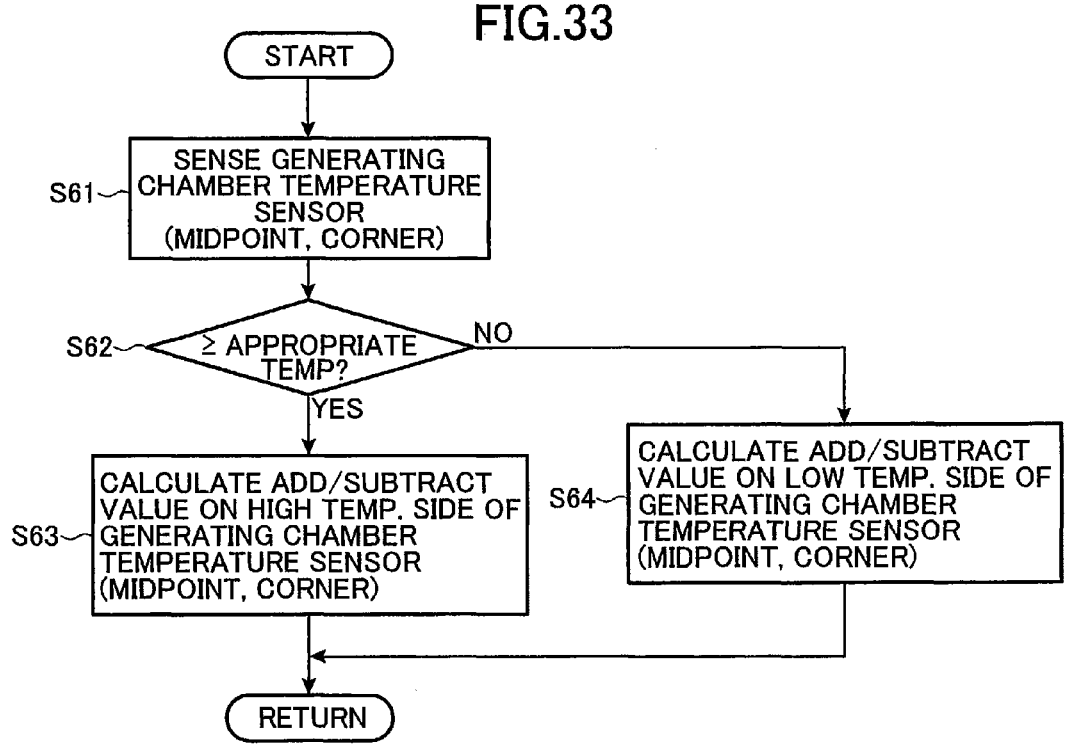
FIG. 33: A flow chart showing a procedure for calculating a first add/subtract value based on temperatures detected by multiple temperature sensors.

Next, referring to FIG. 33, we discuss measurement of the detected temperature Td in the present embodiment.

FIG. 33 is a flow chart showing a procedure for calculating a first add/subtract value M1 based on the temperatures Td detected by multiple temperature sensors.

As shown in FIG. 3, in the present embodiment, the two generating chamber temperature sensors 142 are provided inside the generating chamber 10. Inside the fuel cell module 2 in the present embodiment the twenty fuel cell units 16 are arrayed in the width direction (FIG. 2) and eight fuel cell units 16 are arrayed in the depth direction (FIG. 3). Therefore, a total of 160 fuel cell units 16 are arranged in a rectangular fashion as seen in plan view. In this embodiment, of the two generating chamber temperature sensors 142, one is disposed adjacent to the vertex of the rectangle, and the other is disposed adjacent to the midpoint of the long side of the rectangle. Thus, in the present embodiment the two generating chamber temperature sensors 142 are disposed so that different temperatures are detected within the fuel cell module 2.

Therefore, the temperature Td detected by the generating chamber temperature sensors 142 disposed adjacent to the rectangle vertices primarily reflect the temperature of the fuel cell units 16 disposed near the vertices of the rectangle, and the temperature Td detected by the generating chamber temperature sensors 142 disposed adjacent to the midpoint of a long side of the rectangle primarily reflect the temperature of the fuel cell units 16 disposed near the midpoint of the long side of the rectangle. The fuel cell units 16 disposed close to the vertices of the rectangle can easily be robbed of its heat by the surrounding insulating material 7 or the like and are therefore at the lowest temperature. The fuel cell units 16 disposed near the midpoint of the long side of the rectangle reach a higher temperature than the fuel cell units 16 disposed near the vertices. In the present embodiment, the temperature differences among the fuel cell units 16 may reach several tens of degrees. Note that it is believed that the fuel cell units 16 disposed near the intersection of the diagonals of the rectangle reach the highest temperature, and the generating chamber temperature sensors may also be disposed so as to measure this temperature.

In step S61 of FIG. 33, the detected temperatures Td are read from the two generating chamber temperature sensors 142, respectively. Next, in step S62, an average value of the temperatures read from the detected temperature Td is calculated and a judgment is made as to whether the averaged temperature is higher than the appropriate temperature Ts(I). When the averaged temperature is higher than the appropriate temperature Ts(I), the process advances to step S63. On the other hand, when the averaged temperature is lower than the appropriate temperature Ts(I), the process advances to step S64.

In step S63, the first add/subtract value M1 is calculated based on the higher of the two detected temperatures Td (the first add/subtract value M1 becomes a positive value or 0)

and the process for one iteration of the FIG. 33 flow chart is completed. That is, the estimated amount of increase of the stored surplus heat amount is determined based on the higher of the two detected temperatures Td. In step S64, on the other hand, the first add/subtract value M1 is calculated based on the lower of the two detected temperatures Td (the first add/subtract value M1 becomes a negative value or 0) and the process for one iteration of the FIG. 33 flow chart is completed. That is, the estimated amount of reduction of the stored surplus heat amount is determined based on the lower of the two detected temperatures Td. Thus, the detected temperature Td on the higher temperature side is adopted when it is above the appropriate temperature Ts(I), whereas the lower side temperature Td is adopted when it is below the appropriate temperature Ts(I). The amount of stored surplus heat is in this way estimated based on the temperature of the higher temperature fuel cell unit 16 when an excessive temperature rise becomes a problem. When a temperature reduction is a problem, the amount of stored surplus heat is estimated based on the lower temperature among the fuel cell units 16 (normally the fuel cell units positioned at vertices of the rectangle). Therefore, the amount of stored surplus heat can be estimated on the safe side even when the temperature of each of the fuel cell units 16 differs.

Note that in the above-described embodiment, the detected temperature Td on either the higher temperature side or the lower temperature side is selected and the integrated value is calculated based thereon. However, it is also acceptable as a variant example to obtain the integrated value from multiple detected temperatures Td. In the example, the amount of stored surplus heat is estimated by determining add/subtract values for each of multiple detected temperatures and integrating the determined add/subtract values for the detected multiple temperatures to calculate multiple integrated values. The largest numerical value of the multiple integrated values is selected when all of the multiple integrated values are increasing, and the smallest numerical value of the multiple integrated values is selected when some of the multiple integrated values are decreasing. The selected integrated value may be used to estimate the amount of stored surplus heat.

In the above-described present embodiment, the higher temperature side of the detected temperature is adopted in step S63, and the lower temperature side of the detected temperature is adopted in step S64. However, it is also possible as a variant example to calculate the first add/subtract value M1 based on a weighted average of the two detected temperatures to estimate the amount of stored surplus heat. For example, in step S63, the first add/subtract value M1 can be calculated based on a value obtained by adding the detected temperature on the higher temperature side multiplied by 0.7 and the detected temperature on the lower temperature side multiplied by 0.3. Then, in step S63, the first add/subtract value M1 can be calculated based on a value obtained by adding the detected temperature on the higher temperature side multiplied by 0.3 and the detected temperature on the lower temperature side multiplied by 0.7. Thus, in step S63, where the detected temperature Td is high and the estimated amount of the stored surplus heat is increased (first add/subtract value M1 is positive or 0), the highest of the multiple detected temperatures Td is used as the most heavily weighted factor for estimating the amount of stored surplus heat, whereas in step S64, where the estimated amount of stored surplus heat is decreased (first add/subtract value M1 is negative or 0), the lowest temperature is used as the most heavily weighted factor for estimating the amount of stored surplus heat.

It is also possible to calculate the first add/subtract value M1 from a simple average of the detected temperatures Td, without weighting detected temperatures Td.

When the temperature of fuel cell units positioned at the vertices of the rectangle has dropped to or below a predetermined usage-suppressing cell unit temperature, the first add/subtract value M1 can be determined so as to suppress increases of the fuel utilization rate Uf.

Next, referring to FIG. 34, we discuss calculation of an add/subtract value according to a variant example of the present embodiment. Note that calculation of the add/subtract value according to this variant example may be used together with the process shown in FIG. 33, or may be applied on its own. When the present variant example is applied on its own, it is acceptable to have one generating chamber temperature sensor 142.

FIG. 34 is a flow chart showing the procedure for calculating a first add/subtract value M1 based on the detected temperature from the reformer temperature sensor 148, which is another temperature detection device provided in addition to the generating chamber temperature sensors 142 serving as temperature detection device.

First, in step S71 of FIG. 34, the detected temperatures are read from the reformer temperature sensors 148. In the present embodiment, there are reformer temperature sensors 148 attached at two locations, on the entrance side of the reformer 20 and on the exit side of the reformer 20, so that temperatures in the vicinity of the entrance and exit of the reformer 20 are measured. Normally the temperature of the reformer 20 is low on the entrance side where the endothermic steam reforming reaction occurs abundantly, and high on the exit side.

Next, in step S72 each of the detected temperatures in the reformer 20 is compared to a predetermined usage-suppressing reformer temperature. First, if the lower of the two temperatures detected at the reformer 20 is lower than a low temperature-side usage-suppressing reformer temperature Tr0, and the higher of the detected temperatures is lower than a high temperature-side usage-suppressing reformer temperature Tr1, the process advances to step S73. On the other hand, if the higher of the two temperatures detected at the reformer 20 is higher than the high temperature-side usage-suppressing reformer temperature Tr1, and the lower of the detected temperatures is higher than the low temperature-side usage-suppressing reformer temperature Tr0, the process advances to step S75. When neither of these is true, the process advances to step S74.

In step S73, because the temperature of the reformer 20 is lower than each of the usage-suppressing reformer temperatures, the first add/subtract value M1 is corrected so that the fuel utilization rate Uf falls (the fuel supply rate increases). That is, a value obtained by subtracting 10% of the absolute value of first add/subtract value M1 calculated based on the temperature Td detected by the generating chamber temperature sensors 142 is used for integration. The first integrated value N1id, which is the estimated amount of stored surplus heat, thus decreases (its increase is suppressed), placing the fuel utilization rate Uf to decrease (an increase of the fuel utilization rate is suppressed), thereby raising the temperature of the reformer 20.

In step S75, on the other hand, because the temperature of the reformer 20 is higher than each of the usage-suppressing reformer temperatures, the first add/subtract value M1 is corrected so that the fuel utilization rate Uf rises (the fuel supply rate decreases). That is, a value obtained by adding, to the first add/subtract value M1, 10% of the absolute value of first add/subtract value M1 calculated based on the temperature Td detected by generating chamber temperature sensors 142 is used as the first add/subtract value M1 for integration. The first integrated value N1*id*, which is the estimated amount of stored surplus heat, thus increases (its decrease is suppressed), causing the fuel utilization rate Uf to rise, so that the temperature of the reformer 20 is decreased. Damage to the reformer 20 caused by an excessive rise of the temperature in the reformer 20 is thus prevented.

In step S74, because the reformer 20 is in the appropriate temperature range, no correction is made to the first add/subtract value M1, and the process of one iteration of the FIG. 34 flow chart is completed. (Since the two temperatures detected at the reformer 20 are correlated, it does not normally happen that the lower detected temperature is lower than low temperature-side usage-suppressing reformer temperature, and the higher of the detected temperatures is higher than high temperature-side usage-suppressing reformer temperature.)

Note that in the variant example of present embodiment the fuel utilization rate may also be corrected by averaging the temperatures detected by the two reformer temperature sensors 148 and comparing the averaged detected temperature to one or two of the usage-suppressing reformer temperatures. It is also possible to use a change rate of the temperatures detected by the reformer temperature sensors 148. When the change rate is high, the amount of correction to the fuel utilization rate may be increased.

Next, referring to FIG. 35, we discuss calculation of an add/subtract value according to a variant example of the present embodiment. Note that calculation of the add/subtract value according to this variant example may be used together with the process in FIGS. 33 and 34, or may be applied on its own. When the present variant example is applied on its own, it is acceptable to use one generating chamber temperature sensor 142.

FIG. 35 is a flow chart showing the procedure for calculating a first add/subtract value M1 based on the detected temperature from an exhaust temperature sensor 140, which is another temperature detection device in addition to the generating chamber temperature sensors 142 serving as temperature detection device.

First, in step S81 of FIG. 35, detected temperatures are read from the exhaust temperature sensor 140. In the present embodiment, the exhaust temperature sensor 140 is disposed to measure the temperature of exhaust gas combusted in the combustion chamber 18 and discharged after passing through an exhaust gas discharge pipe 82.

Next, in step S82, the detected temperature of the exhaust gas is compared to a predetermined usage-suppressing exhaust gas temperature. First, if the detected exhaust gas temperature is below a predetermined low temperature side usage-suppressing exhaust temperature Tem0, the process advances to step S83. On the other hand, if the detected exhaust gas temperature is above a predetermined high temperature side usage-suppressing exhaust temperature Tem1, the process advances to step S85. If the exhaust gas detected temperature is below the high temperature side usage-suppressing exhaust temperature Tem1 and above the low temperature side usage-suppressing exhaust temperature Tem0, the process advances to step S84.

In step S83, since the temperature of the exhaust gas is lower than the appropriate temperature, the first add/subtract value M1 is corrected so that the fuel utilization rate Uf decreases (the fuel supply rate increases). That is, a value obtained by subtracting from the first add/subtract value M1 10% of the absolute value of first add/subtract value M1 calculated based on the temperature Td detected by generating chamber temperature sensors 142 is used as the first add/subtract value M1 for integration. The first integrated value N1*id*, which is the estimated amount of stored surplus heat, thus decreases (its increase is suppressed), causing the fuel utilization rate Uf to decrease (an increase of the fuel utilization rate Uf is suppressed), so that the temperature of the exhaust gas is raised.

In step S85, on the other hand, since the temperature of the exhaust gas is higher than the appropriate temperature, the first add/subtract value M1 is corrected so that the fuel utilization rate Uf increases (the fuel supply rate decreases). That is, a value obtained by adding to the first add/subtract value M1 10% of the absolute value of first add/subtract value M1 calculated based on the temperature Td detected by generating chamber temperature sensors 142 is used as the first add/subtract value M1 for integration. The first integrated value N1*id*, which is the estimated amount of stored surplus heat, thus increases (its decrease is suppressed), causing the fuel utilization rate Uf to rise, so that the temperature of the exhaust gas is decreased. The temperature inside the fuel cell module 2 is by this means controlled to become the appropriate temperature.

In step S84, because the exhaust gas is in the appropriate temperature range, no correction is made to the first add/subtract value M1, and process for one iteration of the FIG. 35 flow chart is completed.

Note that this variant example may adopt a correction based on the rate of change per unit time of the temperatures detected by the exhaust temperature sensor 140. This is, when the rate of change is high, the range of correcting the fuel utilization rate may be increased.

In the solid oxide fuel cell according to the second embodiment of the present invention, the amount of stored surplus heat is estimated based on the temperature Td detected by the generating chamber temperature sensors 142. Therefore, the control section 110 can accurately estimate the amount of accumulated surplus heat even if the output power is changed with a delay time (FIG. 20) after the fuel supply rate is changed. It is possible that the amount of surplus heat stored in the heat storing material 2 can be fully utilized while the risk of a sudden temperature drop in the fuel cell module 2 can be securely avoided. In addition, in fuel cells of the type, as used in the present embodiment, in which the output power is changed with a delay time after the fuel supply rate is changed, frequent increase and decrease of the output power cause a large amount of excess fuel and pose the risk of raising the temperature excessively inside the fuel cell module (FIG. 31). However, in the solid oxide fuel cell of the present embodiment, the amount of stored surplus heat caused by the excess fuel can be accurately estimated. In the prior art, a cooling medium (air) is introduced in the fuel cell module 2 to suppress an excessive temperature rise caused by excess fuel. However, in the solid oxide fuel cell of present embodiment, since the amount of surplus heat caused by excess fuel is accurately estimated, by effectively using the stored surplus heat, an excessive temperature rise can be suppressed. An extra amount of generating air that would need to be introduced in to lower the temperature can be dispensed with, and the overall energy efficiency of the solid oxide fuel cell can be improved.

In the solid oxide fuel cell of the present embodiment, the stored heat amount estimating circuit 110*b* estimates the amount of stored surplus heat based on the history of detected temperatures Td (first integrated value N1$id$). Therefore, the amount of the stored surplus heat can be more accurately estimated than it is when only a recently detected temperature Td is used. The amount of surplus heat stored in the heat storing material can therefore be fully utilized.

Furthermore, in the present invention thus constituted, a large amount of the stored surplus heat is used when the estimated amount of stored surplus heat is large, and a lesser amount of the stored surplus heat is used when the amount of stored surplus heat is estimated small (FIG. 23). Therefore, the stored surplus heat can be more effectively utilized, and the risk of a temperature drop can be reliably avoided.

According to the solid oxide fuel cell of the present embodiment, since conditions such as degradation of the fuel cell module 2 (FIG. 28), in addition to the amount of stored surplus heat and the power demand, are used to determine the fuel utilization rate, the stored surplus heat can be appropriately utilized according to the state of the fuel cell module 2.

In addition, in the solid oxide fuel cell of the present embodiment, the fuel utilization rate is changed more in the range where the amount of stored surplus heat estimated by the stored heat amount estimating circuit 110$b$ is large (FIG. 23, N1$id$=around 0.9 to 1) than it is in the range where the estimated stored heat amount is small (N1$id$=around 0 to 0.1). Therefore, when the estimated amount of the stored surplus heat is large, a large amount of stored surplus heat is utilized and an excessive temperature rise can be avoided, whereas when the estimated amount of stored surplus heat is small, a lesser amount of the stored surplus heat is used, and overcooling can be avoided.

In the solid oxide fuel cell of the present embodiment, the stored surplus heat is estimated by taking into consideration not only the history of the detected temperatures Td but also changes of recently detected temperature (second add/subtract value M2). Therefore, the stored surplus heat can be accurately estimated based on the history, and the responsiveness can be improved to temperatures changes of the fuel cell module 2, which has a large thermal capacity and thus is difficult to change a direction of temperature change, thereby preventing excessive temperature rises and temperature drops.

Furthermore, in the solid oxide fuel cell of the present embodiment, the fuel utilization rate is changed in a wider range where the generated power is small than where the generated power is large (FIG. 24). The risk of a sudden temperature drop can therefore be reduced, and the energy efficiency can be effectively increased by utilizing a large amount of stored surplus heat where the generated power is small (around IU in FIG. 24) and therefore there is a greater margin for improving the fuel utilization rate. In the range where the generated power is large, and thus the fuel utilization rate is normally high (around the region close to Imax in FIG. 24), only a little improvement is possible on the fuel utilization rate. During the operation in the range, the stored surplus heat is less used, and the surplus heat accumulated during the operation in the range is used where the generated power is small whereby the energy efficiency where the generated power is small can be improved.

In the solid oxide fuel cell of the present embodiment, a range of changes causing the fuel utilization rate to rise is reduced (integration of N1$id$ is stopped) after the fuel cell module has degraded (FIG. 28). Therefore, by operating the degraded fuel cell module, in which the operation temperature tends to be higher, in a lower temperature range, degradation can be prevented from advancing.

Furthermore, in the solid oxide fuel cell of the present embodiment, the amount of stored surplus heat is estimated based on integration of the add/subtract values (N1$id$) and on the differential value (M2). Therefore, the amount of stored surplus heat can be appropriately estimated by a simple calculation, whereby the fuel utilization rate can be set appropriately.

Also, in the solid oxide fuel cell of the present embodiment, since the add/subtract values (M1, M2) for use in estimating the amount of stored surplus heat are determined based on the generated power, the generated current, and other conditions in addition to the detected temperature Td, factors other than the temperature affecting the stored surplus heat can be appropriately taken into consideration when the estimated value is calculated.

In addition, in the solid oxide fuel cell of the present embodiment, since an increase or decrease of the amount of stored surplus heat is estimated not only with the detected temperature Td but also with the generated power (Equations (5), (7), etc.), a more accurate estimation of the stored surplus heat becomes possible.

Furthermore, in the solid oxide fuel cell of the present embodiment, the estimated amount of stored surplus heat changes more quickly as the generated power increases (the flow chart in FIG. 21 is executed in shorter intervals as the generated power increases). Therefore, it is possible to estimate the amount of stored surplus hear more accurately.

The preferred embodiments of the present invention have explained above. However, various modifications to the above-described embodiments may be possible. In particular, in the above-described embodiments, the heat capacity of the insulation material (heat storing material) is fixed. However, as a variant example, a fuel cell module with a variable heat capacity may be used with the present invention. In that case, an additional heat capacity member with a large heat capacity can be provided so as to be able to be thermally connected to and removed from the fuel cell module. If the heat capacity should be large, an additional heat capacity member may be thermally connected to the fuel cell module, whereas if the heat capacity should be small, an additional heat capacity member may be thermally removed. For example, during the start-up of the solid oxide fuel cell, the heat capacity is made small by removing the additional heat capacity member, thereby raising the temperature of the fuel cell module. On the other hand, when it is anticipated that the solid oxide fuel cell is operated to output large generated power for long hours, the fuel cell module is connected with an additional heat capacity member so as to accumulate a larger surplus heat amount.

What is claimed is:

1. A solid oxide fuel cell system operable to generate electrical power variable in response to power demand, comprising:
   a fuel cell module configured to generate the electrical power using fuel;
   a fuel supply device configured to supply the fuel at a fuel supply rate to the fuel cell module;
   an oxidant gas supply device configured to supply to the fuel cell module oxidant gas at an oxidant gas supply rate for generation of the electrical power;
   a combustion section configured to burn excess fuel from the fuel supply device which is left unused for generation of electrical power and heat an interior of the fuel cell module;
   a heat storing material configured to store heat generated within the fuel cell module;

a power demand detection device configured to detect the power demand;

a temperature detection device configured to detect a temperature of the fuel cell module; and a control device programmed to operate the fuel supply device, responsive to a change of the power demand detected by the power demand detection device, to change the fuel supply rate to change the electrical power output from the fuel cell in order to meet the change of the power demand, wherein the control device is programmed to place a delay time before the electrical power output from the fuel cell module is changed after the fuel supply rate is changed in response to the change of the power demand, wherein the control device includes a stored heat estimating circuit configured to estimate, from a temperature detected by the temperature detection device, an amount of surplus heat stored in the heat storing material, and in response to an estimation by the stored heat estimating circuit that a first amount of surplus heat is stored in the heat storing material, the control device is programmed to control the fuel supply rate to output a level of electrical power at a first fuel utilization rate, and in response to an estimation by the stored heat estimating circuit that a second amount of surplus heat, which is higher than the first amount of surplus heat, is stored in the heat storing material, control the fuel supply rate to output the same level of electrical at a second fuel utilization rate, which is higher than the first fuel utilization rate, wherein the fuel utilization rate is a rate of an amount of fuel used for generation of the electrical power with respect to a total amount of fuel supplied to the fuel cell module.

2. The solid oxide fuel cell according to claim 1, wherein the stored heat estimating circuit is configured to estimate the amount of surplus heat stored in the heat storing material based on a history of temperatures detected by the temperature detection device.

3. The solid oxide fuel cell according to claim 2, wherein the control device is programmed to operate the fuel supply device to increase the fuel utilization rate as the amount of stored surplus heat estimated by the stored heat estimating circuit increases.

4. The solid oxide fuel cell according to claim 1, wherein the control device is programmed to operate the fuel supply device in response to the power demand to achieve a third fuel utilization rate when the electrical power is output from the fuel cell module at a first level and achieve a fourth fuel utilization rate, which is lower than the third fuel utilization rate, when the electrical power is output from the fuel cell mode at a second level which is lower than the first level of electrical power.

5. The solid oxide fuel cell according to claim 3, wherein the control device is programmed to operate the fuel supply device to increase the fuel utilization rate to an increasing degree as the amount of stored surplus heat estimated by the stored heat estimating circuit increases.

6. The solid oxide fuel cell according to claim 2, wherein the stored heat estimating circuit is configured to additionally use a degree to which the temperature detected by the temperature detection device is rising to account for estimation of the amount of stored surplus heat so that the estimated amount of surplus heat increases as the degree to which the detected temperature is rising increases.

7. The solid oxide fuel cell according to claim 1, wherein the control device is programmed to change the fuel utilization rate according to the estimated amount of stored surplus heat between a maximum fuel utilization rate and a minimum fuel utilization rate, a difference between which decreases as the generated electrical power increases.

8. The solid oxide fuel cell according to claim 1, wherein the control device is programmed to operate the fuel supply device to change the fuel utilization rate within a first range before the fuel cell module degrades and change the fuel utilization rate within a second range, which is narrower than the first range, after the fuel cell module has degraded.

9. The solid oxide fuel cell according to claim 1, wherein when estimating the amount of stored surplus heat, the stored heat estimating circuit is configured to add or subtract add/subtract values that comprise a first group of values assigned to temperatures detected by the temperature detection device and a second group of values added or subtracted when the detected temperature is rising or falling.

10. The solid oxide fuel cell according to claim 1, wherein when estimating the amount of stored surplus heat, the stored heat estimating circuit is configured to add and subtract a set of add/subtract values that comprises a first value that is a function of a temperature detected by the temperature detection device and a second value reflecting rising or falling of the detected temperature.

11. The solid oxide fuel cell according to claim 10, wherein the first value takes a positive or negative value depending on a degree of the detected temperature relative to a threshold temperature predicted from the generated electrical power.

12. The solid oxide fuel cell according to claim 11, wherein the stored heat estimating circuit is configured to estimate the amount of stored surplus heat at intervals that become shorter as the generated electrical power increases.

13. The solid oxide fuel cell according to claim 10, wherein when estimating the amount of stored surplus heat, the stored heat estimating circuit is configured to recursively add and subtract the set of add/subtract values.

14. The solid oxide fuel cell according to claim 1, further comprising a plurality of temperature detection devices, including the temperature detection device, configured to detect temperatures of the fuel cell module at multiple places of the fuel cell module, wherein the stored heat estimating circuit is configured to estimate the amount of surplus heat stored in the heat storing material from histories of temperatures detected by the plurality of temperature detection devices.

15. The solid oxide fuel cell according to claim 14, wherein when estimating the amount of stored surplus heat, the stored heat estimating circuit is configured to calculate a weighted average of the detected temperatures in such a manner that a highest temperature among the detected temperatures is weighted most when the fuel cell module is heated above a threshold temperature predicted from the generated electrical power, and a lowest temperature among the detected temperatures is weighted most when the fuel cell module is heated below the threshold temperature.

16. The solid oxide fuel cell according to claim 14, wherein the plurality of temperature detection devices are disposed to detect a temperature of the reformer and a temperature of the fuel cell stack, and when the detected temperature of the reformer is below a predetermined threshold temperature, the stored heat estimating circuit is configured to estimate the amount of stored surplus heat lower than it does when the detected temperature of the reformer is equal to or above the predetermined threshold temperature.

17. The solid oxide fuel cell according to claim 14, wherein the fuel cell stack comprises multiple fuel cell units arrayed in approximately a rectangular form, one of the plurality of temperature detection devices is disposed to detect a temperature of a fuel cell unit positioned adjacent to a vertex of the rectangle, another one of the multiple temperature detection devices is disposed to detect a temperature of a fuel cell unit positioned adjacent to a center between two vertices of the rectangle, and when the detected temperature of the fuel cell unit positioned at the vertex of the rectangle is below a predetermined threshold temperature, the stored heat estimating circuit is configured to estimate the amount of stored surplus heat lower than it does when the detected temperature of the fuel cell unit positioned at the vertex of the rectangle is equal to or above the predetermined threshold temperature.

* * * * *